US012295506B2

(12) United States Patent
Paprocki et al.

(10) Patent No.: US 12,295,506 B2
(45) Date of Patent: May 13, 2025

(54) HANGING TOOL STORAGE DEVICE

(71) Applicant: Milwaukee Electric Tool Corporation, Brookfield, WI (US)

(72) Inventors: Benjamin J. Paprocki, Cottage Grove, WI (US); Ryan C. Patrick, Davenport, IA (US); Jedidiah J. Babinec, Milwaukee, WI (US); Christian R. Braun, Milwaukee, WI (US); Aaron M. Williams, Milwaukee, WI (US); Aaron S. Blumenthal, Shorewood, WI (US); Matthew A. Lownik, Wauwatosa, WI (US); Jack R. Warning, Milwaukee, WI (US); Nicole Z. Summersett, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 47 days.

(21) Appl. No.: 18/181,175

(22) Filed: Mar. 9, 2023

(65) Prior Publication Data

US 2023/0270266 A1 Aug. 31, 2023

Related U.S. Application Data

(63) Continuation of application No. PCT/US2023/063325, filed on Feb. 27, 2023.

(Continued)

(51) Int. Cl.

*A47F 5/00* (2006.01)
*A47F 5/08* (2006.01)

(Continued)

(52) U.S. Cl.

CPC .......... *A47F 5/0025* (2013.01); *A47F 5/0853* (2013.01); *A47F 5/10* (2013.01); *B25H 5/00* (2013.01)

(58) Field of Classification Search

CPC ........ A47F 5/0025; A47F 5/10; A47F 5/0853; A47F 5/0838; A47F 5/0846; B25H 5/00;

(Continued)

(56) References Cited

U.S. PATENT DOCUMENTS

| | | |
|---|---|---|
| 3,917,026 A | 11/1975 | Hedges |
| 4,618,192 A | 10/1986 | Kelley |

(Continued)

FOREIGN PATENT DOCUMENTS

| | | |
|---|---|---|
| CN | 202874209 | 4/2013 |
| CN | 204591890 | 8/2015 |

(Continued)

OTHER PUBLICATIONS

Lineman Toolboards Catalog, Journeyman's Edge, LLC, https://www.linemantoolboards.com/catalog.htm, appears to be available at least as early as 2022, 33 pages.

(Continued)

*Primary Examiner* — Ko H Chan

(74) *Attorney, Agent, or Firm* — Reinhart Boerner Van Deuren s.c.

(57) ABSTRACT

Hanging tool storage devices, shown as tool boards are provided. In some embodiments, the tool board includes a base and a plurality of pocket panels adjustably coupled to various locations of the base. In certain embodiments, the base includes a plurality of base members that releasably couple to one another to form different base shapes and sizes. In other specific embodiments, the pocket panels are rigid and modularly connect to one another to form a rigid structure.

17 Claims, 54 Drawing Sheets

Related U.S. Application Data

(60) Provisional application No. 63/481,432, filed on Jan. 25, 2023, provisional application No. 63/350,247, filed on Jun. 8, 2022, provisional application No. 63/333,848, filed on Apr. 22, 2022, provisional application No. 63/314,867, filed on Feb. 28, 2022.

(51) Int. Cl.
*A47F 5/10* (2006.01)
*B25H 5/00* (2006.01)

(58) Field of Classification Search
CPC .......... B25H 3/003; B25H 3/04; B25G 1/085; B25B 23/16; B65D 85/20; A47B 96/067; A47B 95/008; A47B 96/061
See application file for complete search history.

(56) References Cited

U.S. PATENT DOCUMENTS

| | | | | |
|---|---|---|---|---|
| 5,775,521 | A | 7/1998 | Tisbo | |
| 5,855,285 | A * | 1/1999 | Laird | B25H 3/003 206/378 |
| 5,938,158 | A | 8/1999 | Tisbo | |
| 6,050,426 | A | 4/2000 | Leurdijk | |
| 6,109,569 | A * | 8/2000 | Sakaida | F16L 3/222 248/62 |
| 6,134,846 | A | 10/2000 | Lamb | |
| 6,484,892 | B1 | 11/2002 | Gooner | |
| 6,702,128 | B2 * | 3/2004 | Winig | A47B 96/067 211/183 |
| 6,786,340 | B2 * | 9/2004 | Ford | A47F 5/0823 211/103 |
| 6,811,043 | B2 | 11/2004 | Perkins et al. | |
| 6,926,160 | B2 | 8/2005 | Perkins et al. | |
| 7,014,052 | B2 * | 3/2006 | Dettorre | A47F 5/0838 211/94.01 |
| 7,055,703 | B2 | 6/2006 | Perkins et al. | |
| 7,147,115 | B2 | 12/2006 | Perkins et al. | |
| 7,185,770 | B1 * | 3/2007 | Roten | A47B 81/00 211/70.6 |
| 7,228,977 | B2 | 6/2007 | Perkins et al. | |
| 7,296,695 | B2 | 11/2007 | Perkins et al. | |
| 7,721,848 | B1 | 5/2010 | Jackson | |
| 7,806,231 | B1 | 10/2010 | Jackson | |
| 7,909,181 | B2 * | 3/2011 | Purushothaman | A47L 15/505 211/41.8 |
| 8,038,110 | B2 | 10/2011 | Talbott | |
| 8,146,754 | B2 | 4/2012 | Apgood, II et al. | |
| 8,177,311 | B2 | 5/2012 | Apgood, II et al. | |
| 8,267,363 | B2 | 9/2012 | Begic et al. | |
| 8,448,959 | B1 | 5/2013 | Pohot | |
| 8,528,871 | B2 | 9/2013 | Begic et al. | |
| 8,746,472 | B2 | 6/2014 | Thrush | |
| 8,800,212 | B2 | 8/2014 | Thrush | |
| 9,056,756 | B1 | 6/2015 | De Marco | |
| 9,173,507 | B2 | 11/2015 | Thrush | |
| 9,249,003 | B2 | 2/2016 | Reeves | |
| 9,440,831 | B2 * | 9/2016 | Goodheart | B66F 11/04 |
| 9,527,206 | B1 * | 12/2016 | Hsieh | B25H 3/04 |
| 9,925,657 | B1 | 3/2018 | Kao | |
| 9,986,855 | B2 | 6/2018 | Thrush | |
| 10,213,915 | B1 | 2/2019 | Demarco | |
| 10,492,631 | B2 | 12/2019 | Velderman et al. | |
| 10,568,442 | B2 | 2/2020 | Thrush | |
| 10,583,962 | B2 | 3/2020 | Brunner et al. | |
| 10,677,388 | B2 * | 6/2020 | Hall | F16B 1/00 |
| 10,888,177 | B2 | 1/2021 | Thrush | |
| 10,925,412 | B2 | 2/2021 | Velderman et al. | |
| 11,406,203 | B2 | 8/2022 | Velderman et al. | |
| 2003/0043005 | A1 * | 3/2003 | Snider | H01F 7/0257 335/284 |
| 2003/0227148 | A1 | 12/2003 | Shipman et al. | |
| 2004/0238466 | A1 * | 12/2004 | Shiao | B25H 3/04 211/DIG. 1 |
| 2005/0247653 | A1 * | 11/2005 | Brooks | A47F 5/0846 211/94.01 |
| 2006/0234846 | A1 * | 10/2006 | Tucker | B25H 3/04 483/26 |
| 2009/0145866 | A1 * | 6/2009 | Panosian | A47F 5/0838 211/85.15 |
| 2011/0147551 | A1 * | 6/2011 | Richard | A47B 96/067 29/428 |
| 2011/0303798 | A1 | 12/2011 | Bader et al. | |
| 2013/0334383 | A1 | 12/2013 | Begic et al. | |
| 2016/0221178 | A1 * | 8/2016 | Hsieh | B25F 1/04 |
| 2016/0286985 | A1 | 10/2016 | Shamp et al. | |
| 2017/0166352 | A1 | 6/2017 | Hoppe et al. | |
| 2019/0225371 | A1 | 7/2019 | Hoppe et al. | |
| 2019/0285225 | A1 * | 9/2019 | Scott | B25H 3/02 |
| 2020/0147781 | A1 | 5/2020 | Squiers et al. | |
| 2020/0165036 | A1 | 5/2020 | Squiers et al. | |
| 2021/0085101 | A1 | 3/2021 | Thrush | |
| 2022/0040842 | A1 * | 2/2022 | Groves | B25H 3/04 |
| 2022/0089421 | A1 | 3/2022 | Hargis et al. | |
| 2022/0347833 | A1 * | 11/2022 | Hurley | B25H 3/04 |
| 2023/0100084 | A1 * | 3/2023 | Hargis | B66F 13/00 211/94.01 |

FOREIGN PATENT DOCUMENTS

| | | |
|---|---|---|
| CN | 110054127 | 7/2019 |
| CN | 108748023 | 11/2020 |
| CN | 213416196 | 6/2021 |
| CN | 213475338 | 6/2021 |
| CN | 213976883 | 8/2021 |
| CN | 214299162 | 9/2021 |
| CN | 214693196 | 11/2021 |
| CN | 216837025 | 6/2022 |
| DE | 3612200 | 12/1986 |
| EP | 0295994 | 7/1992 |
| EP | 3427902 | 1/2019 |
| EP | 3543203 | 9/2019 |
| WO | WO9103195 | 3/1991 |

OTHER PUBLICATIONS

Customizable 20 Inch X 18 ½ Inc Buck-It Rail Board with Bucket Lip, https://buckinghammfg.com/products/customizable-20-inch-x-18-1-2-inch-buck-it-rail-board-with-bucket-lip/, appears to be available at least as early as Sep. 2, 2021, 2 pages.

Milwaukee Lineman's Compact Aerial Tool Apron, https://www.homedepot.com/p/Milwaukee-Lineman-s-Compact-Aerial-Tool-Apron-48-22-8291/314254799, available at least as early as May 22, 2021, 5 pages.

Milwaukee Lineman's Aerial Tool Apron, https://www.homedepot.com/p/Milwaukee-Lineman-s-Aerial-Tool-Apron-48-22-8290/308319523, available at least as early as Jan. 18, 2019, 4 pages.

Klein Tools Aerial Apron, https://www.homedepot.com/p/Klein-Tools-Aerial-Apron-51829/203426526, available at least as early as Oct. 16, 2018, 4 pages.

Buck Aerial Basket Tool Apron, https://web.archive.org/web/20200922084047/https://linemenssuupply.com/products/buckingham-aerial-tool-apron-41-4500y, available at least as early as Sep. 22, 2020 per Wayback machine, 8 pages.

International Search Report and Written Opinion for International Application No. PCT/US2023/063325, dated Jun. 22, 2023, 9 pages.

* cited by examiner

HANGING TOOL STORAGE DEVICE

CROSS-REFERENCE TO RELATED PATENT APPLICATIONS

The present application is a continuation of International Application No. PCT/US2023/063325, filed Feb. 27, 2023, which claims the benefit of and priority to U.S. Provisional Application No. 63/481,432, filed on Jan. 25, 2023, U.S. Provisional Application No. 63/350,247, filed Jun. 8, 2022, U.S. Provisional Application No. 63/333,848, filed Apr. 22, 2022, and U.S. Provisional Application No. 63/314,867, filed Feb. 28, 2022, each of which is incorporated herein by reference in its entirety.

BACKGROUND OF THE INVENTION

The present invention relates generally to the field of tools. The present invention relates specifically to a hanging tool holding/storage device, such as a tool board supported from a bucket of a bucket truck.

SUMMARY OF THE INVENTION

One embodiment of the invention relates to a hanging tool storage device configured to hang from a supporting wall. The hanging tool storage device includes an upper wall extending from a front end to a rear end, the upper wall interfacing against and supported by a supporting wall, a rear wall extending downward from the rear end, the rear wall defining a rear surface, a front wall extending downward from the front end, the front wall defining a front surface, a first plurality of projections extending from the front surface, a plurality of tool board panels slidably engaged with the front wall via the first plurality of projections, and a plurality of support structures each configured to support a hand tool. The front wall and rear wall define a space between the front wall and the rear wall, and the space is configured to receive the supporting wall the upper wall is interfacing against. The rear surface and the front surface face away from each other. Each of the first plurality of projections includes a central wall extending from the front surface, a first aperture extending through the central wall, a first rib extending in a first direction from the central wall and a second rib extending in a second direction from the central wall opposite the first direction. The first rib and the second rib each extend in front of and offset from the front surface. Each of the plurality of tool board panels includes a second aperture extending through the respective tool board panel. The first apertures and the second apertures are configured to collectively receive a fastener that extends through one of the first apertures and one of the second apertures thereby rigidly coupling the respective tool board panel to the front wall. Each of the plurality of support structures are coupled to one of the plurality of the tool board panels.

Another embodiment of the invention relates to a hanging tool storage device configured to hang from a supporting wall. The hanging tool storage device includes an upper wall extending from a front end to a rear end, the upper wall interfacing against and supported by a supporting wall, a rear wall extending downward from the rear end, the rear wall defining a rear surface, a front wall extending downward from the front end, a first plurality of projections extending from the front surface, a base panel slidably engaged with the front wall via the first plurality of projections, a plurality of first apertures extending through the base panel, a plurality of tool board panels, and a plurality of support structures each configured to support a hand tool. The front wall defines a front surface, and the rear surface and the front surface face away from each other. The front wall and rear wall define a space between the front wall and the rear wall, and the space is configured to receive the supporting wall the upper wall is interfacing against. Each of the first plurality of projections includes a central wall extending from the front surface, a first aperture extending through the central wall, a first rib extending in a first direction from the central wall and a second rib extending in a second direction from the central wall opposite the first direction. The first rib and the second rib each extend in front of and offset from the front surface. Each of the plurality of tool board panels includes a second aperture extending through the respective tool board panel. Each of the plurality of first apertures and each of the second apertures are configured to collectively receive a fastener that extends through one of the first apertures and one of the second apertures thereby rigidly coupling the respective tool board panel to the front wall. Each of the plurality of support structures are coupled to one of the plurality of the tool board panels.

Another embodiment of the invention relates to a hanging tool storage device configured to hang from a supporting wall. The hanging tool storage device includes an upper wall extending from a front end to a rear end, the upper wall interfacing against and supported by a supporting wall, a rear wall extending downward from the rear end, the rear wall defining a rear surface, a front wall extending downward from the front end, the front wall defining a front surface, a first plurality of projections extending from the front surface, a plurality of support structures each configured to support a hand tool, the plurality of support structures engaged with the first plurality of projections, a plurality of fasteners, each of which extending through one of the first apertures, thereby rigidly coupling one of the plurality of support structures to the front wall. The front wall and rear wall define a space between the front wall and the rear wall, and the space is configured to receive the support walling the upper wall is interfacing against. The rear surface and the front surface face away from each other. Each of the first plurality of projections includes a central wall extending from the front surface, a first aperture extending through the first central wall, a first rib extending in a first direction from the first central wall and a second rib extending in a second direction from the first central wall opposite the first direction. The first rib and the second rib each extend in front of and offset from the front surface.

Another embodiment of the invention relates to a hanging tool storage device, such as a tool board, that includes a base member. A plurality of pocket panels, each configured to support a tool pocket are adjustably and removably coupled to the base member. In specific embodiments, each pocket panel includes a rigid hook, and the base member includes at least one groove that receives the hook of the pocket panel. In specific embodiments, the hook of the pocket panel is slidable within the groove of the base member. Further, in specific embodiments, the base member includes a first base member and a second base member, and the first base member releasably couples to the second base member.

Another embodiment relates to a hanging tool storage device, such as a tool board, including a first modular pocket panel releasably coupled to a second modular pocket panel. The first and second modular pocket panels are rigid and configured to support one or more tool pockets. In specific embodiments, the first modular panel is releasably coupled to the second modular panel with a snap-fit connector component. In other specific embodiments, the first modular panel is releasably coupled to the second modular panel by a releasable pin.

Another embodiment relates to a hanging tool storage device, such as a tool board, including a mounting structure. A plurality of tool board panels are coupled to the mounting structure. A bucket hook is adjustably coupled to an opposite side of the mounting structure from the tool board panels, the bucket hook configured to mount the tool board to a mounting edge. In specific embodiments, the bucket hook is laterally adjustable with respect to the mounting structure, such that the position of the bucket hook is adjustable with respect to the mounting structure. In more specific embodiments, the bucket hook is spring biased in a direction toward the mounting structure. In other specific embodiments, the bucket hook is height adjustable with respect to the mounting structure. In more specific embodiments, the mounting structure is a substantially vertical rail, and the bucket hook is adjustable between a plurality of mounting locations positioned at varying heights along the substantially vertical rail. In other specific embodiments, the mounting structure is a substantially planar board.

Another embodiment relates to a hanging tool storage device, such as a tool board, including a plurality of tool board panels coupled to a mounting structure. Each tool board panel includes a rigid frame. The rigid frame has a front panel that couples to a back panel. The tool board further includes a pocket. At least a portion of the pocket is secured between the front panel and the back panel. In specific embodiments, the pocket includes a non-conductive, material, and specifically, the pocket is formed from the non-conductive material such that an inner surface defining a pocket compartment is entirely formed from the non-conductive material. In more specific embodiments, the pocket includes a silicone material and specifically, the pocket is formed from the silicone material such that an inner surface defining a pocket compartment is entirely formed from the silicone material.

Another embodiment relates to a hanging tool storage device, such as a tool board, including a flexible base. A plurality of pockets configured to support a variety of tools are adjustably coupled to the flexible base. The flexible base includes a first outer panel and a second outer panel. An intermediate panel pivotably connects the first outer panel to the second outer panel, such that the first outer panel may be pivoted to a plurality of positions with respect to the second outer panel. The intermediate panel additionally supports a holster. In more specific embodiments, the holster has a height that is greater than 50% the height of the intermediate panel. In certain specific embodiments, the width of the intermediate panel is less than 25% the width of the first outer panel.

Additional exemplary embodiments relate to other features and combinations of features as described herein.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally the figures, various embodiments of a customizable hanging tool storage device, shown specifically as a tool board, including a plurality of pocket panels removably and interchangeably coupled to a base are shown. The pocket panels are configured to form and/or support, such as by sewing or other fastening or adhesive means, pockets of various shapes and sizes for storing tools. In specific embodiments, pocket panels of different sizes, shapes, and orientations, are applicable to a given base and are capable of ready adjustment by the user following initial application. In specific embodiments, the base is customizable to include a specified number of rows and/or columns based on the dimensional needs of the user.

For example, in the context of power utility buckets, a base may be customized to fit within a single-occupancy or double-occupancy bucket to meet the tool storage needs of linemen in different sizes of utility buckets. In certain embodiments, the base may be dimensioned to hang horizontally from a wall of a double-occupancy power utility bucket, and/or to hang vertically from a wall of a single-occupancy power utility bucket. In specific embodiments, adjustable nature of the pocket panels allows for ready readjustment and/or reorientation of the pocket panels corresponding to changes in the orientation of the base.

In certain specific embodiments, the base includes a plurality of base members that releasably couple to one another. Such a configuration allows a user to readily assemble a base that meets the user's present needs and then to fully or partially disassemble the base for storage purposes or to alter the dimensions of the base to meet different spacing needs at a different placement location, such as in a different power utility bucket, or at a new location in a different worksite.

Figure 1:
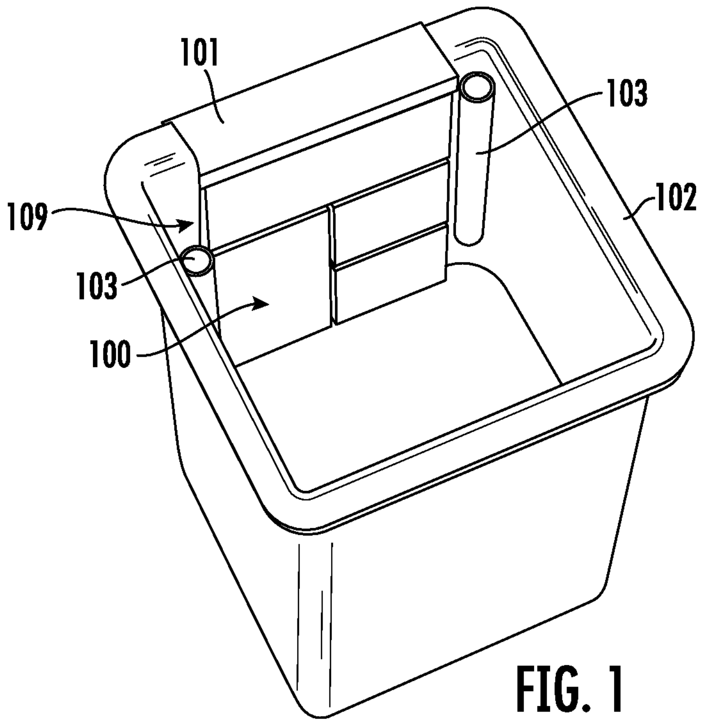
FIG. 1 is a perspective view from the top of a tool board mounted to a single-occupancy power utility bucket, according to an exemplary embodiment.

Referring to FIG. 1, a customizable hanging tool storage device, shown as tool board 100, is shown hanging on the interior of a single-occupancy power utility bucket 102. In specific embodiments, a mounting hook 101 is coupled to tool board 100 and serves to mount tool board 100 to an edge of a mounting wall, such as the wall of power utility bucket 102. Additionally, as shown in FIG. 1, generally cylindrical support members 103 are removably coupled to each side of tool board 100. Support members 103 are designed to support auger bits. As shown in FIG. 1, tool board 100 is oriented vertically to maximize the interior wall space within bucket 102. In a specific embodiment, tool board 100 includes mounting hook 101, base 109 coupled to mounting hook 101, and support members 103 coupled to base 109.

Figure 2:
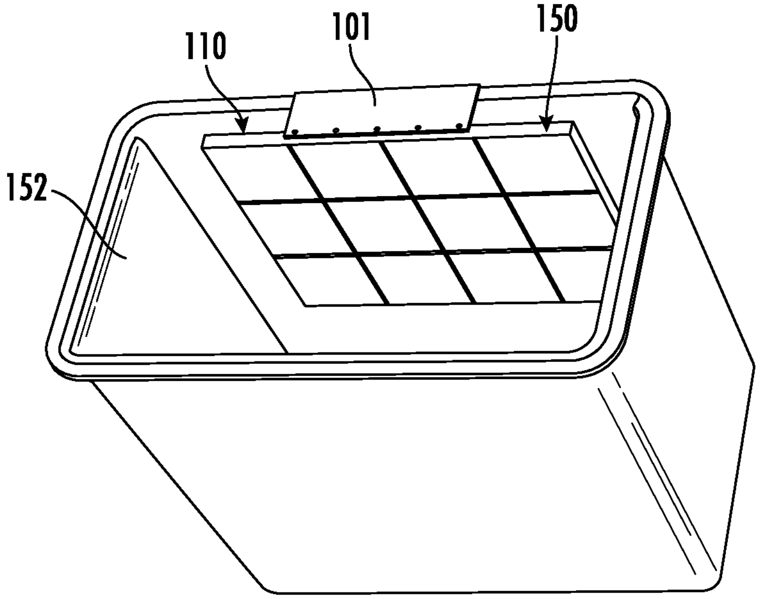
FIG. 2 is a perspective view of a tool board mounted to a double-occupancy power utility bucket, according to another exemplary embodiment.

Referring to FIG. 2, another customizable hanging tool storage device, shown as tool board 150, is shown hanging on the interior of a double-occupancy power utility bucket. Tool board 150 is substantially the same as tool board 100, except for its increased dimensions in the length and widthwise directions, increasing the amount of available tool storage space, and the configuration of pockets shown. In specific embodiments, mounting hook 101 is coupled to tool board 150 and serves to mount tool board 150 to an edge of power utility bucket 152. As shown in FIG. 2, tool board 150 is oriented horizontally to maximize the interior wall space within bucket 152. In a specific embodiment, tool board 150 includes hook 101 and base member 110 and a plurality of pocket panels 108 detachably coupled to base member 110.

Figure 4:
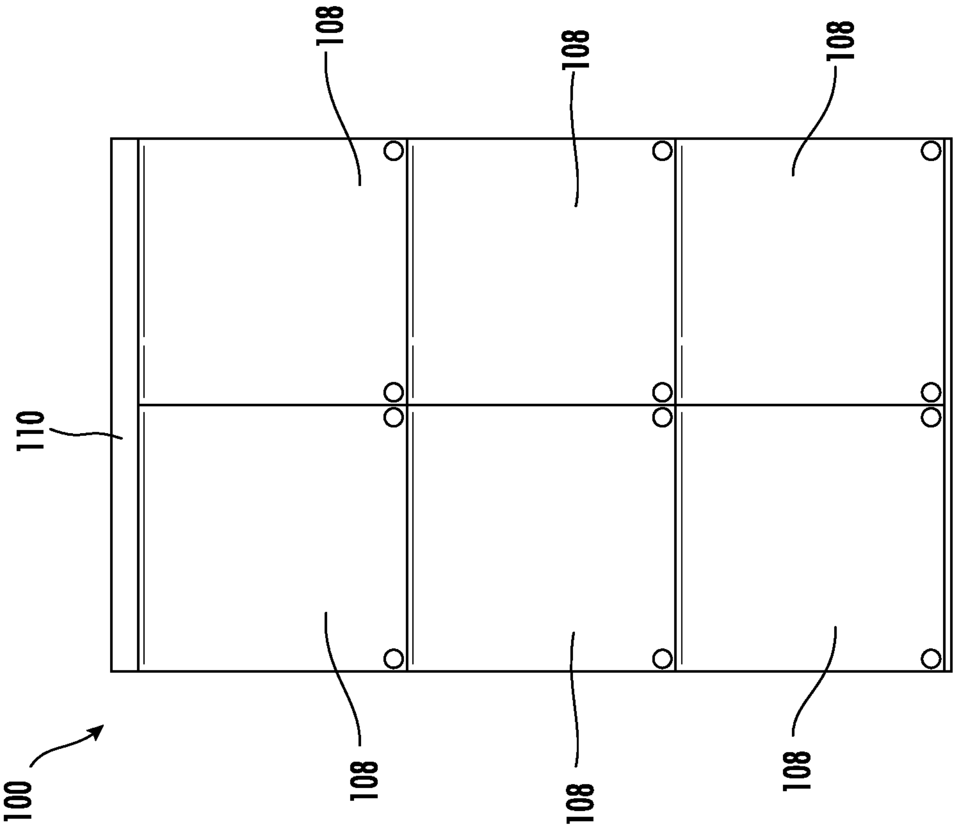
FIG. 4 is a front view of an alternate configuration of the tool board shown in FIG. 1, according to an exemplary embodiment.
Figure 3:
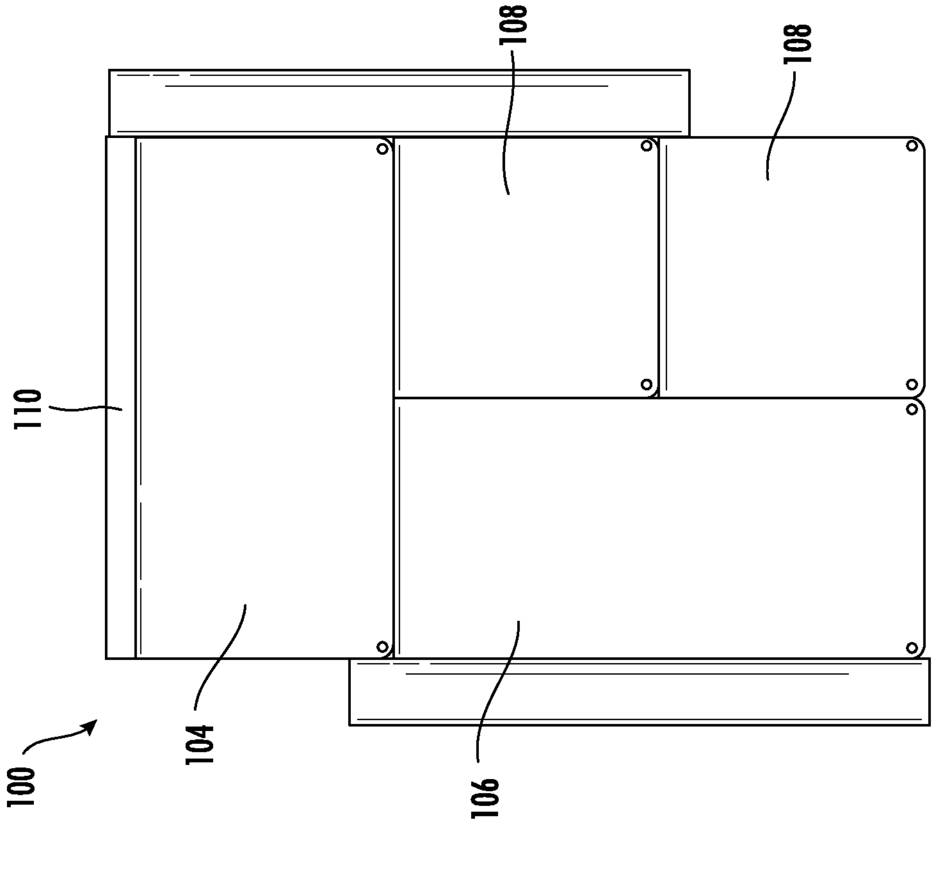
FIG. 3 is a front view of the tool board shown in FIG. 1, according to an exemplary embodiment.

Referring to FIGS. 3-4, a front view of the customizable hanging tool storage device, shown as tool board 100, is shown with two different configurations of pocket panels, configured to form and/or support pocket panels for storing tools. Each pocket panel is configured to removably and interchangeably coupled to a base that includes a single base member 110. In the configuration shown in FIG. 3, a horizontal rectangular pocket panel 104, a vertical rectangular pocket panel 106, and two vertically stacked square pocket panels 108 are coupled to base member 110.

Should a user desire a different configuration of pocket panels, the pocket panels may be rearranged, for instance, positioning horizontal rectangular pocket panel 104 below vertical rectangular pocket panel 106 and square pocket panels 108, among other possible arrangements. Alternatively, pocket panels may be interchanged, for example, by interchanging horizontal rectangular pocket panel 104 and vertical rectangular pocket panel 106 each for two corresponding square pocket panels 104 to achieve the configuration shown in FIG. 4, among other possible pocket panel alterations and combinations. Further, one or more of pocket panels 104, 106, and 108 could be readily removed and recoupled in a different orientation, for instance, an orientation rotated 90 degrees. Such a reorientation may be desirable in the event the user decides to orient the entire tool board 100 horizontally, rather than vertically, for example, to mount tool board 100 in a shorter and wider space.

In specific embodiments, the dimension of a single square pocket panel 108 is 9 inches by 9 inches. As such, as shown in FIG. 3, the dimension of horizontal rectangular pocket panel 104 and vertical rectangular pocket panel 106, respectively, is 9 inches by 18 inches. In specific embodiments, pocket panels 104, 106, and 108 are made of a fabric or cloth material.

Figure 5:
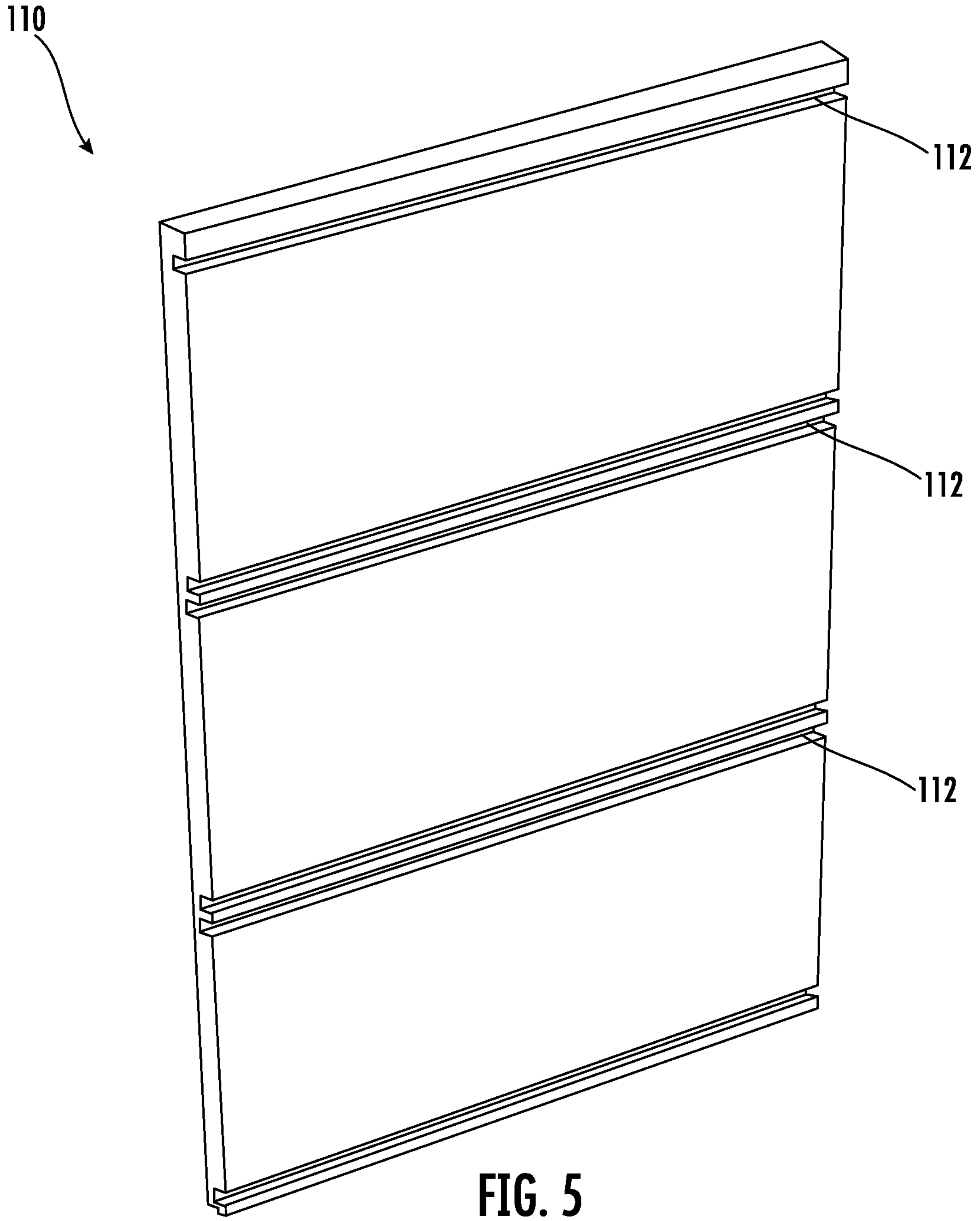
FIG. 5 is a perspective view of the tool board shown in FIG. 4 with the pocket panels removed, according to an exemplary embodiment.
Figure 6:
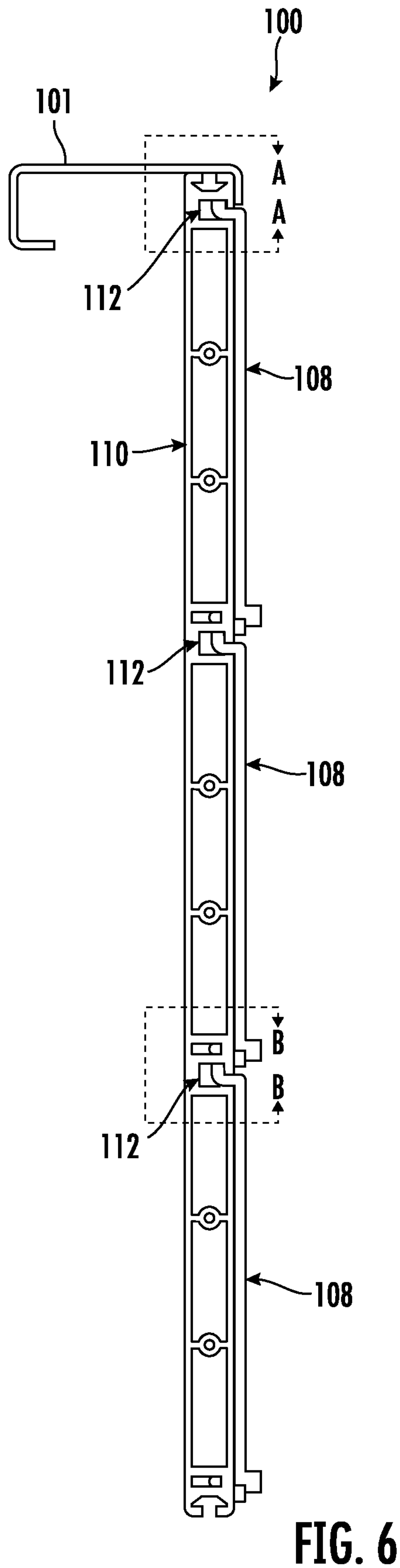
FIG. 6 is a side view of the tool board shown in FIG. 4, according to an exemplary embodiment.
Figure 7:
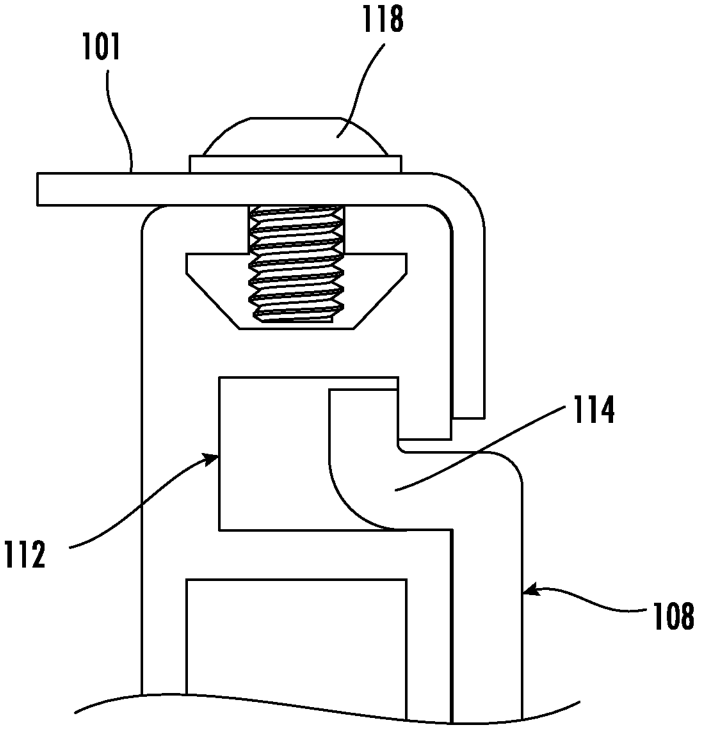
FIG. 7 is a detail perspective view of section A-A of the tool board of FIG. 6, according to an exemplary embodiment.
Figure 8:
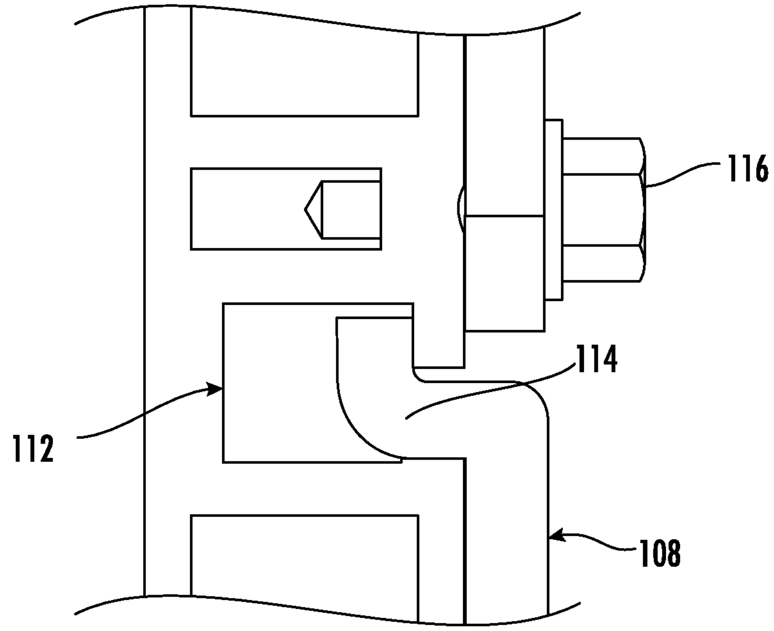
FIG. 8 is a detail perspective view of section B-B of the tool board of FIG. 6, according to an exemplary embodiment.

Referring to FIG. 5, base member 110 is shown with all pocket panels removed. As shown in FIG. 5, base member 110 is an extruded panel that defines horizontal grooves 112 for receiving a mating portion of each pocket panel. Referring to FIGS. 6-8, the connection between square pocket panels 108 and base member 110 is shown in greater detail, according to a specific embodiment. As shown in FIGS. 6-8, an upper portion of each pocket panel 104 includes a mating portion, specifically an integrally formed hook 114 that slides into a corresponding groove 112. At a lower edge of each square pocket panel 108, a fastener, such as a self-tapping screw 116 secures the bottom of each pocket panel to base member 110. In specific embodiments, mounting hook 101 is secured to base member 110 with a fastener, such as threaded fastener 118. To remove a pocket panel 104, the user unthreads the self-tapping screw 116 from base member 110 and unhooks the hook 114 from groove 112.

Figure 9:
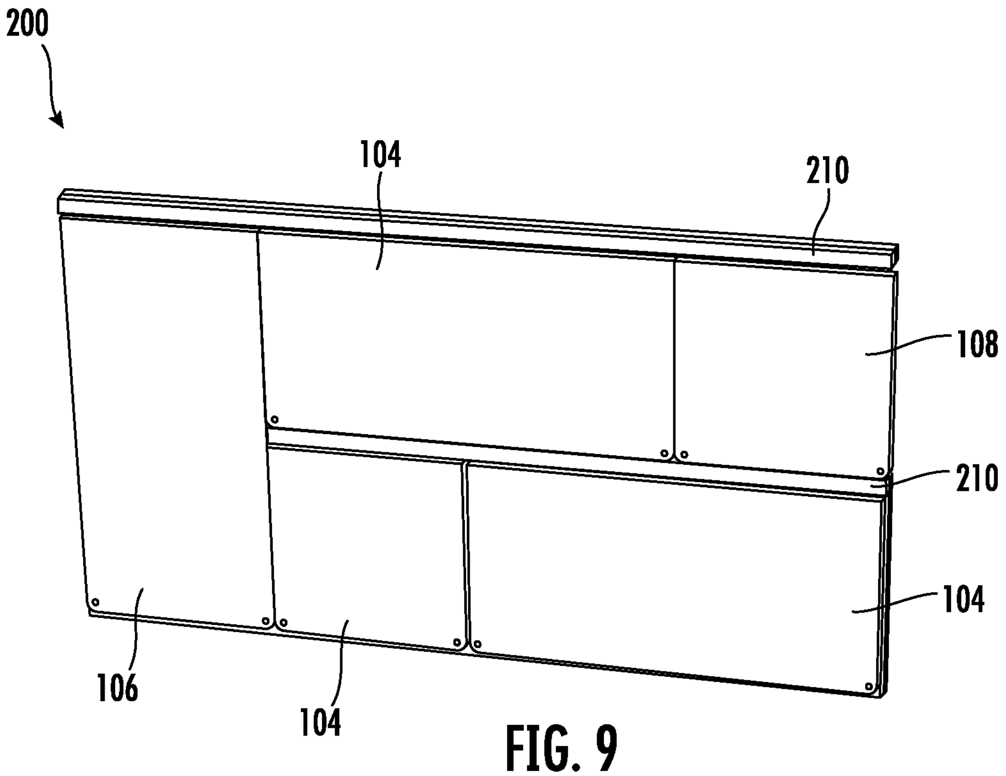
FIG. 9 is a perspective view of a tool board, according to another exemplary embodiment.
Figure 10:
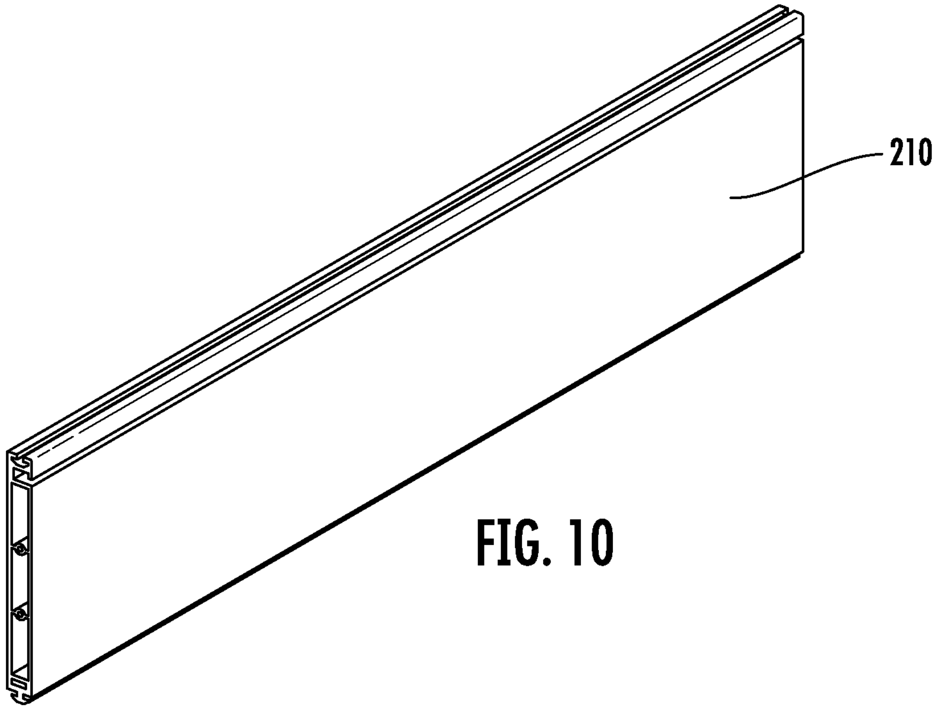
FIG. 10 is a perspective view of a single base member of the tool board shown in FIG. 9, according to an exemplary embodiment.

Referring to FIGS. 9-12, various views of a customizable hanging tool storage device, shown as tool board 200, are shown. Tool board 200 is substantially the same as tool board 100 or tool board 150, except for the differences described herein. As shown in FIG. 9, tool board 200 is shown in a horizontal configuration with one vertical rectangular pocket panel 106, two horizontal rectangular pocket panels 104, and two square pocket panels 108 coupled to a base that includes two horizontal modular base members 210. Referring to FIG. 10, a single base member 210 is shown. As shown in FIG. 10, base member 210 is an extruded panel that defines a horizontal groove 212 for hook 114 of each pocket panel. Hooks 114 mate with groove 212 in substantially the same manner as described above with respect to groove 112. In a specific embodiment, tool board 200 includes base member 210 coupled to a mounting hook, and panels (e.g., panel(s) 108, panel(s) 104) coupled to base member 210.

Figure 11:
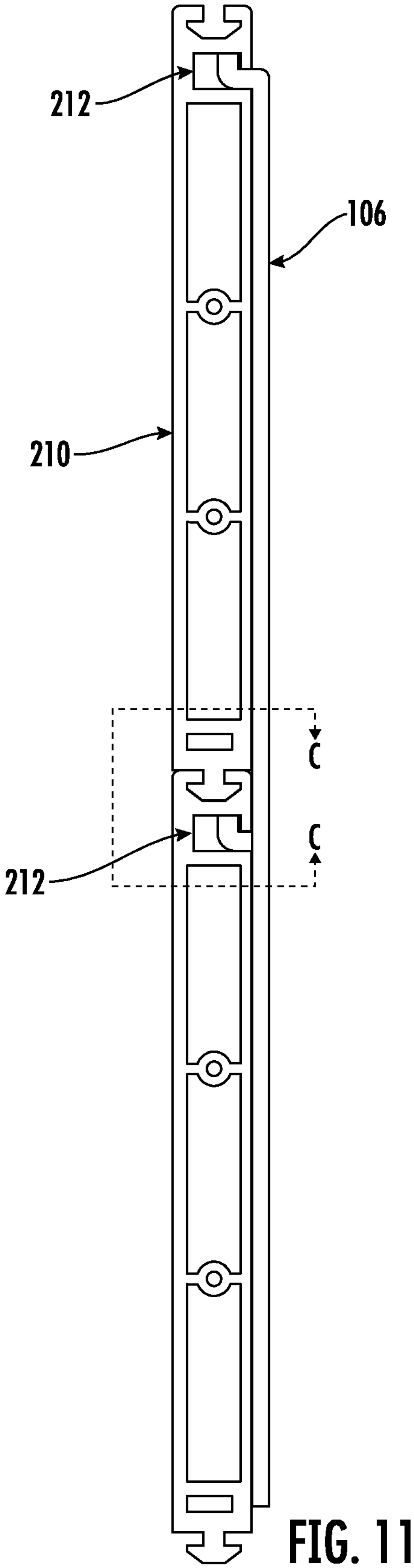
FIG. 11 is a side view of the tool board shown in FIG. 9, according to an exemplary embodiment.
Figure 12:
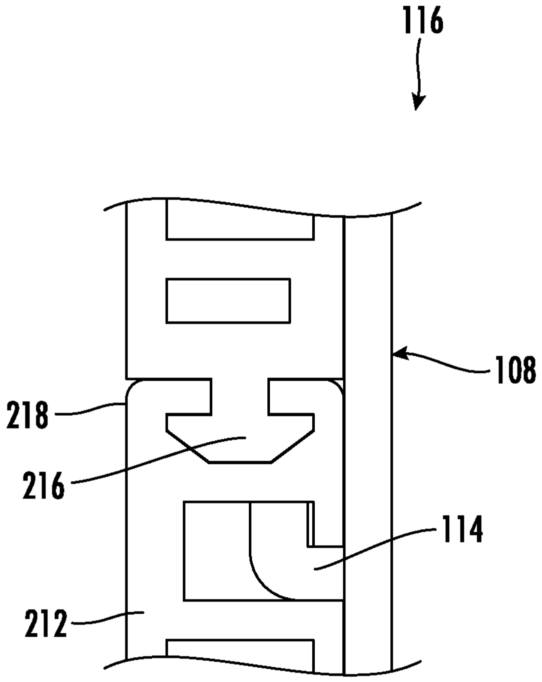
FIG. 12 is a detail perspective view of section C-C of the tool board of FIG. 11, according to an exemplary embodiment.

Referring to FIGS. 11-12, the connection between vertical rectangular pocket panel 106 and base member 210 is shown in greater detail. In specific embodiments, pocket panels that extend vertically for more than a single row, such as vertical rectangular pocket panel 106 may include additional hooks 114, specifically at least one hook corresponding to each groove 212 covered by the pocket panel. FIGS. 11-12 further show the modular connection between base members 210. Each base member 210 includes a male mating element 216 at a first longitudinal end and a female mating element 218 at an opposing second longitudinal end. The female mating element 218 receives the male mating element 216 to releasably couple base members 210 to one another. Thus, tool board 200 may include two or more base members 210 vertically arranged and coupled to each other via male mating member 216 and female mating element 218. The modular nature of base members 210 allows for custom height configuration and adjustment to meet the user's needs across different work spaces.

Figure 13:
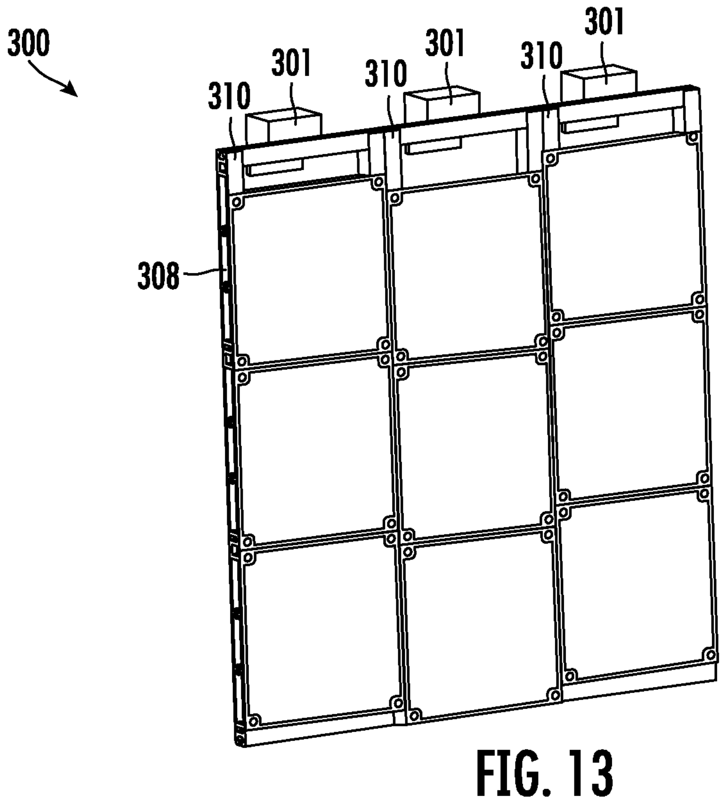
FIG. 13 is a perspective view from the front of a tool board, according to another exemplary embodiment.
Figure 14:
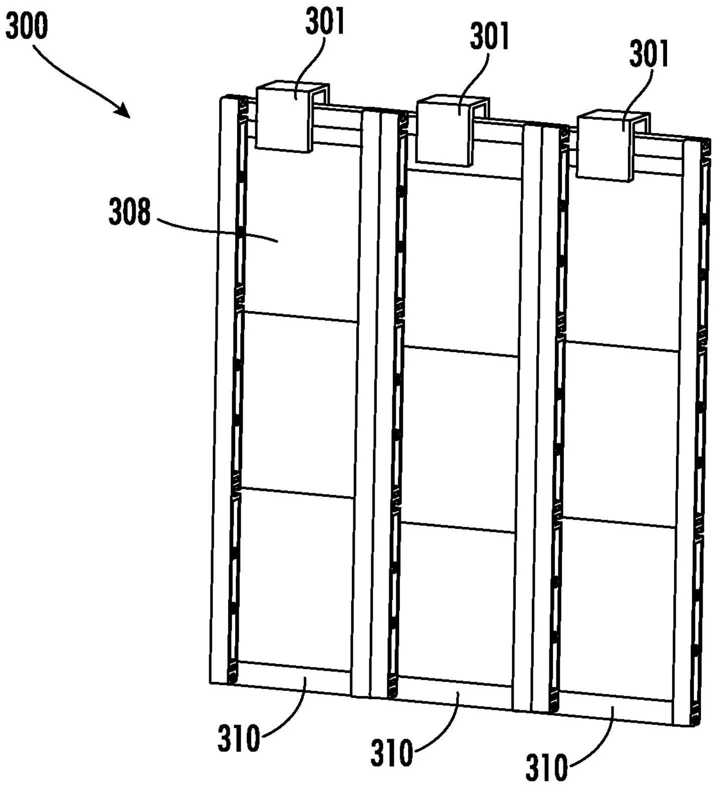
FIG. 14 is a perspective view from the rear of the tool board shown in FIG. 13, according to an exemplary embodiment.

Referring to FIGS. 13-14, various views of a customizable hanging tool storage device, shown as tool board 300, are shown. Tool board 300 is substantially the same as tool board 100, tool board 150, or tool board 200, except for the differences described herein. As shown in FIGS. 13-14, tool board 300 is shown in a vertical configuration with 9 square pocket panels 308 coupled to a base that includes three vertical modular base members 310 releasably coupled to one another by means of a rail system, such as via three pocket panels 308 being coupled to each of the three base member 310. In specific embodiments, pocket panels 308 are slidably coupled to base members 310 by anchor bolts, such that the height of pocket panels 308 is adjustable with respect to base members 310. In other specific embodiments, pocket panels of other shapes and sizes, similar to horizontal rectangular pocket panels 104 and vertical rectangular pocket panels 106, may be likewise applied to tool board 300. In specific embodiments, pocket panels 308 are made of a fabric or cloth material.

Additionally, the modular nature of base members 310 allows for custom width configuration and adjustment to meet the user's needs across different work spaces. For example, a user could use a wider tool board while working in a double occupancy power-utility bucket, and then, should the user need to transition to a single-occupancy power utility bucket, the user has the option to readily remove a sufficient number of base members 310 to achieve an appropriate tool board width for use in the smaller space. Further, as shown in FIGS. 13-14, one or more mounting hooks 301 are coupled to the top of one or more base members 310 to mount tool board 300 to a mounting wall, such as the wall of a power-utility bucket.

Figure 15:
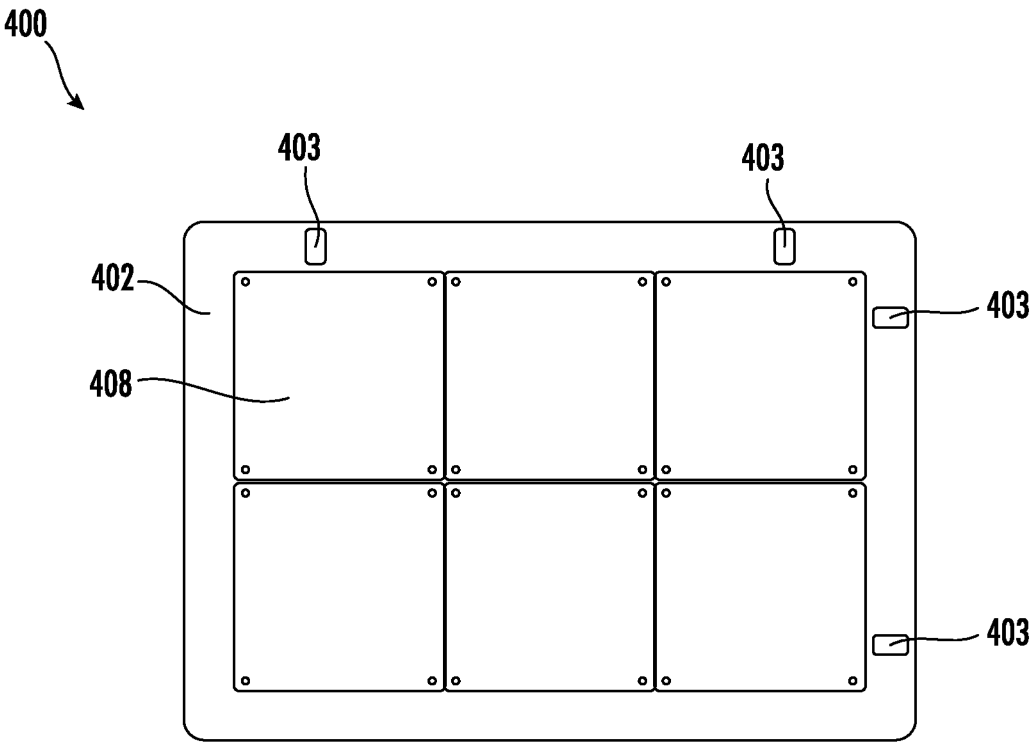
FIG. 15 is a front view of a tool board, according to another exemplary embodiment.

Referring to FIG. 15, various views of a customizable hanging tool storage device, shown as tool board 400, are shown. Tool board 400 is substantially the same as tool board 100, tool board 150, tool board 200, or tool board 300, except for the differences described herein. Tool board 400 includes a plurality of pocket panels, specifically six square pocket panels 408, coupled to a rigid base board 402. In other specific embodiments, pocket panels of other shapes and sizes, similar to horizontal rectangular pocket panels 104 and vertical rectangular pocket panels 106, may be likewise applied to tool board 400. In specific embodiments, pocket panels 408 are made of a fabric or cloth material and are coupled to base board 402 by common fastening elements, such as bolts, screws, snaps, etc.

As shown in FIG. 15, base board 402 and pocket panels 408 are dimensioned such that base board 402 extends beyond the collective dimensions of pocket panels 408 to define a frame with opening 403 for receiving mounting hooks, such as bucket hooks, for mounting tool board 400 to a wall, such as a wall of a utility bucket. As shown in FIG. 15, openings 403 are defined along both a length and a width of base board 402, allowing for either vertical or horizontal mounting configurations.

Figure 16:
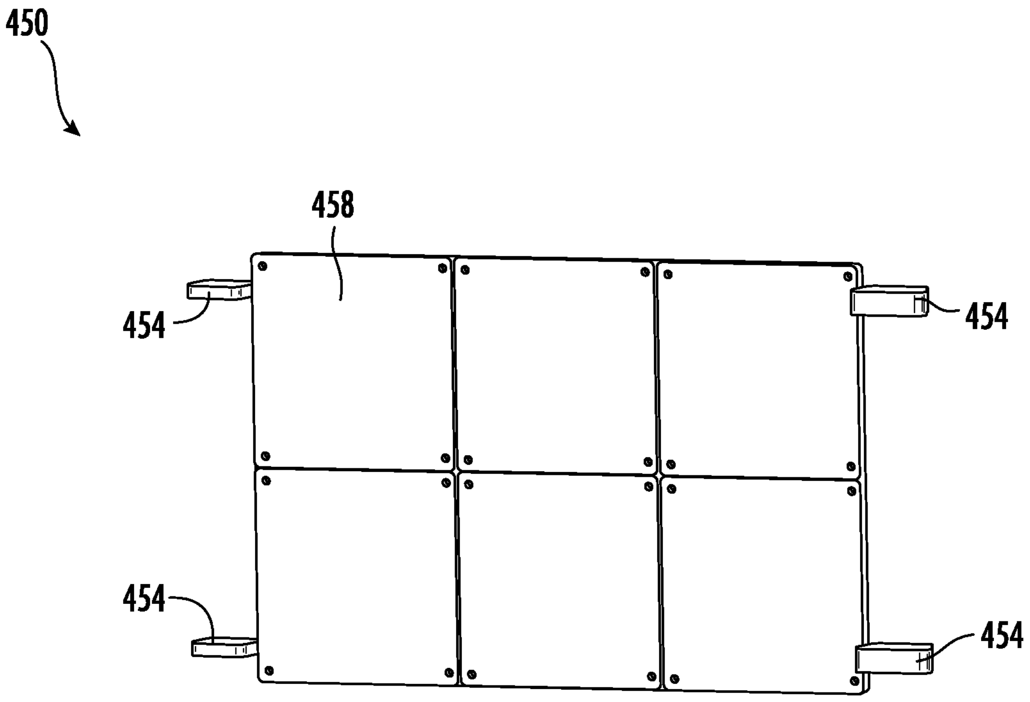
FIG. 16 is a front view of a tool board, according to another exemplary embodiment.
Figure 17:
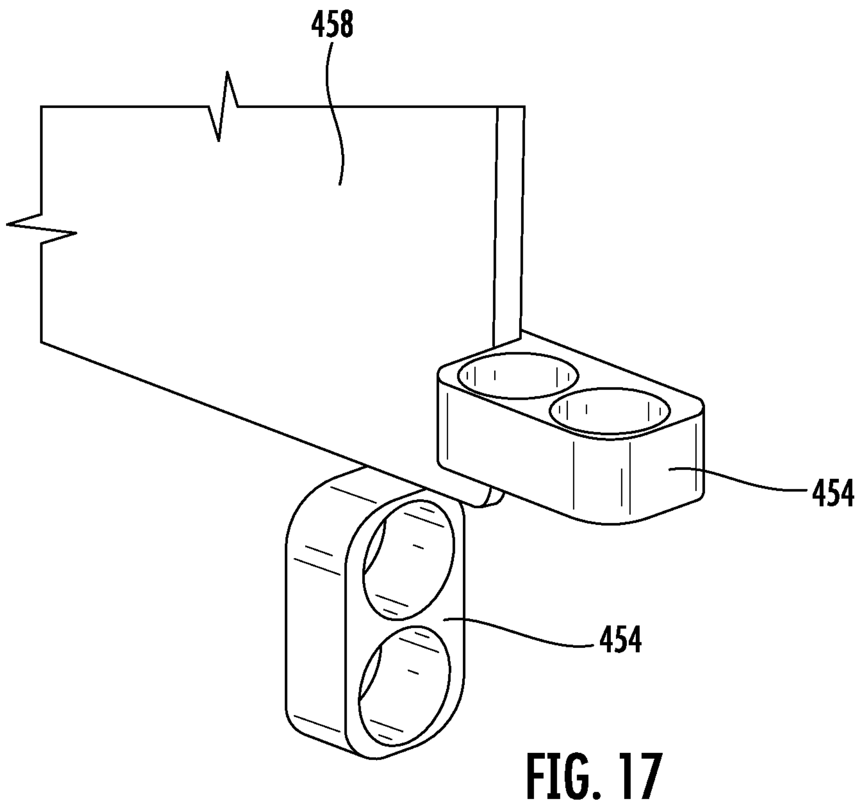
FIG. 17 is a detailed perspective view from the front of adjustable support members coupled at various orientations to the tool board shown in FIG. 16, according to an exemplary embodiment.
Figure 18:
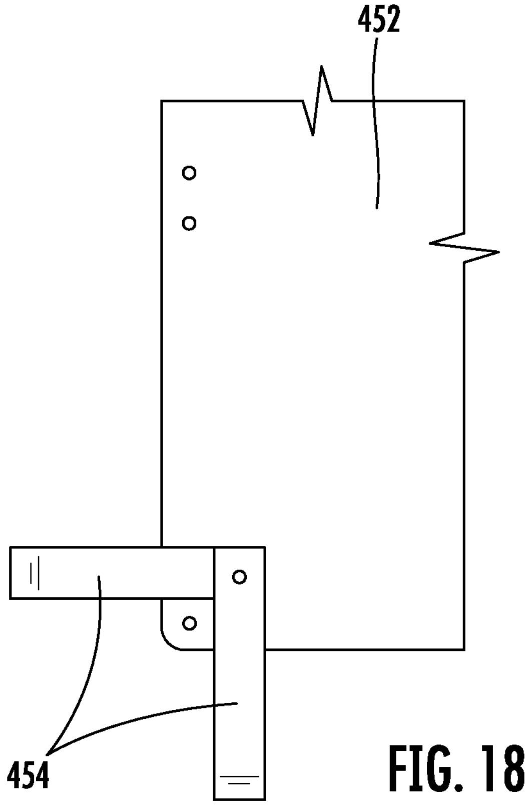
FIG. 18 is a rear view from the front of adjustable support members coupled at various orientations to the tool board shown in FIG. 16, according to an exemplary embodiment.

Referring to FIGS. 16-18, a customizable hanging tool storage device, shown as tool board 450, is shown. Tool board 450 is substantially the same as tool board 100, tool board 150, tool board 200, tool board 300, or tool board 400 except as otherwise stated. Tool board 450 includes a plurality of pocket panels, specifically six square pocket panels 458, coupled to a rigid base board 452. Tool board 450 is substantially the same as tool board 400 except for the differences described herein. Base board 452 and pocket panels 458 are dimensioned such that the dimensions of base board 452 substantially equates to the collective dimensions of pocket panels 458. Additionally, support members 454 are adjustably coupled to outer edges of tool board 450. Support members 454 are designed to support auger bits and/or bolt cutters. As shown in FIGS. 17-18, the orientation of support members 454 is adjustable to allow for upright auger bit and/or bolt cutter storage regardless of whether tool board 450 is mounted in a vertical or horizontal configuration.

Figure 19:
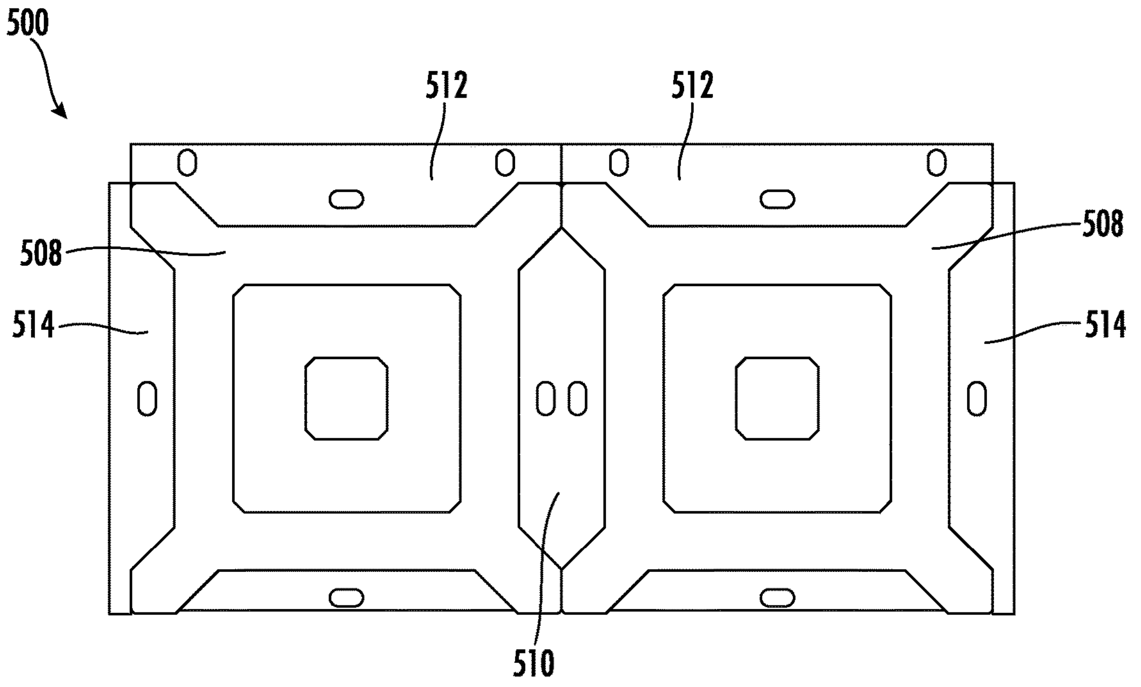
FIG. 19 is a front view of a tool board, according to another exemplary embodiment.
Figure 20:
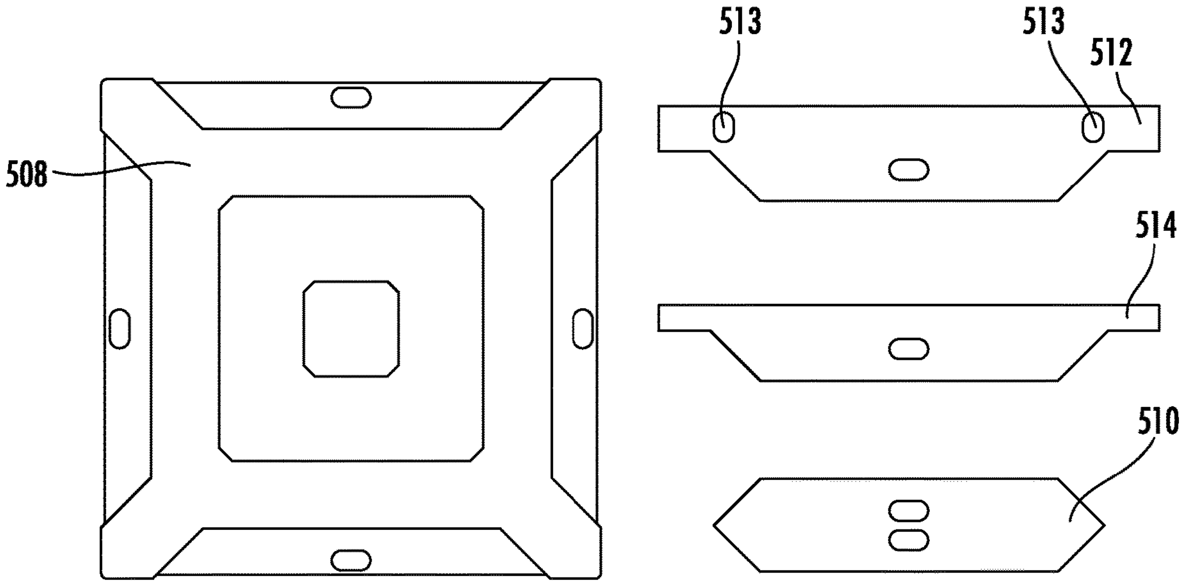
FIG. 20 is a front view of various deconstructed component parts of the tool board shown in FIG. 19, according to an exemplary embodiment.
Figure 21:
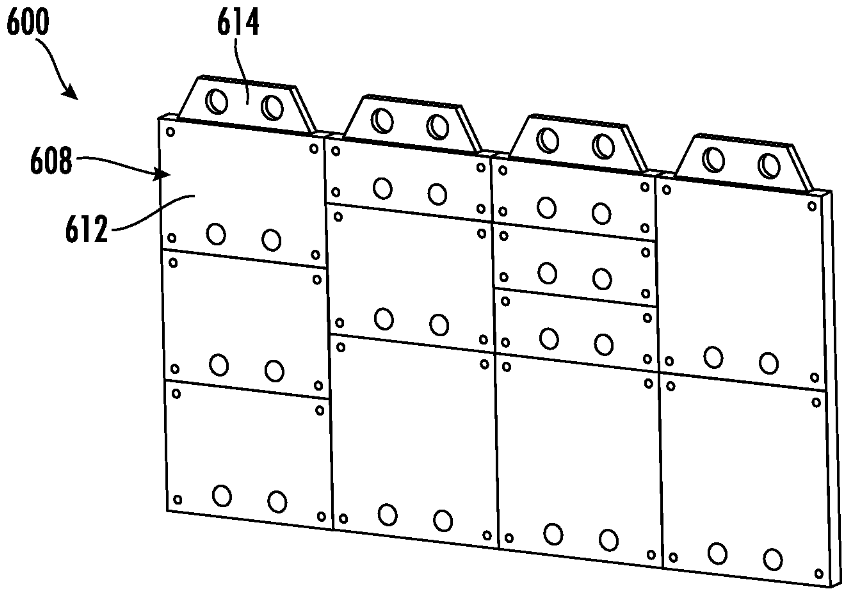
FIG. 21 is a perspective view from the front of a tool board, according to another exemplary embodiment.
Figure 22:
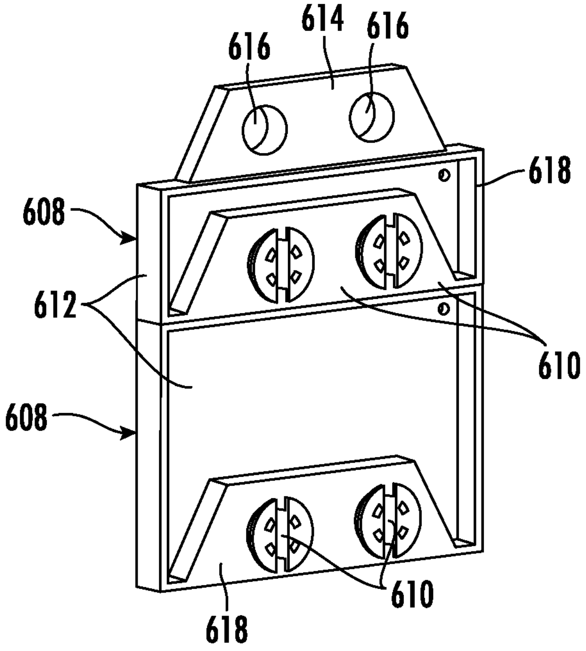
FIG. 22 is a perspective view of a portion of the tool board shown in FIG. 21, according to an exemplary embodiment.
Figure 23:
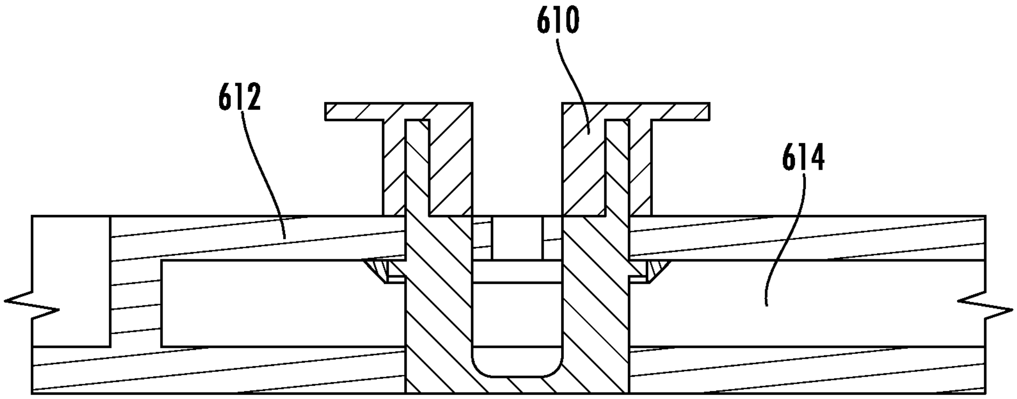
FIG. 23 is a top view of two interconnected pocket panels of the tool board shown in FIG. 21, according to an exemplary embodiment.

Referring to FIGS. 19-20, a customizable hanging tool storage device, shown as tool board 500, is shown. Tool board 500 is substantially the same as tool board 100, tool board 150, tool board 200, tool board 300, tool board 400, or tool board 450 except for the differences described herein. Tool board 500 includes a plurality of modular square pocket panels 508 releasably coupled to one another by connector components 510. Edge components 512, 514 may also couple to pocket panels 508. In specific embodiments, an edge component 512 may define openings 513 to support mounting hooks, such as bucket hooks, and/or support members to support auger bits and/or bolt cutters. In other specific embodiments, an edge component 514 may include a smaller footprint that forms a continuous surface with no defined openings. In specific embodiments, pocket panels 508 are rigid and form a snap-fit connection with connector components 510 and/or edge components 512, 514. In specific embodiments, each pocket panel is 9 inches by 9 inches and supports up to four pockets. The modular nature of the individual pocket panels 508 allows for high versatility and ready reconfiguration of the overall tool board footprint.

Figure 24:
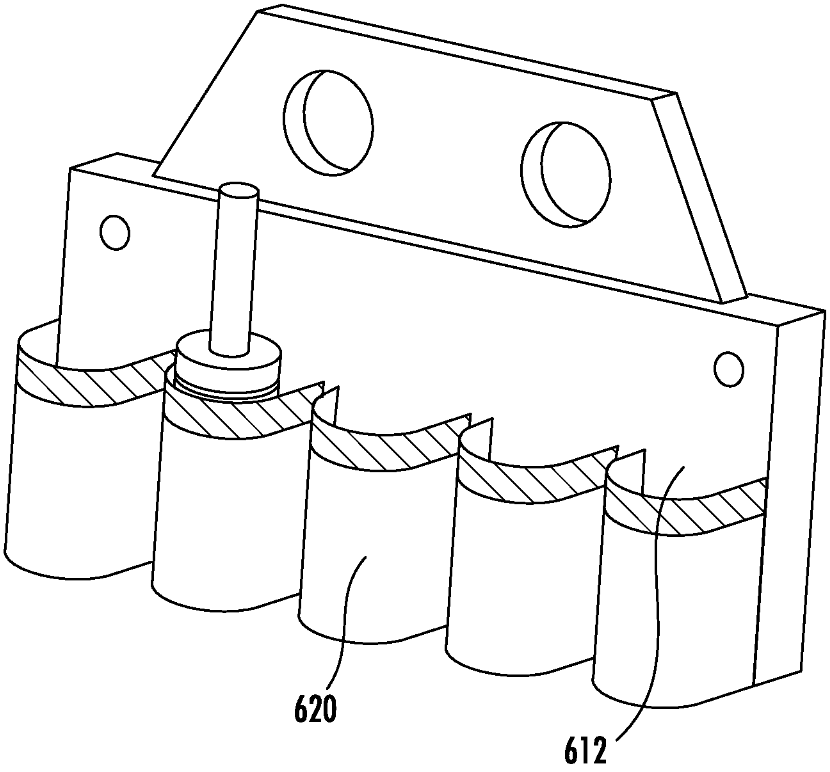
FIG. 24 is a perspective view from the front of a pocket panel of the tool board shown in FIG. 21, according to an exemplary embodiment.

Referring to FIGS. 21-24, a customizable hanging tool storage device, shown as tool board 600. Tool board 600 is substantially the same as tool board 100, tool board 150, tool board 200, tool board 300, tool board 400, tool board 450, or tool board 500 except for the differences described herein. Tool board 600 includes a plurality of rigid, modular pocket panels 608 releasably coupled to one another by connector components, specifically vertical connector pins 610. Pocket panels 608 includes a base portion 612 and an upper portion 614, which defines upper openings 616. Upper portion 614 of one pocket panel 608 may slide into an upper portion receiving slot 618 of base portion 612 of another pocket panel 608 and receive vertical connector pins 610 through openings 616, thereby detachably coupling the respective pocket panels 608 together. Alternatively, upper portion 614 may remain exposed, allowing upper openings 616 to receive mounting hooks, such as bucket hooks, to mount tool board 600 to a wall. Base portions 612 define multiple shapes and sizes, increasing the versatility with respect to the overall tool board footprint and the size and shapes of pockets that can be supported by each respective base portion 612. For example, in specific embodiments, as oriented in FIG. 21, base portions 612 vary in height between pocket panels 608 (e.g. 3-inch, 4.5-inch, 6-inch, and 9-inch base portion 612 heights). In specific embodiments, as oriented in FIG. 1, base portion 612 is 9 inches wide. One pocket configuration of pockets 620 supported by a base portion 612 is shown in FIG. 24.

Figure 25:
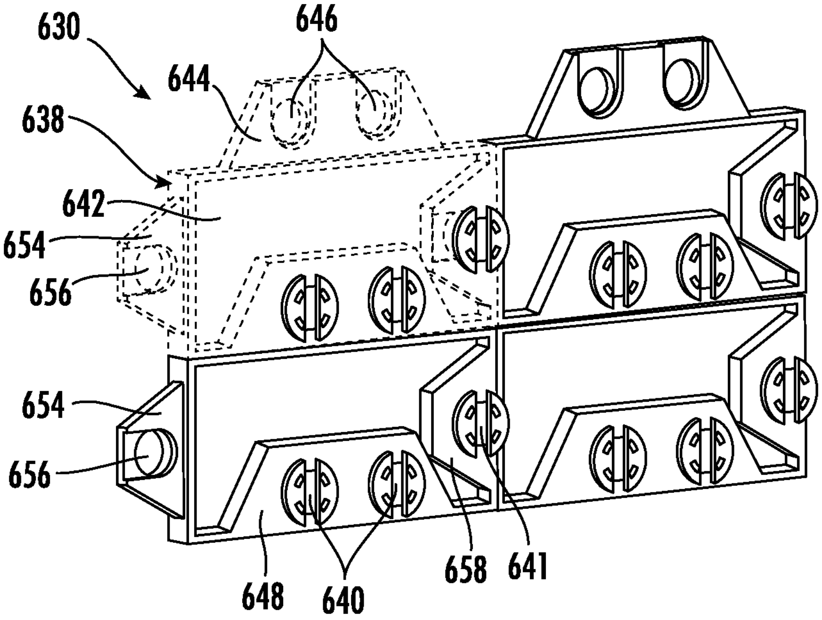
FIG. 25 is a perspective view from the rear of a tool board, according to another exemplary embodiment.

Referring to FIG. 25, a customizable hanging tool storage device, shown as tool board 630 is shown, which includes a plurality of rigid, modular pocket panels 638 releasably coupled to one another by connector components, specifically vertical connector pins 640 and horizontal connector pins 641. Tool board 630 is substantially the same as tool board 600, except for the differences described herein. Too board 630 includes a plurality of pocket panels 638 releasably coupled to one another. Pocket panels 638 includes a base portion 642 and an upper portion 644, which defines upper openings 646. Upper portion 644 of one pocket panel 638 may slide into an upper portion receiving slot 648 of base portion 642 of another pocket panel 638 and receive vertical connector pins 640 through openings 646. Alternatively, upper portion 644 may remain exposed, allowing upper openings 646 to receive mounting hooks, such as bucket hooks. As shown in FIG. 25, base portion 642 further includes a side portion 654 which defines side openings 656. Side portion 654 of one pocket panel 638 may slide into a side portion receiving slot 658 of base portion 642 of another pocket panel 638 and receive horizontal connector pin 641 through opening 656. Alternatively, side portion 654 may remain exposed, allowing side openings 656 to receive side accessories, such as auger bits and/or bolt cutter sleeves. In specific embodiments, as oriented in FIG. 25, base portions 642 are formed in multiples of 4.5-inch heights and 9-inch widths.

Figure 26:
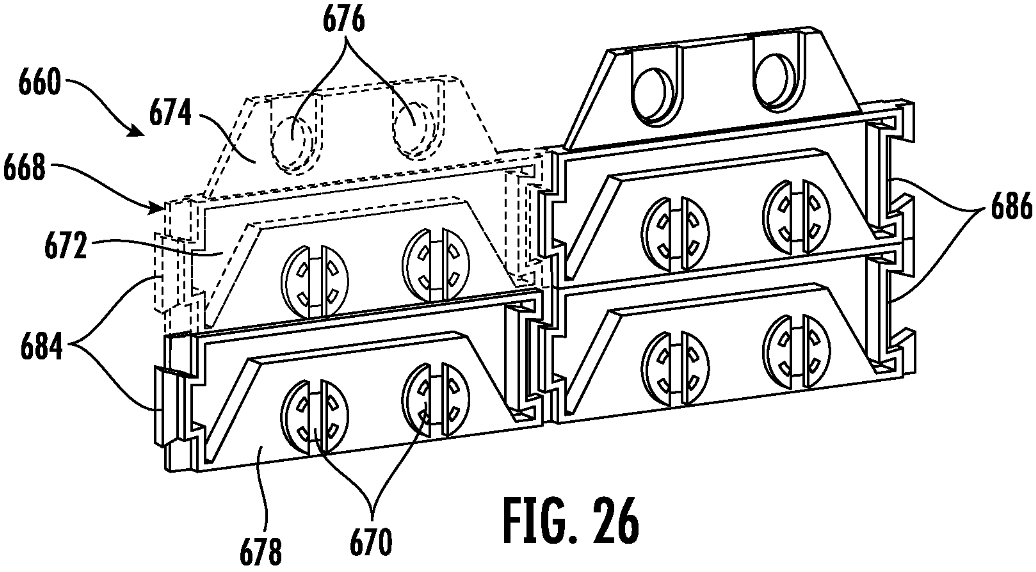
FIG. 26 is a perspective view from the rear of a tool board, according to another exemplary embodiment.

Referring to FIG. 26, a customizable hanging tool storage device, shown as tool board 660 is shown, which includes a plurality of rigid, modular pocket panels 668 releasably coupled to one another by connector components, specifically vertical connector pins 670 and male and female dovetail components 684, 686. Tool board 660 is substantially the same as tool board 600 or tool board 630, except for the differences described herein. Pocket panels 668 includes a base portion 672 and an upper portion 674, which defines upper openings 676. Upper portion 674 of one pocket panel 668 may slide into an upper portion receiving slot 678 of base portion 672 of another pocket panel 668 and receive vertical connector pins 670 through openings 676. Alternatively, upper portion 674 may remain exposed, allowing upper openings 676 to receive mounting hooks, such as bucket hooks. As shown in FIG. 26, base portion 672 further includes a male horizontal mating component, shown as male dovetail component 684, extending from a first side and a female mating component, shown as female dovetail component 686, extending from an opposing second side (specifically the left and right sides of the base portion 672, as shown in FIG. 26). As shown in FIG. 26, male dovetail component 684 mates with female dovetail component 686. Alternatively, male dovetail component 684 and/or female dovetail component 686, can remain exposed on the first and/or second side to receive side accessories, such as auger bits and/or bolt cutter sleeves. In specific embodiments, as oriented in FIG. 26, base portion 672 are formed in multiples of 3-inch heights and 9-inch widths. In various embodiments, the male dovetail component 684 and female dovetail component 686 are respectively spaced equidistantly when tool board 660 is assembled, such that side accessories can be supported by either the left or right side of the board by slightly offsetting the accessory up or down.

Figure 27:
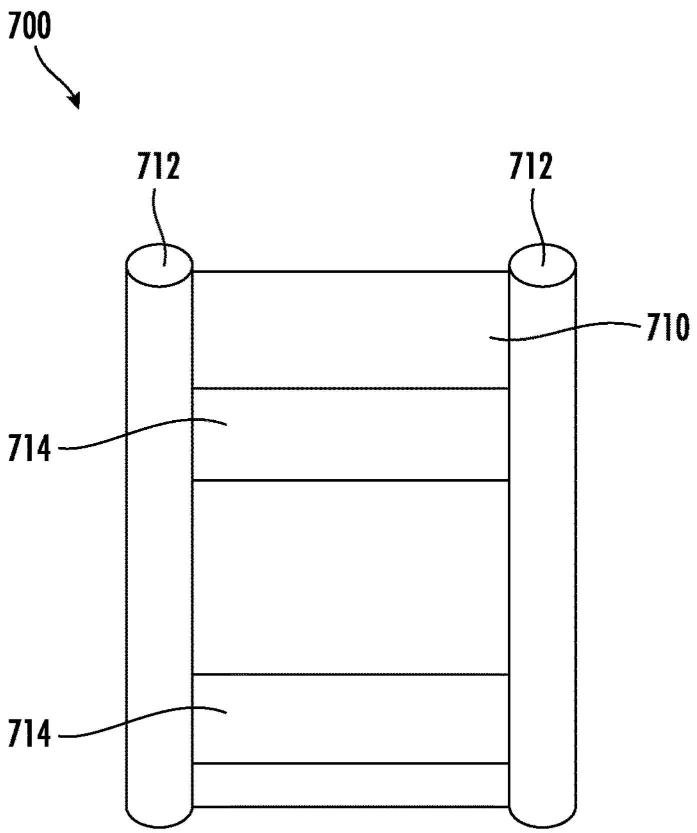
FIG. 27 is a front view of a tool board, according to another exemplary embodiment.
Figure 28:
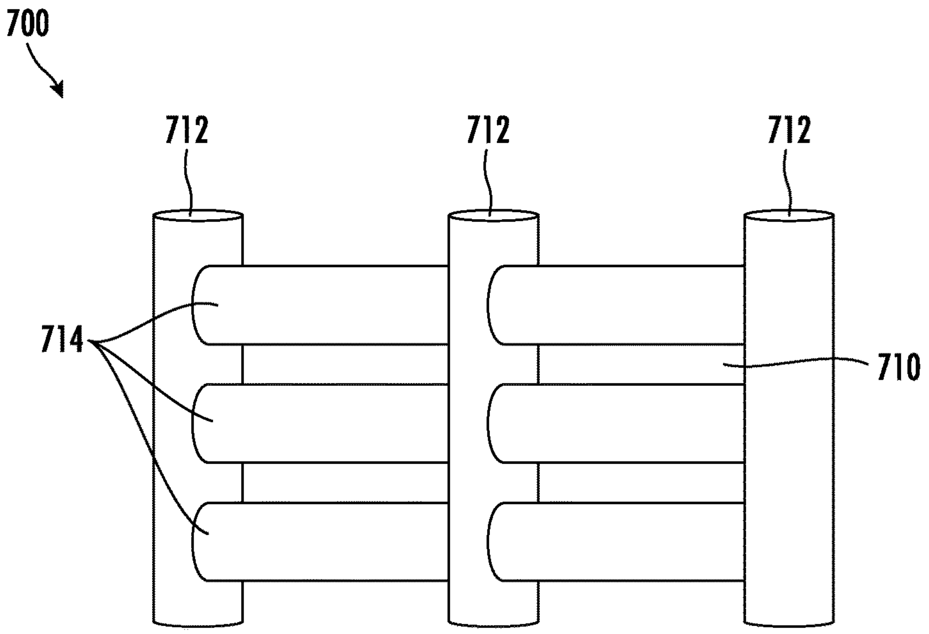
FIG. 28 is a front view of an alternate configuration of the tool board shown in FIG. 27, according to an exemplary embodiment.

Referring to FIGS. 27-28, a customizable hanging tool storage device, shown as tool board 700, is shown, which includes a semi-rigid backboard 710 supported by a plurality of rigid reinforcement components, specifically poles 712. In FIG. 27, two poles 712 are shown supporting backboard 710, and in FIG. 28, three poles 712 are shown supporting backboard 710. Increasing the number of poles 712 that support backboard 710 increases the rigidity of tool board 700. In specific embodiments, pockets 714 are woven into backboard 710 using webbing, such as molle webbing. The semi-rigid nature of backboard 710 allows backboard 710 to wrap round an interior or exterior corner, such as an interior corner of a power-utility bucket, to utilize a wider dimension of storage space with a single tool board.

Referring to FIG. 27, in a specific embodiment, tool board 700 includes at least two poles 712 extending vertically, and a plurality of backboards 710 extending horizontally between the two poles 712. The plurality of backboards extend from a first end to a second end, the first end coupled to a first pole 712 of the two poles 712, and the second end coupled to a second pole 712 of the two poles 712.

Referring to FIG. 28, in a specific embodiment, tool board 700 includes at least three poles 712 extending vertically, and a plurality of backboards 710 extending horizontally between the three poles 712. The plurality of backboards extend from a first end to a second end, the first end coupled to one of the poles 712, and the second end coupled to another of the poles 712.

Figure 29:
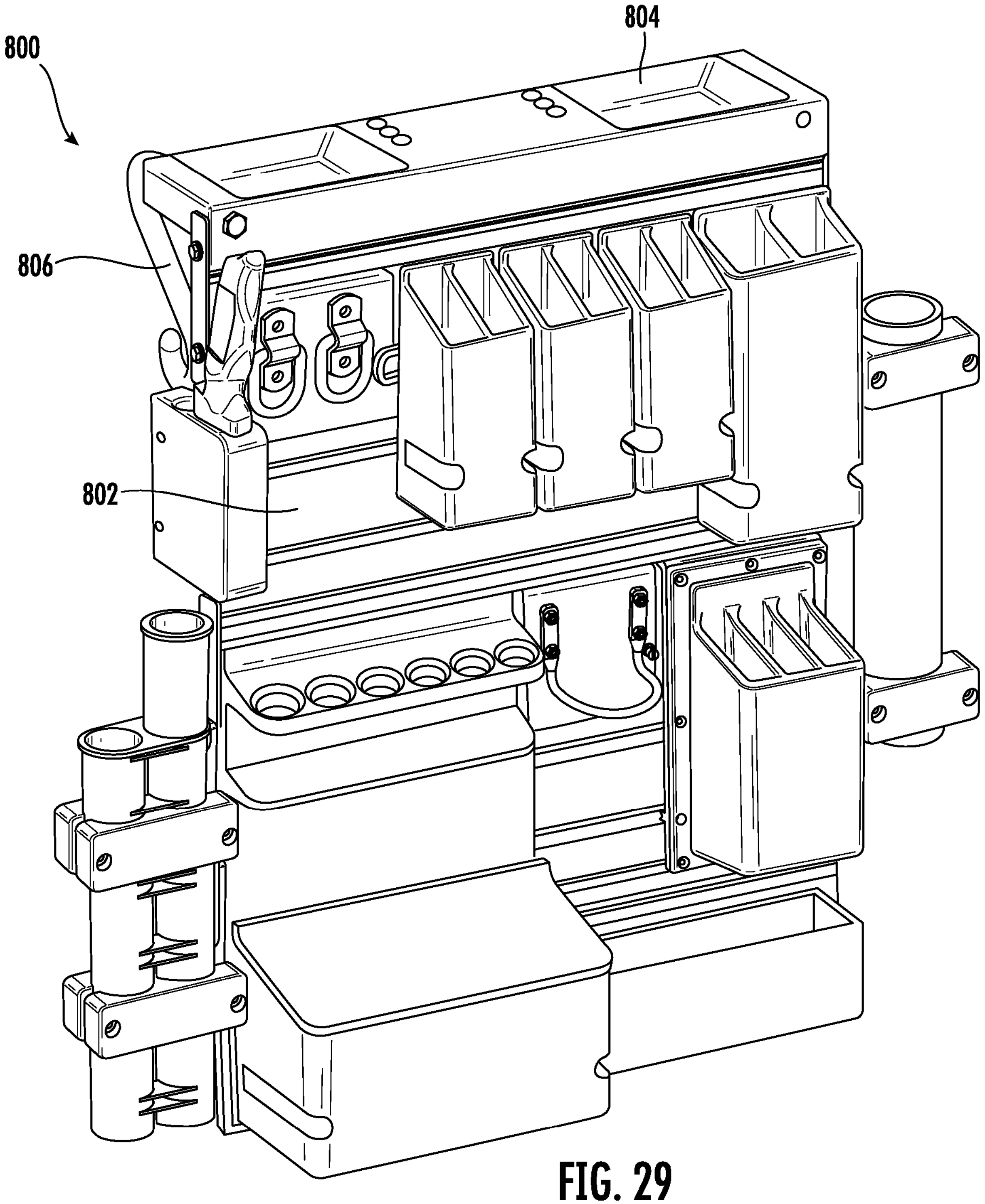
FIG. 29 is a perspective view from the front of a tool board, according to another exemplary embodiment.

FIGS. 29-51 show various embodiments of a customizable hanging tool storage device, shown as tool board 800, and various component parts thereof. Tool board 800 is substantially the same as tool board 100, tool board 1110, or tool board 1410, except for the differences described herein. Tool board 800 includes a mounting structure, shown in FIG. 29 as a base 802. In specific embodiments, base 802 is a rigid base board. As will be described in greater detail below, multiple tool board panels that include various pockets, holders, D-rings, hammer loops, etc. are coupled to base 802. The tool board panels are quickly attachable and releasable with respect to base 802, making tool board 800 readily customizable to form a variety of tool board panel configurations. As shown in FIG. 29, a tool tray 804 is coupled to an upper portion of base 802. Further, adjustable mounting mechanisms, such as bucket hook 806 are coupled to base 802. In some embodiments, the adjustable mounting mechanisms are coupled directly to base 802, while in other embodiments, the adjustable mounting mechanisms are indirectly coupled to base 802. For example, FIG. 29 shows bucket hooks 806 coupled to tool tray 804, which is then coupled to base 802. Bucket hooks 806 are configured to secure tool board 800 to a mounting edge, such as the edge of a power utility bucket.

Figure 30:
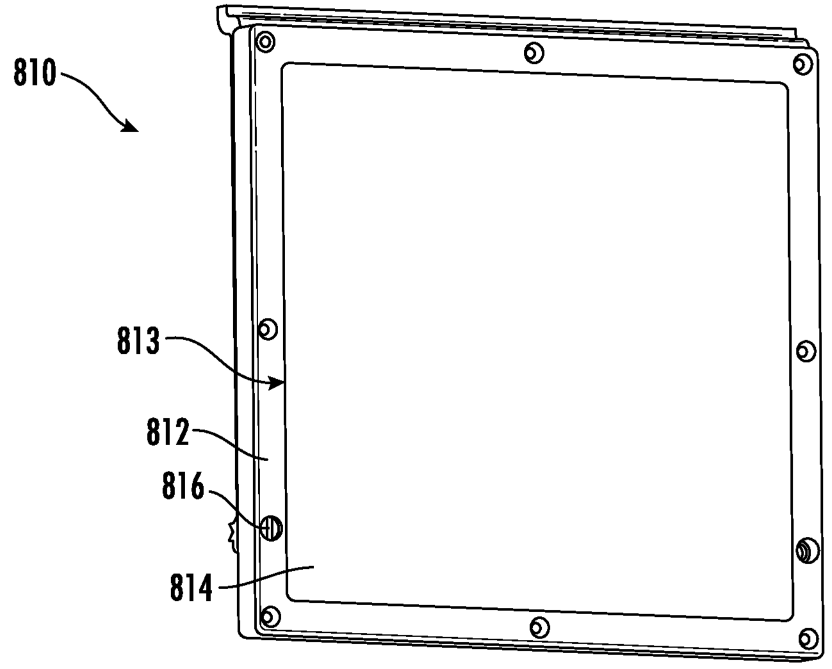
FIG. 30 is a perspective view from the front of a tool board panel with the pocket removed, according to an exemplary embodiment.
Figure 31:
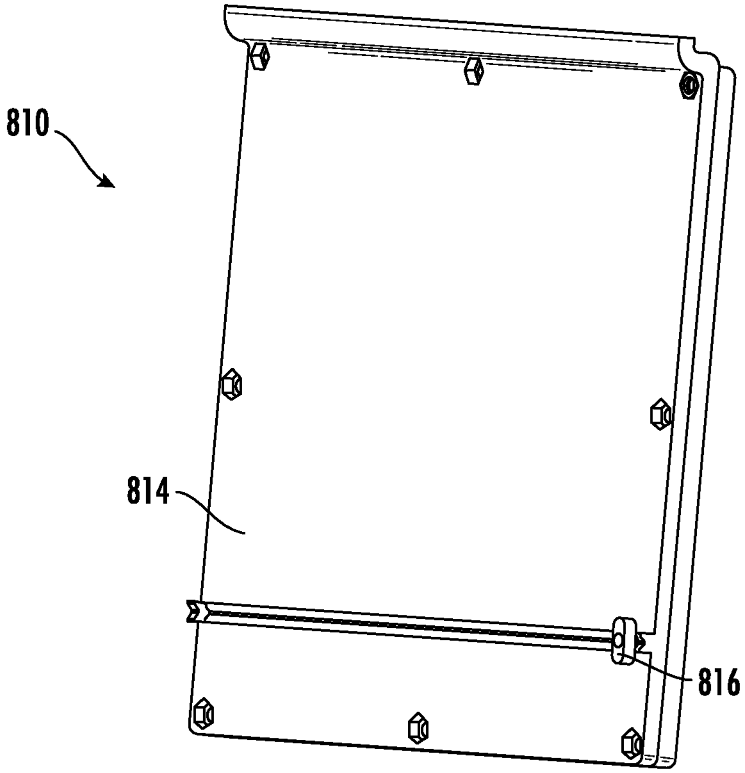
FIG. 31 is a perspective view from the rear of the tool board panel shown in FIG. 30, according to an exemplary embodiment.

FIGS. 30-31 show various views of a rigid tool board panel frame 810 that is readily attachable and releasable from base 802, shown in FIG. 29. Tool board panel frame 810 includes a front panel 812 coupled to a back panel 814. Front panel 812 forms an opening 813, through which the opening of a pocket may protrude, while one or more surrounding edges of the pocket are secured between front panel 812 and back panel 814 when back panel 814 is inserted in opening 813. To add a pocket to tool board panel frame 810, front panel 812 is decoupled from back panel 814, a pocket is positioned over the front surface of back panel 814, and front panel 812 is recoupled to back panel 814, capturing and securing a at least a portion of the pocket edge between front panel 812 and back panel 814.

Additionally, tool board panel frame 810 includes a locking mechanism 816 that promotes ready customization, construction, and deconstruction of a tool board, such as tool board 800, shown in FIG. 29. In the field, it can be convenient to quickly rearrange the type and placement of tool board panels on a given tool board based on the needs of a given job. It can also be convenient to remove all or some of the tool board panels from the tool board mounting structure for storage purposes after completing a given job and then to efficiently reassemble the tool board in an appropriate configuration upon arriving at the next job. As will be described in greater detail below, locking mechanism 816 can transition tool board panel frame 810 into and/or out of a secured position with respect to base 802 with a quick quarter or 90-degree turn.

Figure 32:
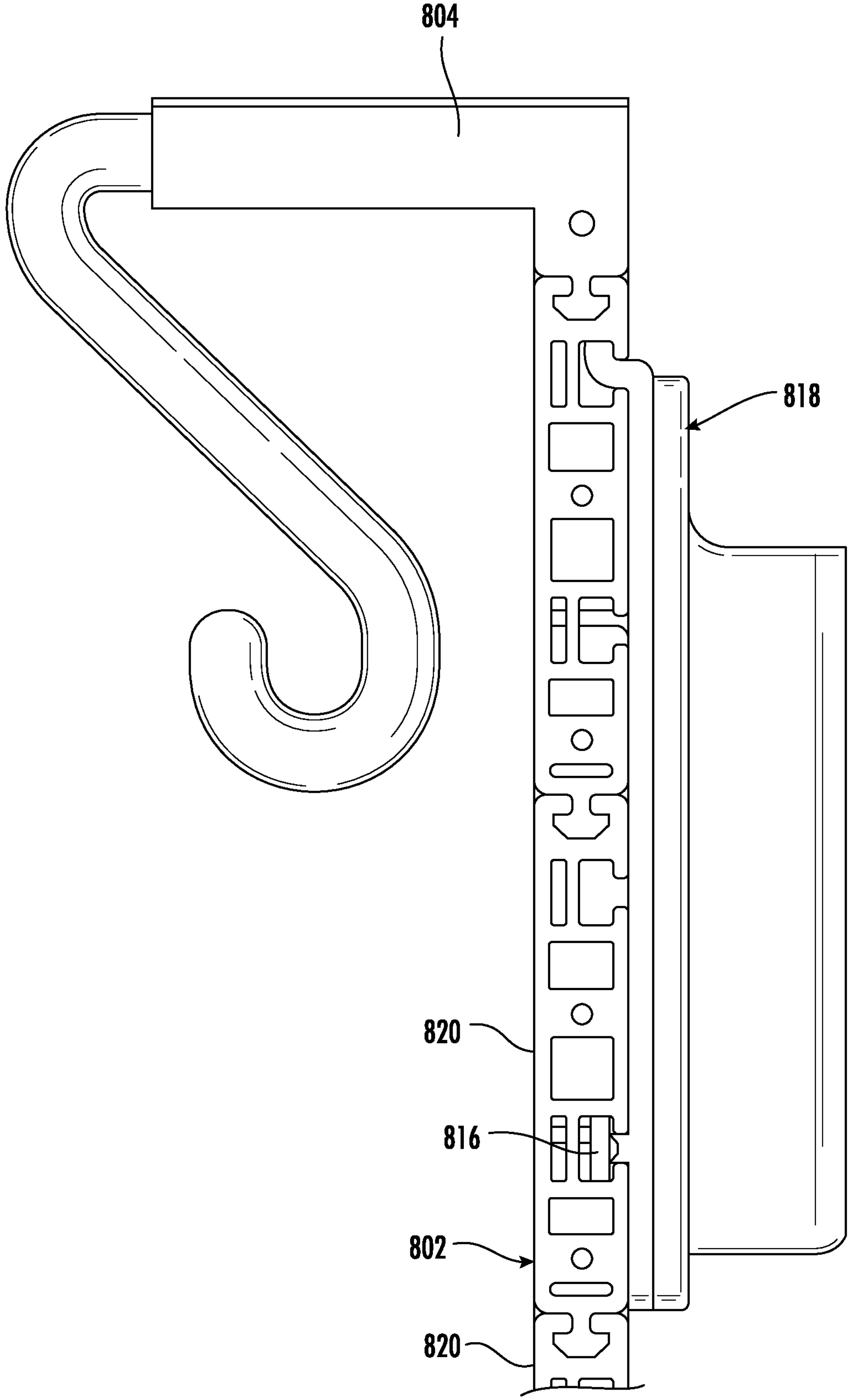
FIG. 32 is a side view of a portion of a tool board, according to another exemplary embodiment.

Referring to FIG. 32, a tool board panel 818 is shown attached to a portion of base 802. As shown in FIG. 32, base 802 is formed by a plurality of modular base members 820 that mate with one another in substantially the same manner as base members 210 described above. As such, the height of tool board 800 is readily customizable by adding or removing modular base members 820 until the desired height is achieved, for example, to fit the height of a given power utility bucket and to meet the storage needs of the user. Tool tray 804 similarly mates with the uppermost base member 820.

Figure 34:
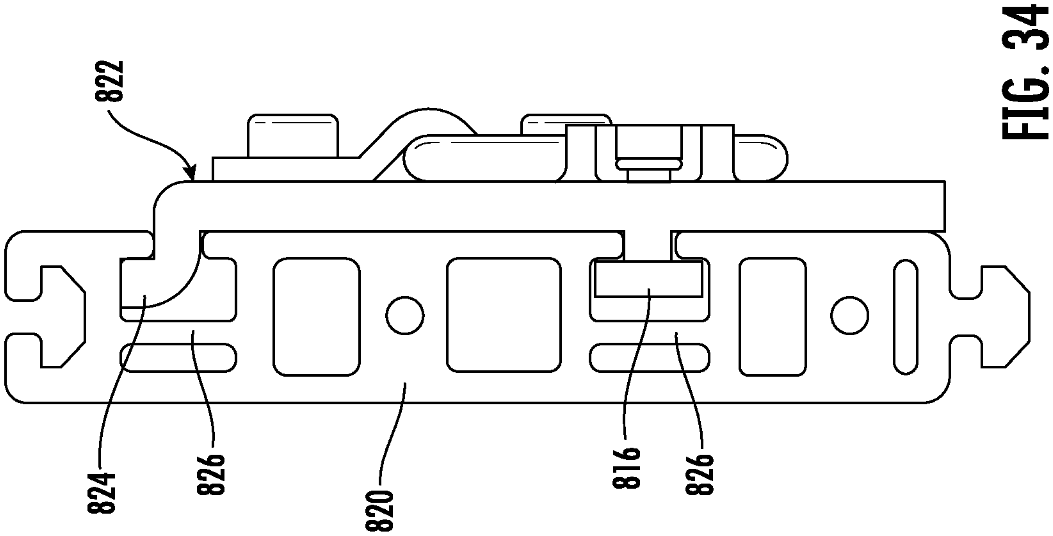
FIG. 34 is a side view of the tool board portion shown in FIG. 33, with the tool board panel secured in an engaged position, according to an exemplary embodiment.
Figure 33:
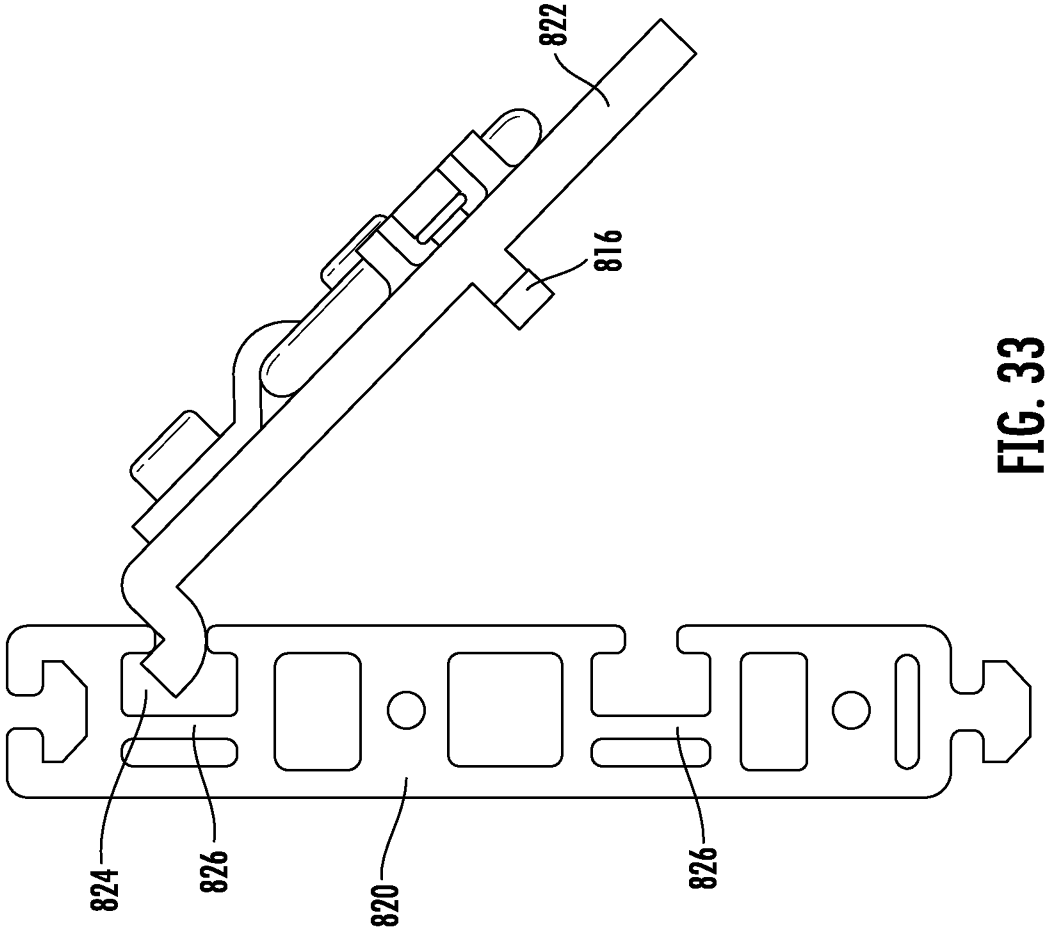
FIG. 33 is a side view of a portion of a tool board, showing the tool board panel in a disengaged position, according to another exemplary embodiment.
Figure 35:
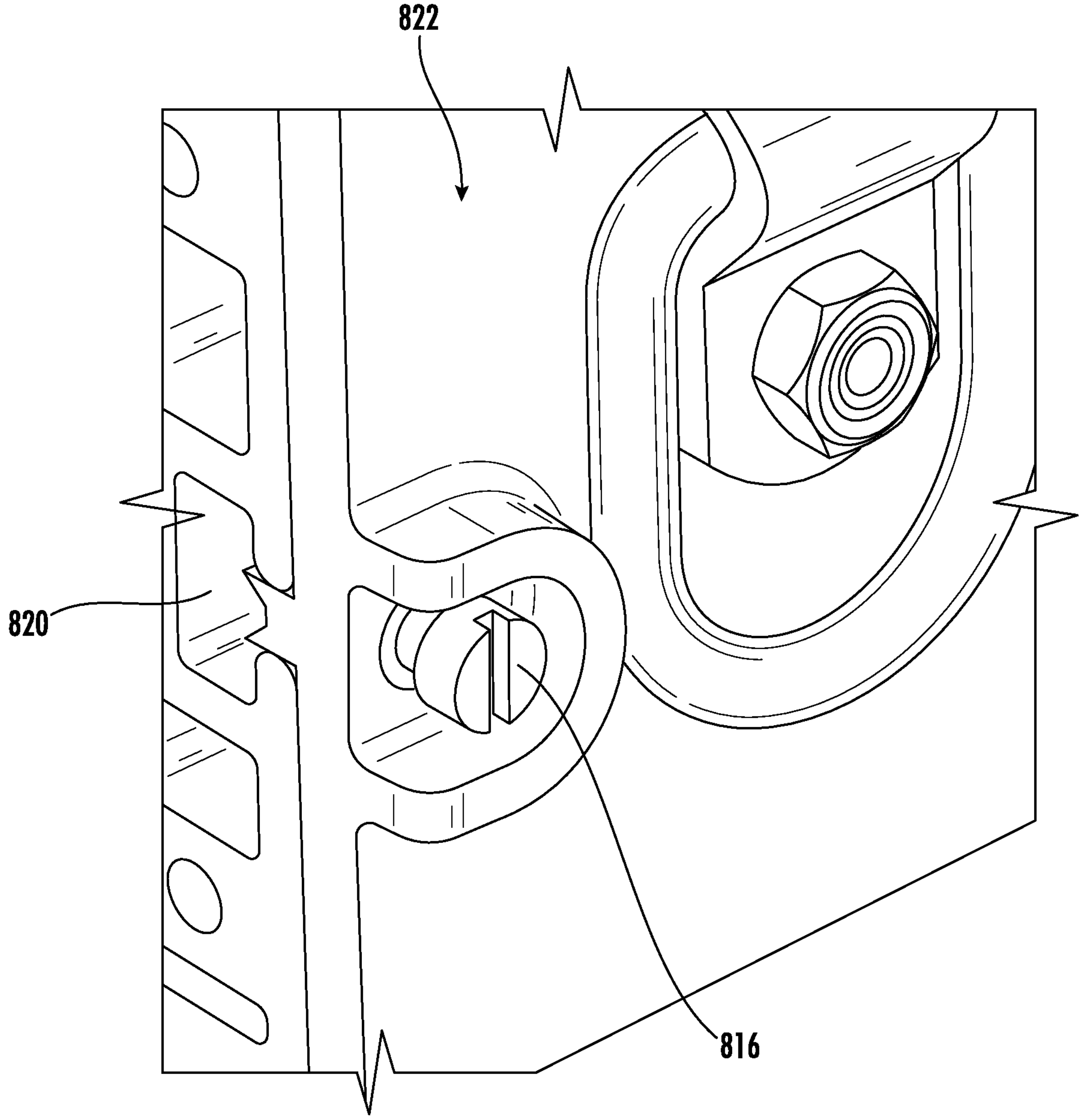
FIG. 35 is a detailed perspective view from the front of the locking mechanism of the tool board panel shown in FIG. 34, according to an exemplary embodiment.

FIGS. 33-35 show the process of securing a tool board panel, such as tool board panel 822, to a base member 820. In specific embodiments, each base member 820 includes a plurality of grooves 826 configured to receive various parts of a tool board panel, such as tool board panel 822. As shown in FIG. 33, an upper portion of tool board panel 822 includes a mating portion, specifically an integrally formed hook 824, that slides into a corresponding groove 826 when a lower portion of tool board panel 822 is still disengaged from base member 820. Once hook 824 is engaged with groove 826, the lower end of tool board panel 822 is rotated toward base member 820. At this time, locking mechanism 816 is oriented such as to align with and enter an opening in a corresponding groove 826 as tool board panel 822 is brought into alignment with base member 820. Locking mechanism 816 may then be turned one quarter turn or 90 degrees to quickly achieve an orientation that secures at least a portion of locking mechanism 816 within corresponding groove 826, as shown in FIG. 34. In FIG. 34, tool board panel 822 in shown in a securely engaged position with base member 820.

In certain specific embodiments, the groove 826 that corresponds to hook 824 and the groove 826 the corresponds to locking mechanism 816 may be positioned on the same base member 820, as shown in FIG. 34, or on different base members 820, as shown in FIG. 32, depending on the height of the tool board panel being secured relative to the height of base members 820. Referring to FIG. 35, in specific embodiments, rotation of locking mechanism 816 may be accomplished, for example, by application of a standard tool, such as a flathead screwdriver.

Figure 36:
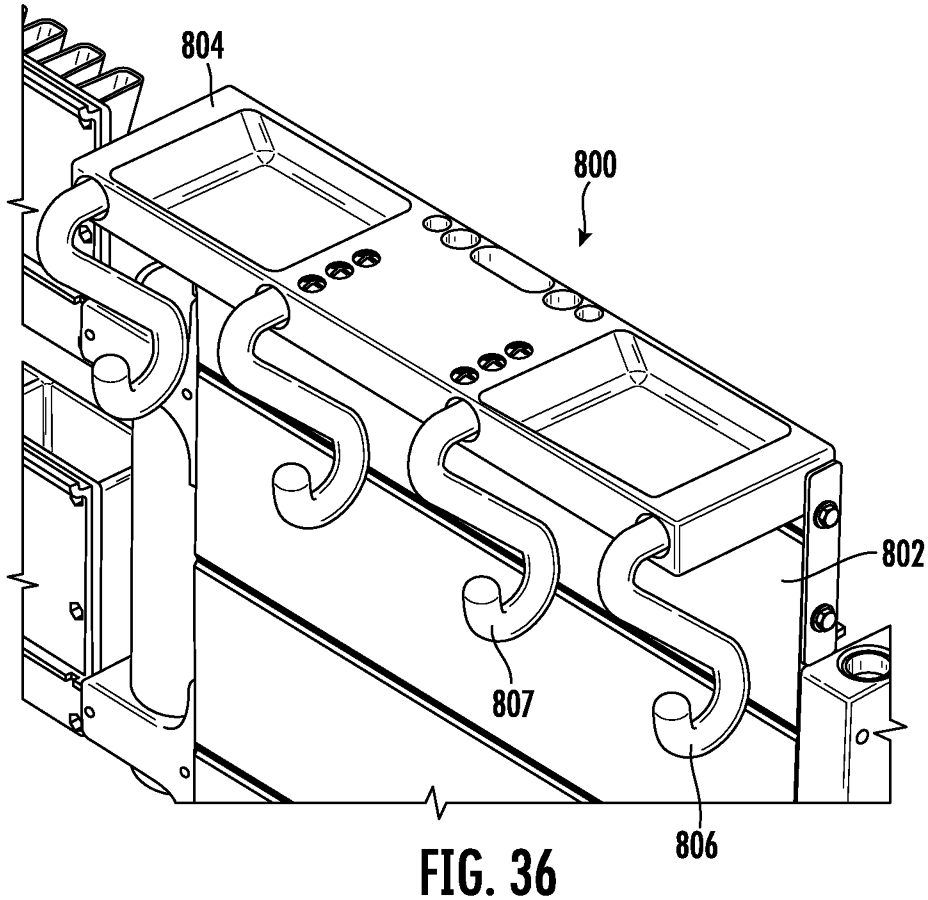
FIG. 36 is a perspective view from the rear of an upper portion of the tool board shown in FIG. 29, according to an exemplary embodiment.
Figure 37:
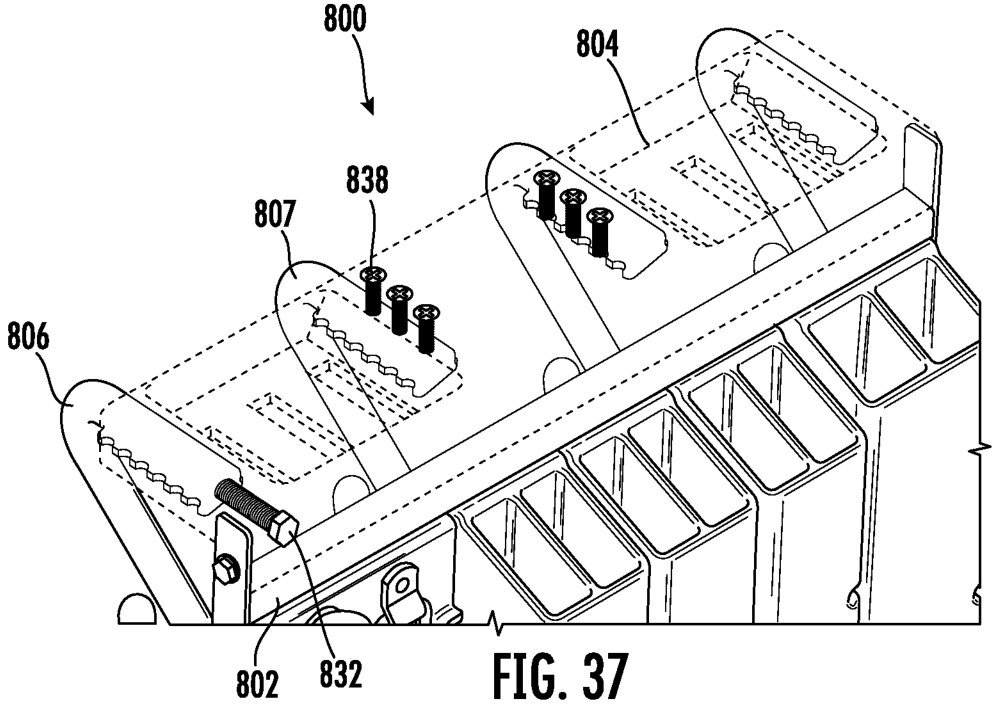
FIG. 37 is a perspective view from the front of an upper portion of the tool board shown in FIG. 29, according to an exemplary embodiment.

Referring to FIGS. 36-39, various views of bucket hooks 806, 807 are shown. As shown in FIGS. 36-37, bucket hooks 806, 807 are coupled to tool tray 804, such that bucket hooks 806, 807 may be laterally adjusted with respect to tool tray 804. This allows the gap formed between bucket hooks 806, 807 and base 802 to be readily adjusted to accommodate for varying wall thickness and/or lip dimensions of various power utility buckets and to allow for bucket hooks 806, 807 to be at least partially secured underneath at least a portion of a power utility bucket lip.

Figure 38:
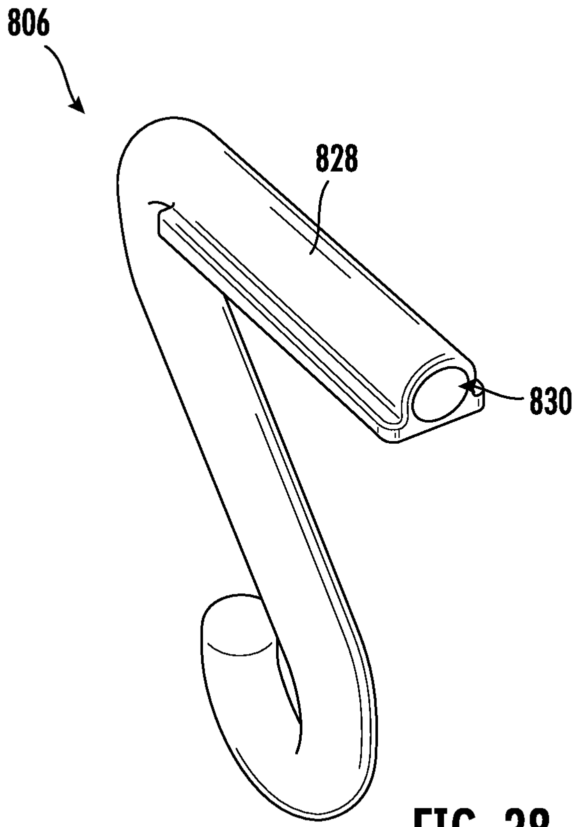
FIG. 38 is a perspective view of a bucket hook of the tool board shown in FIG. 37, according to an exemplary embodiment.

Referring to FIG. 38, bucket hook 806 has an upper portion 828 that is received by an opening formed in tool tray 804. In specific embodiments, a threaded opening 830 is formed at an open end of upper portion 828. As shown in FIG. 37, when upper portion 828 is inserted into the corresponding opening of tool tray 804, a threaded fastener 832 is received by an opposite end of the opening in tool tray 804 and is mated with threaded opening 830. The diameter of the head of threaded fastener 832 is wider than the opening in tool tray 804 into which the neck of threaded fastener 832 is inserted. As such, rotation of threaded fastener 832 that draws threaded fastener 832 further within threaded opening 830 results in bucket hook 806 being drawn closer to base 802. Oppositely, rotation of threaded fastener 832 that draws fastener 832 further out of threaded opening 830 allows bucket hook 806 to be drawn further away from base 802.

Figure 39:
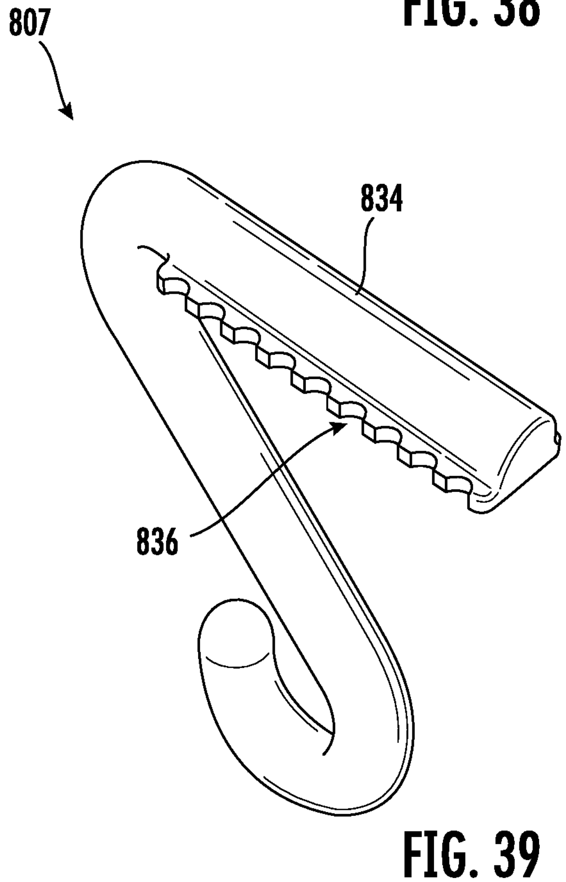
FIG. 39 is a perspective view of another bucket hook of the tool board shown in FIG. 37, according to an exemplary embodiment.

Referring to FIG. 39, bucket hook 807 has an upper portion 834 that is received by another opening formed in tool tray 804 (See FIGS. 36-37). At least one side of upper portion 834 forms a plurality of receiving grooves 836. Referring to FIG. 37, when upper portion 834 is inserted within the corresponding opening of tool tray 804 and bucket hook 807 is spaced a desired distance from base 802, one or more fasteners 838 are mated with both tool tray 804 and a respective receiving groove 836 of upper portion 834 to secure bucket hook 807 in the desired lateral position with respect to base 802.

Figure 40:
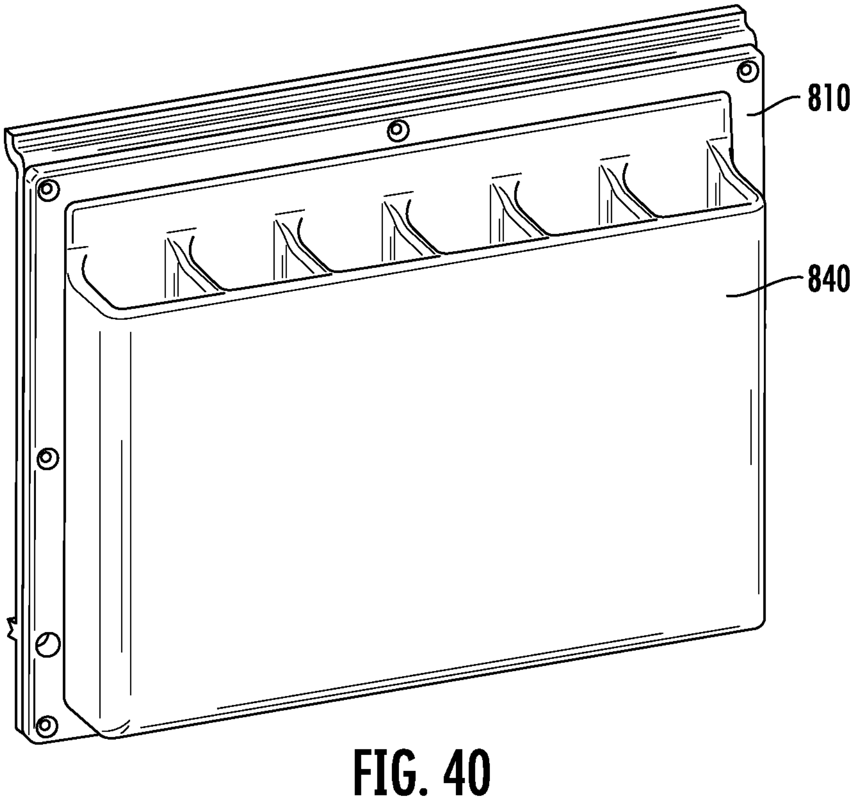
FIG. 40 is a perspective view of a tool board panel, according to an exemplary embodiment.
Figure 41:
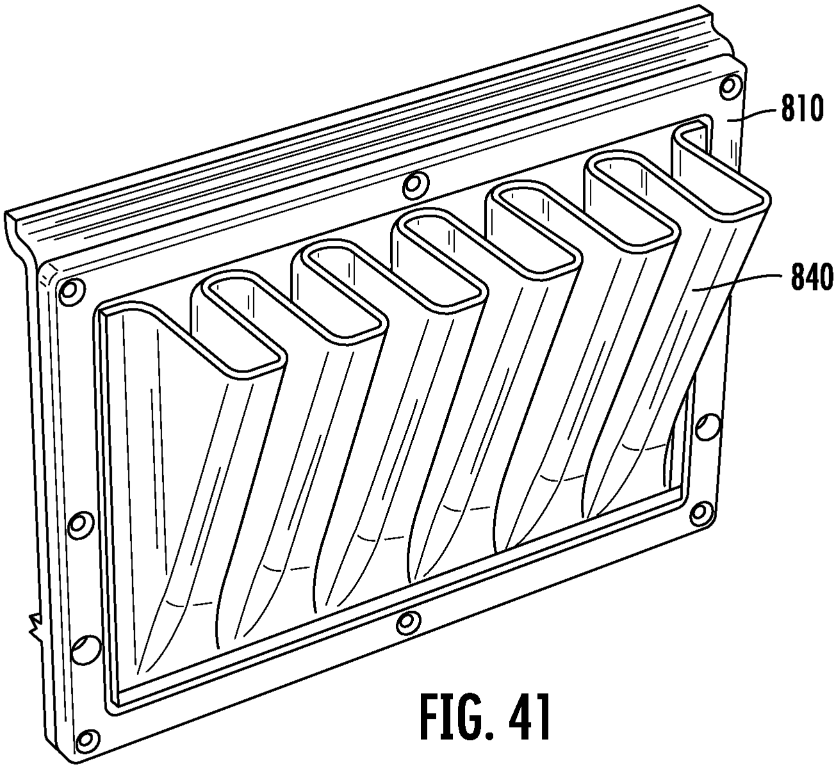
FIG. 41 is a perspective view of another tool board panel, according to an exemplary embodiment.
Figure 42:
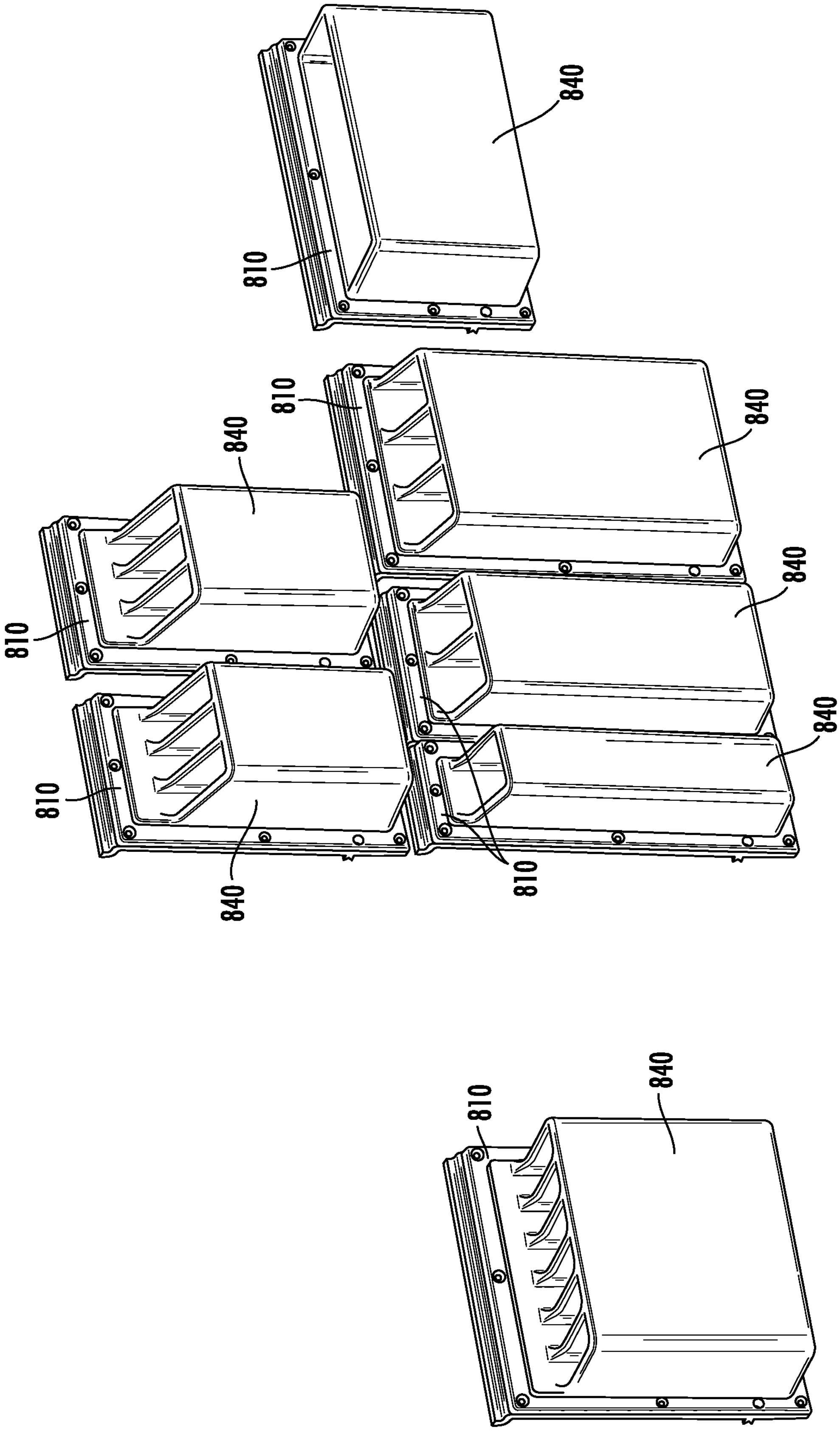
FIG. 42 is a perspective view of various tool board panels, according to an exemplary embodiment.
Figure 43:
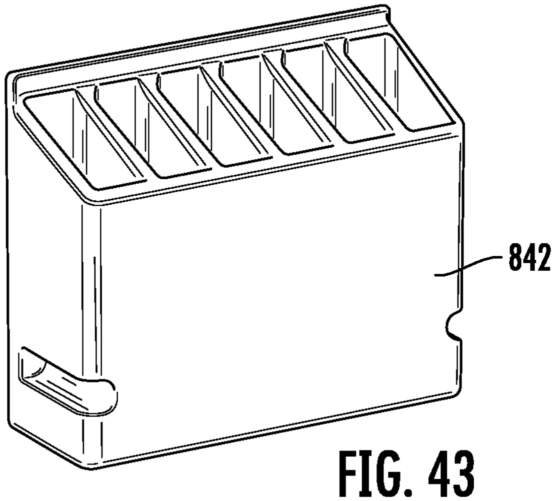
FIG. 43 is a perspective view of another tool board panel, according to an exemplary embodiment.
Figure 44:
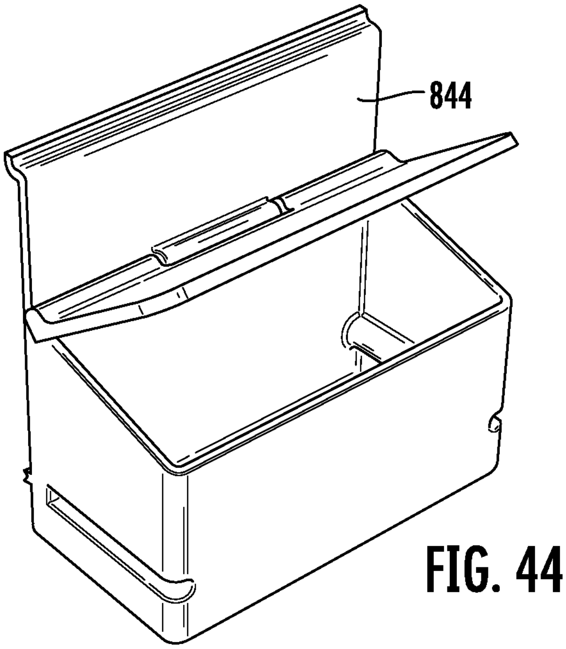
FIG. 44 is a perspective view of another tool board panel, according to an exemplary embodiment.
Figure 45:
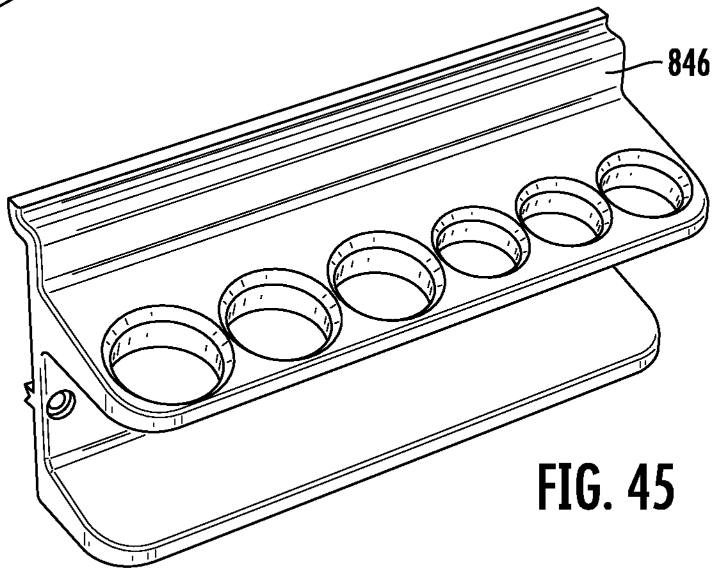
FIG. 45 is a perspective view of another tool board panel, according to an exemplary embodiment.
Figure 46:
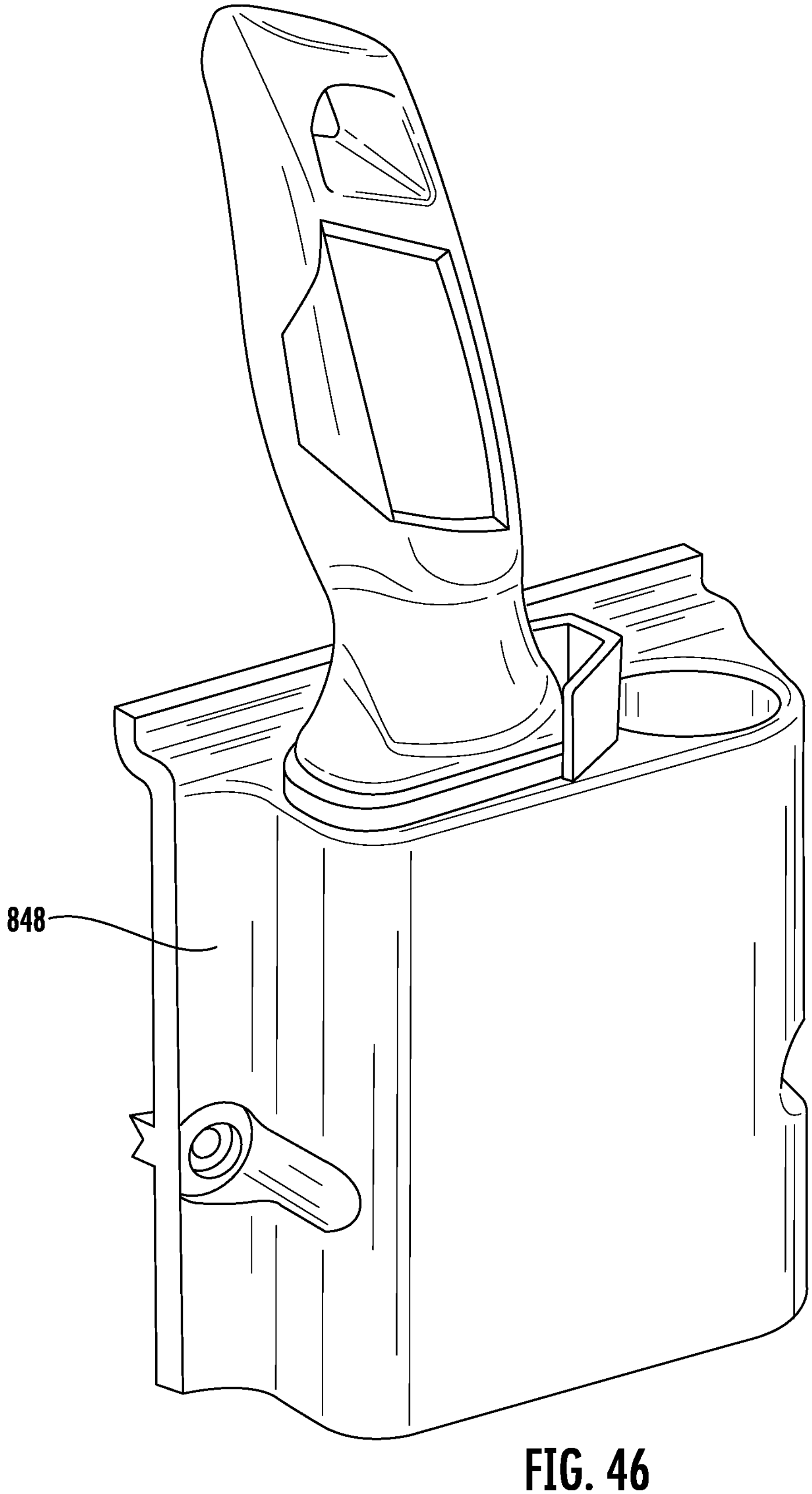
FIG. 46 is a perspective view of another tool board panel, according to an exemplary embodiment.
Figure 47:
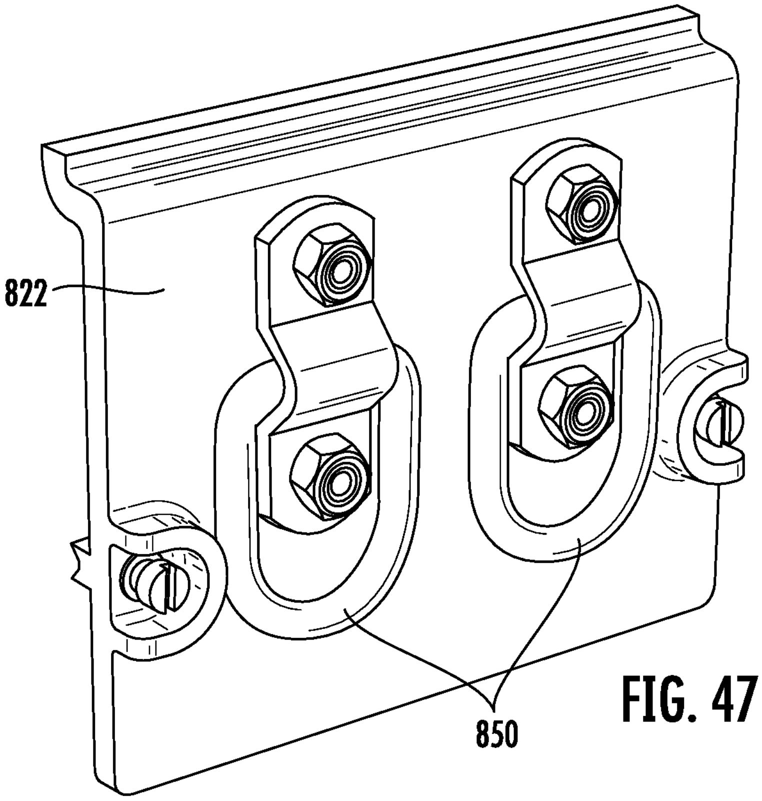
FIG. 47 is a perspective view of another tool board panel, according to an exemplary embodiment.
Figure 48:
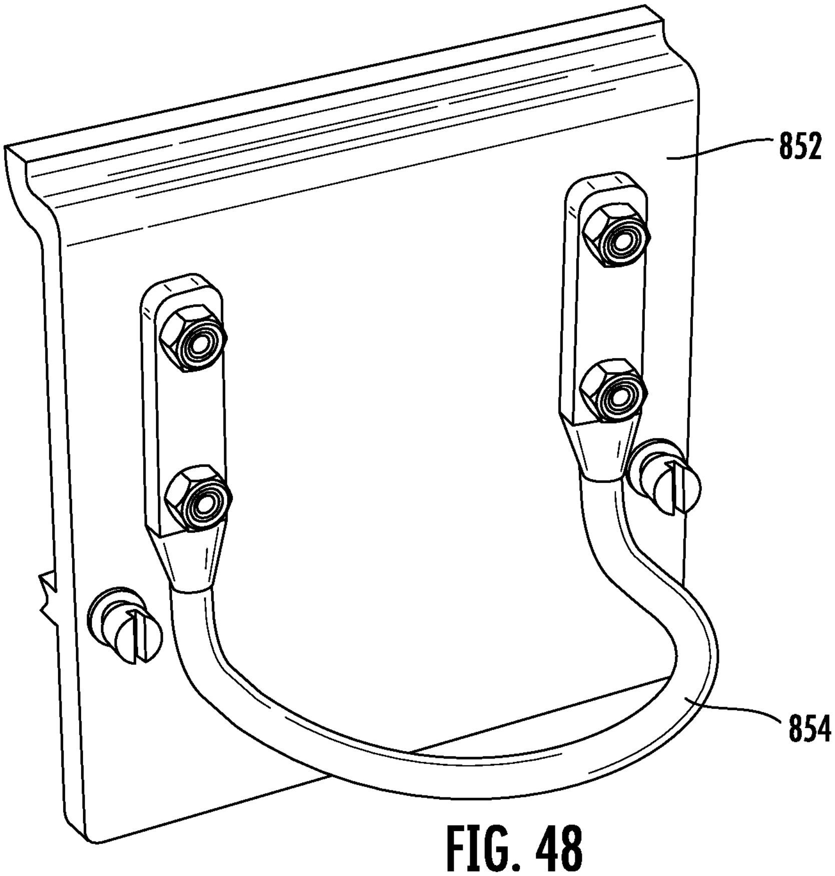
FIG. 48 is a perspective view of another tool board panel, according to an exemplary embodiment.
Figure 49:
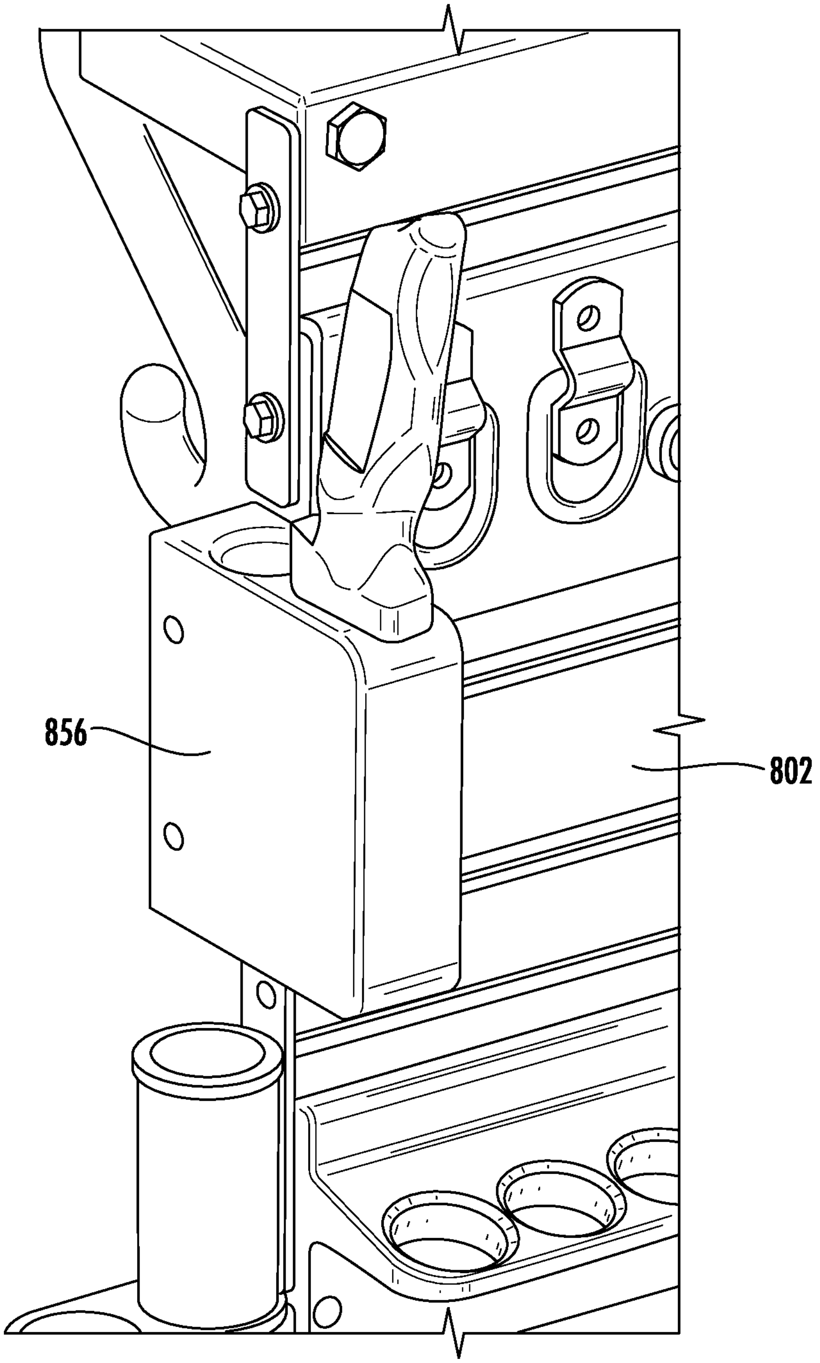
FIG. 49 is a perspective view from the front of a side portion of the tool board shown in FIG. 29, according to an exemplary embodiment.

FIGS. 40-48 show various embodiments of tool board panels that may be readily applied to and removed from base 802 in the manner described above, with respect to tool board panel 822. Referring to FIGS. 40-42, a variety of tool board panels are shown that include a rigid tool board panel frame 810 that secures a pocket 840. In specific embodiments, the pockets 840 each comprised of a non-conductive, semi-rigid material, such as silicone. In more specific embodiment, the pocket is formed from the non-conductive, semi-rigid material such that an inner surface defining a pocket compartment is entirely formed from the non-conductive, semi-rigid material. The use of a semi-rigid material allows the compartments formed by the pocket to generally maintain a given shape for ready insertion and replacement of tools without the pocket collapsing in on itself or otherwise deforming in the absence of a tool or other component to maintain its shape. In other specific embodiments, pockets 840 may be comprised of fabric or other known pocket materials.

Referring to FIGS. 43-48, other embodiments of tool board panels are shown. For example, tool board panel 842 forms a rigid slotted compartment. Tool board panel 844 forms a lidded toolbox. Tool board panel 846 forms a rigid socket holder, portions of which may be magnetized for additional retention. Tool board panel 848 forms rigid knife and screwdriver holders. Tool board panel 822 supports one or more D-ring holders 850. Tool board panel 852 supports a hammer loop 854.

Figure 50:
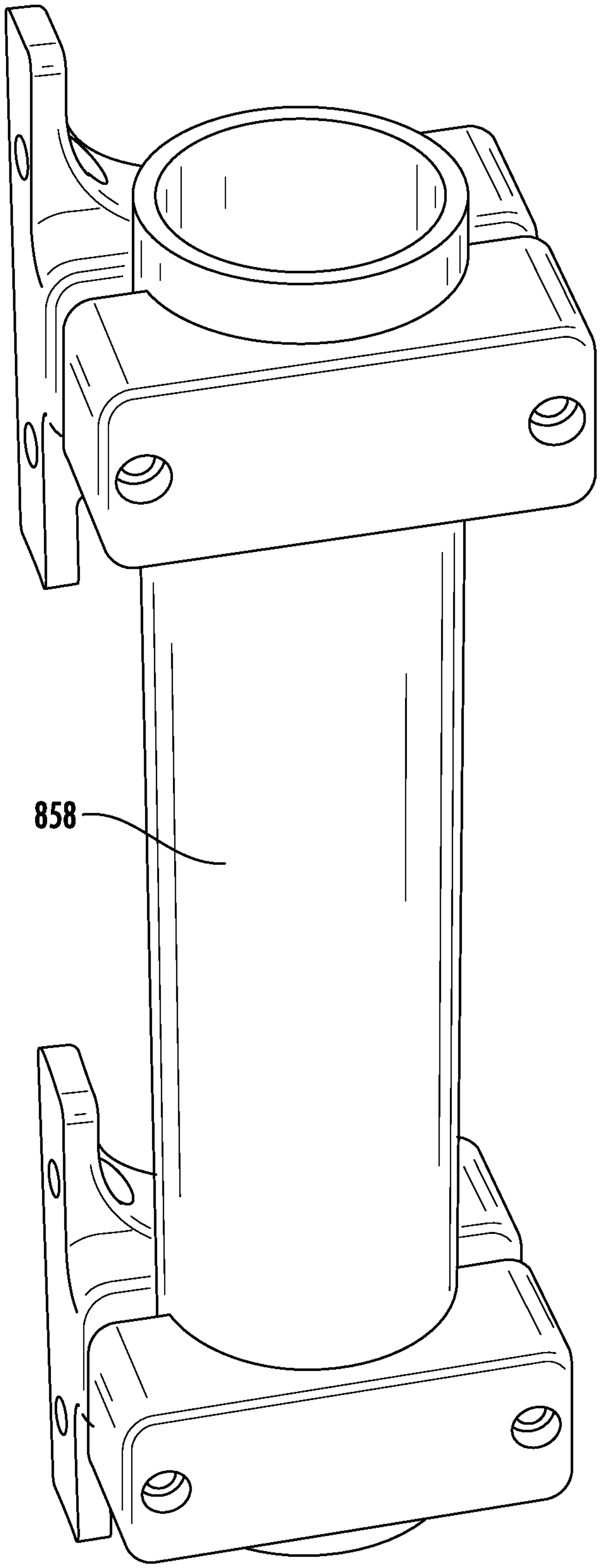
FIG. 50 is a perspective view of a bolt cutter holder, according to an exemplary embodiment.
Figure 51:
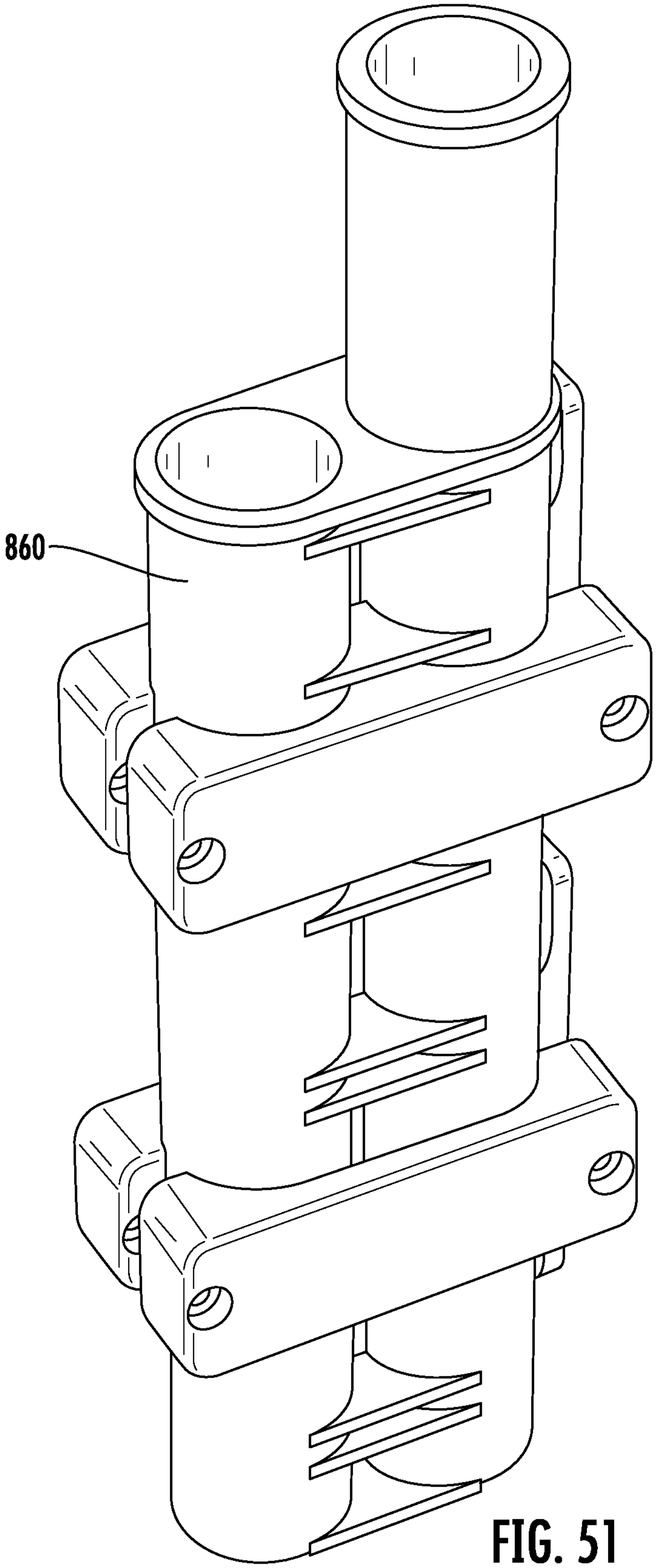
FIG. 51 is a perspective view of an auger bit holder, according to an exemplary embodiment.

Additionally, various attachments can couple to the side of base 802, for example, by threaded fasteners or other temporary fastening means. FIG. 29 shows a knife and screwdriver holder 856 coupled to base 802 in such a manner. Referring to FIGS. 50 and 51, a bolt cutter holder 858 and/or an auger bit holder 860 may be similarly coupled to the side of base 802.

Figure 52:
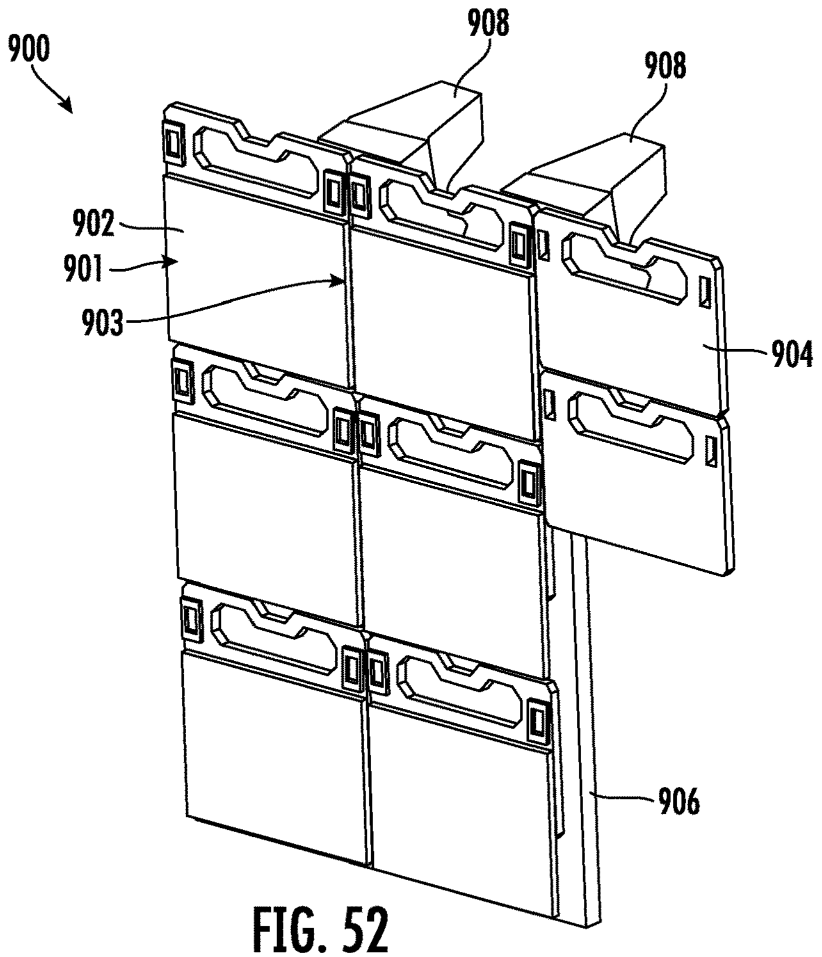
FIG. 52 is a perspective view from the front of a tool board, according to another exemplary embodiment.

FIGS. 52-60 show various embodiments of a customizable hanging tool storage device, shown as tool board 900, and various component parts thereof. Tool board 900 is substantially the same as tool board 300, except for the differences described herein. As shown in FIG. 52, a plurality of tool board panels, such as tool board panels 902 and 904, are releasably coupled to a plurality of mounting structures, shown as rails 906, to form a substantially planar board surface. In specific embodiments, tool board panels 902, 904 may form various shapes and sizes. For example, a series of tool board panels may be generally rectangular with a variety of dimensions to meet various pocket or support needs, such as 9"×6," 9"×9," and 9"×12" dimensions. Tool board panels 902, 904, shown in FIG. 52, are configured to support pockets as described above with respect to tool board 800, though the pockets are removed in this view.

An adjustable mounting mechanism, shown as bucket hook 908, is coupled to each rail 906, opposite the respective tool board panels 902, 904. Bucket hooks 908 are configured to mount and/or secure tool board 900 to a mounting edge, such as the edge of a power utility bucket.

In various embodiments, tool board 900 includes one or more bucket hooks 908, which are configured to couple to a wall of a structure, such as a wall of a utility bucket. Tool board 900 further includes one or more rails 906, each of which are directly coupled to one of the bucket hooks. Tool board 900 further includes a plurality of tool board panels (e.g., panels 902 and/or panels 904). The tool board panels extending horizontally from a first end 901 to a second end 903, at least one of first end 901 and second end 903 is coupled to one of the one or more rails 906.

In a specific embodiment, tool board 900 includes two bucket hooks 908 and two rails 906, and each of the rails 906 is directly coupled to one of the bucket hooks 908. A first plurality of panels 902 are coupled to each of the rails 906 thereby extending between the rails 906 and indirectly coupling the two bucket hooks 908. Tool board 900 includes a second plurality of panels coupled to exactly one of the hooks 908, thereby extending away from the other of the hooks 908.

Figure 53:
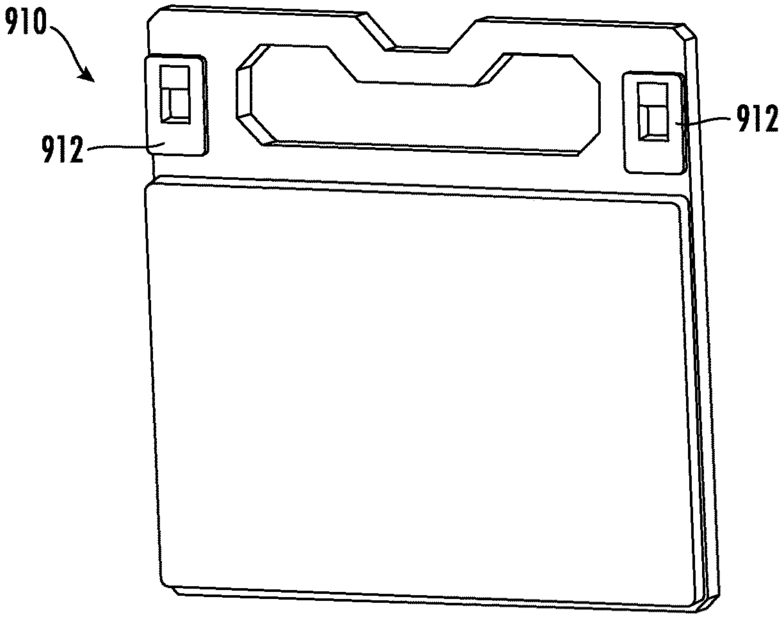
FIG. 53 is a perspective view from the front of a tool board panel of the tool board shown in FIG. 52, according to an exemplary embodiment.

FIG. 53 shows tool board panel 902 with the accompanying pocket removed to show greater detail of a rigid tool board panel frame 910, which is substantially similar to tool board panel frame 810, except for the differences described herein. As shown in FIG. 53, a quick-release locking mechanism 912 is coupled to each upper corner of tool board panel frame 910. Quick-release locking mechanism 912 may be readily actuatable by the grip of a user's fingers to quickly apply or remove a given tool board panel from tool board 900.

Figure 54:
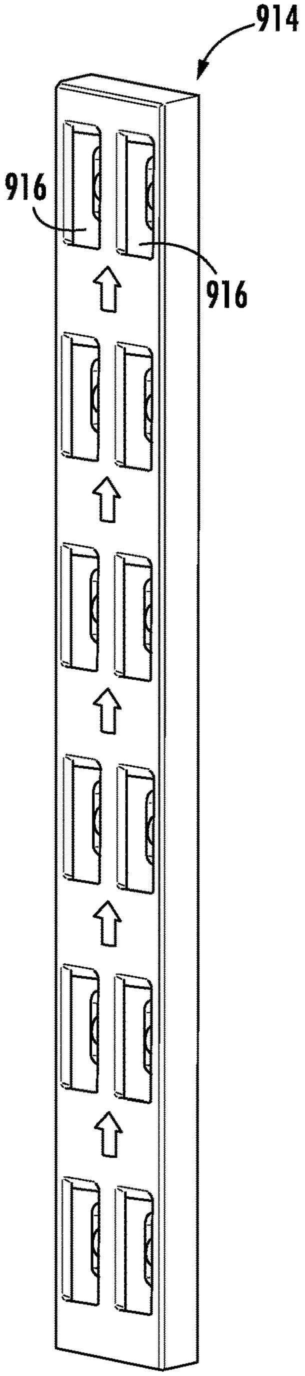
FIG. 54 is a perspective view from the front of a tool board rail, according to an exemplary embodiment.

FIG. 54 shows a substantially vertical rail 914, which includes pairs of vertically spaced mounting locations 916. Each mounting location 916 is configured to secure a locking mechanism of a tool board panel (e.g., tool board panel 902, tool board panel 904). In certain specific embodiments, mounting locations 916 are spaced at 3-inch increments, though in other specific embodiments, other spacing increments are applied based on the dimensions of the corresponding tool board panels. In various embodiments, tool board 900 includes rails 914 and/or rails 906.

Figure 56:
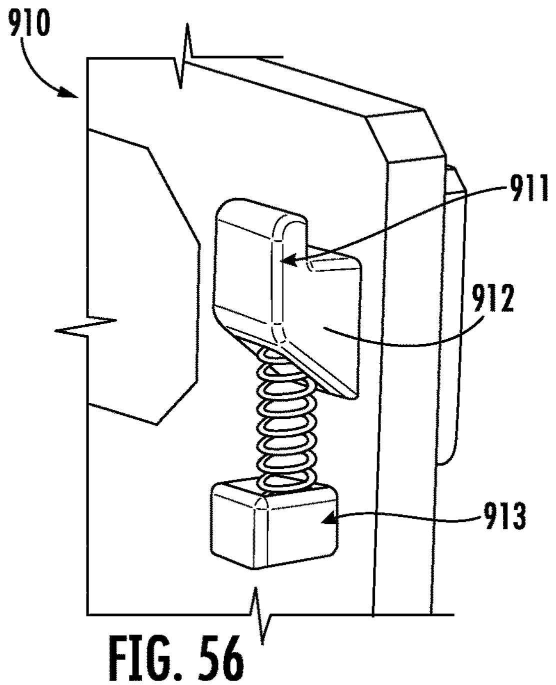
FIG. 56 is a detailed perspective view from the rear of the locking mechanism of the tool board panel shown in FIG. 53, according to an exemplary embodiment.
Figure 55:
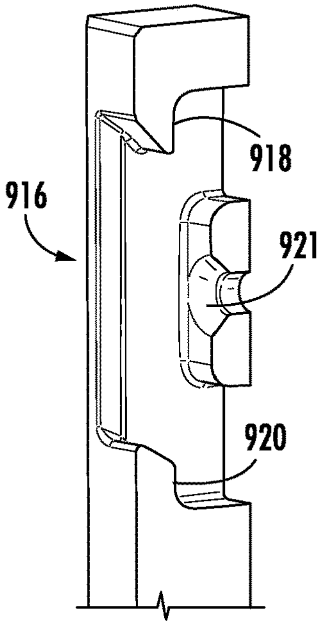
FIG. 55 is a detailed perspective cross-sectional view from the side of a portion of the rail shown in FIG. 54, according to an exemplary embodiment.
Figure 57:
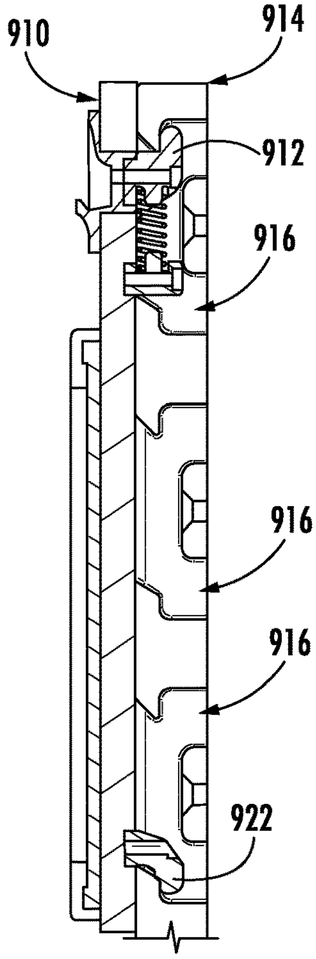
FIG. 57 is a cross-sectional view from the side of a portion of the tool board shown in FIG. 52, according to an exemplary embodiment.

Referring to FIG. 55, each mounting location 916 includes an upper mating ledge 918 and a lower mating edge 920, as well as a mating element 921. FIGS. 56-57 show quick-release locking mechanism and 912 and a static locking mechanism 922 in greater detail. Static locking mechanism 922 is coupled to each lower corner of tool board panel frame 910. Referring to FIG. 57, when tool board panel frame 910 is secured to rail 914, quick-release locking mechanism 912 is secured between upper mating ledge 918 and lower mating edge 920 of a first mounting location 916, while static locking mechanism 922 is secured against lower mounting edge 920 of a second mating location 916 (e.g., lower than the first mounting location 916). Quick-release locking mechanism 912 includes base 911, which interfaces against upper mating ledge 918, and actuating portion 913, which interfaces against lower mating edge 920.

Figure 58:
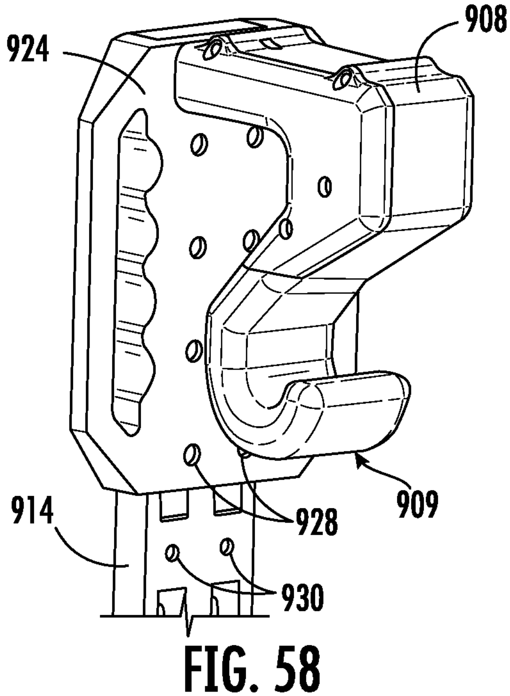
FIG. 58 is a perspective view from the rear of a bucket hook mounted to the rail shown in FIG. 54, according to an exemplary embodiment.
Figure 59:
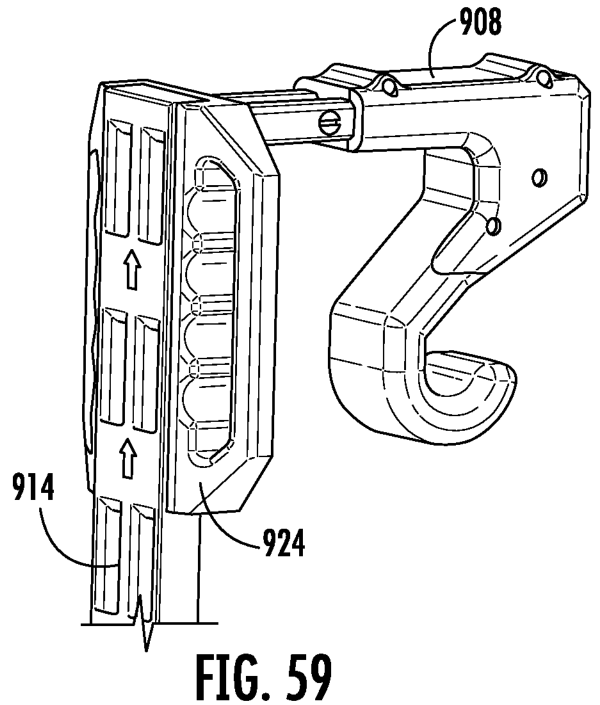
FIG. 59 is a perspective view from the front of the mounted bucket hook shown in FIG. 58, according to an exemplary embodiment.
Figure 60:
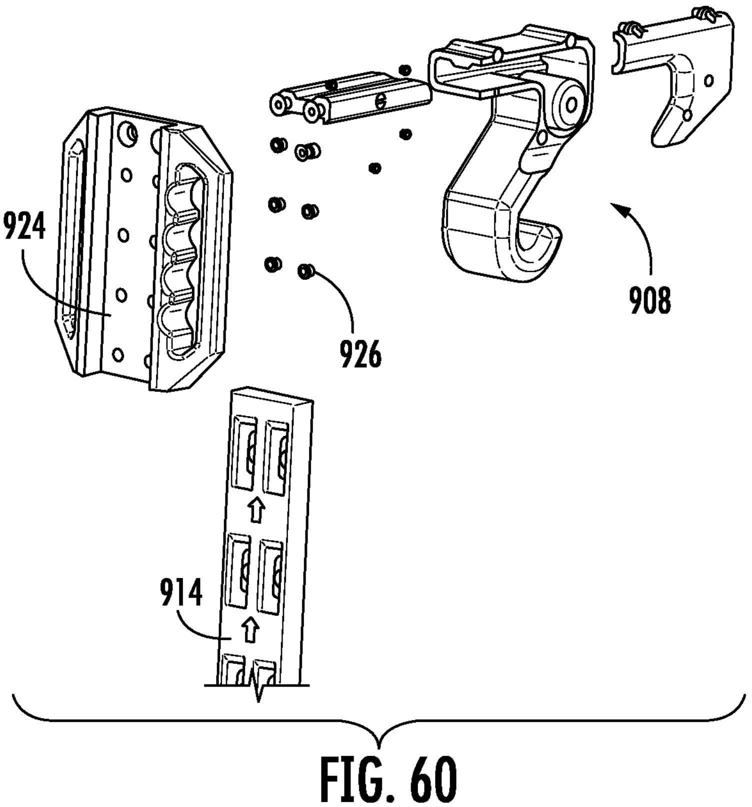
FIG. 60 is an exploded view from the front of the mounted bucket hook shown in FIG. 58, according to an exemplary embodiment.

FIGS. 58-60 show bucket hook 908 adjustably coupled to rail 914. In specific embodiments, bucket hook 908 is both vertically and laterally adjustable, specifically adjustable higher or lower and/or nearer or farther relative to rail 914. As shown in FIGS. 58-60, bucket hook 908 is coupled to a mounting plate 924, and mounting plate 924 is coupled to rail 914. End 909 of bucket hook 908 is spring-biased in a direction toward mounting plate 924. When applied to a mounting edge, such as the edge of a power utility bucket, the user may draw end 909 of bucket hook 908 away from mounting plate 924 to create a sufficient gap to accommodate the thickness of the bucket wall and/or a lip protruding from the mounting edge, and then release end 909 of bucket hook 908, allowing it to clamp against the mounting edge, such that tool board 900 is secured to the wall of the power utility bucket.

To accommodate for variations in height between different power utility buckets that may be used to support tool board 900 across various job sites, bucket hook 908 is also height adjustable with respect to rail 914. As shown in FIGS. 58-60, mounting plate 924 is coupled to rail 914 by a plurality of fasteners 926. Rail 914 includes a plurality of mounting locations positioned at varying heights. Should a user desire to lower bucket hook 908 with respect to rail 914, for example, to accommodate for a shallower power utility bucket, mounting plate 924 can be unmounted from rail 914 by loosening fasteners 926 and remounted to rail 914 at a lower mounting location. For example, with reference to FIG. 58, mounting plate 924 could be repositioned such that mounting holes 928 are fastened to mounting holes 930 of rail 914 by two of the fasteners 926.

FIGS. 61-66 show various embodiments of a customizable hanging tool storage device, shown as tool board 1000, and various component parts thereof. Tool board 1000 is substantially the same as tool board 100, except for the differences described herein. Tool board 1000 includes first outer panel 1002 and second outer panel 1034 coupled to opposing sides of an intermediate panel 1004. First outer panel 1002 includes a first aperture, shown as grommet 1010, extending through first outer panel 1002, a first rear surface 1030 and an opposing first front surface 1032. Second outer panel 1034 includes a second aperture, shown as grommet 1009, extending through second outer panel 1034, a second rear surface 1036 and an opposing second front surface 1038. Second outer panel 1034 is coupled to first outer panel 1002 such that first outer panel 1002 and second outer panel 1034 actuate between a folded position (e.g., FIG. 66) and an unfolded position (e.g., FIG. 65). In specific embodiments, intermediate panel 1004 pivotably connects first outer panel 1002 and second outer panel 1034 such that the first outer panel 1002 and second outer panel 1034 can be pivoted to a plurality of positions with respect to one another, such as actuating between a folded position and an unfolded position. In certain specific embodiments, the width 1080 of intermediate panel 1004 is less than 25% of the width 1082 of first outer panel 1002 and second outer panel 1034. In various embodiments, intermediate panel 1004 is formed from a first fabric. In various embodiments, first outer panel 1002 and second outer panel 1034 is formed from the same first fabric as intermediate panel 1004.

Various support structures, shown as pockets 1006, are adjustably coupled to first outer panel 1002 and second outer panel 1034. For example, a first plurality of pockets 1006 are coupled to first outer panel 1002, and a second plurality of pockets 1006 are coupled to second outer panel 1034. The position of pockets 1006 is customizable, and pockets 1006 may be selected and arranged to meet the needs of a user in each given job. Additionally, in specific embodiments, additional tool holsters 1014 are coupled to an outer edges of one or both of first outer panel 1002 and second outer panel 1034.

Figure 61:
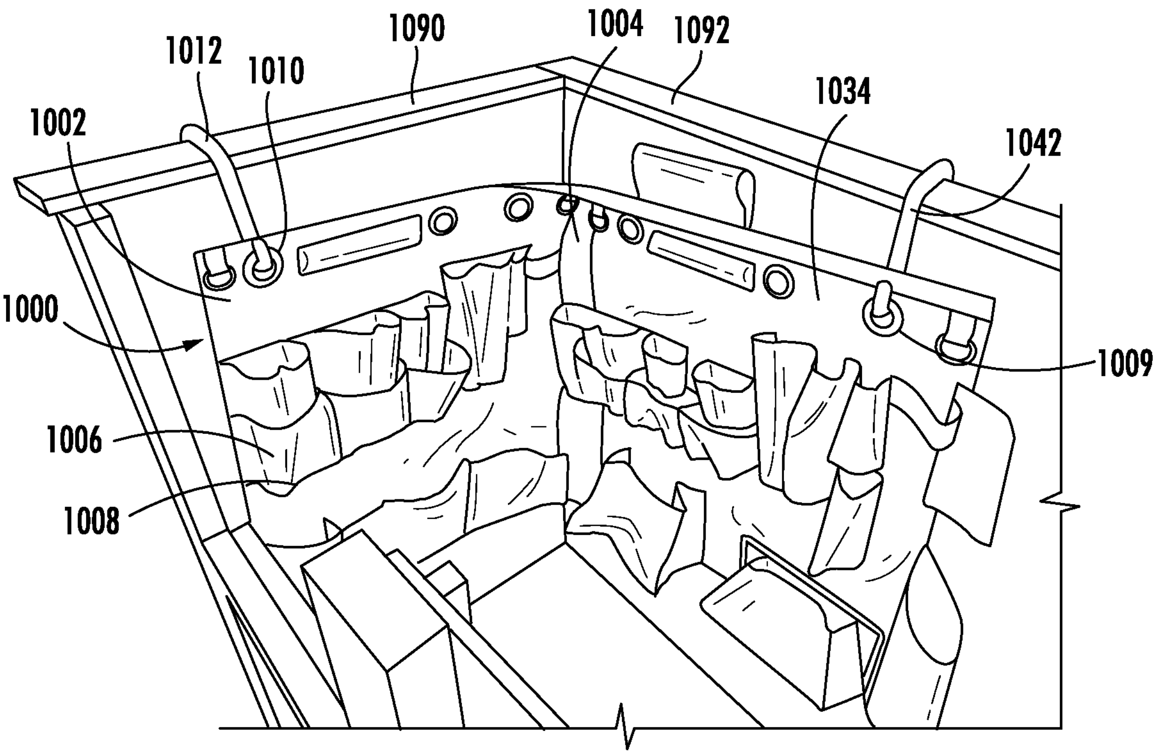
FIG. 61 is a perspective view from the front of a tool board, according to another exemplary embodiment.
Figure 62:
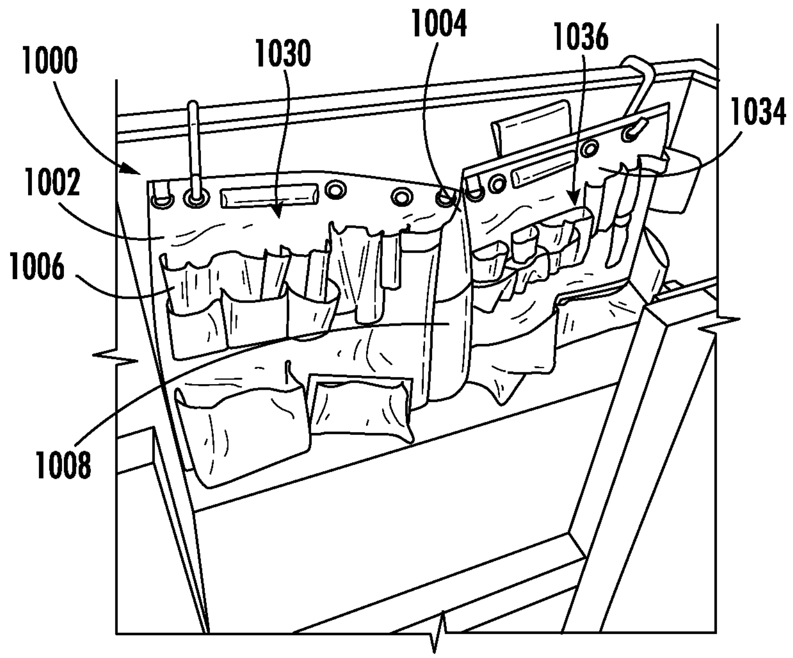
FIG. 62 is a perspective view from the front of the tool board shown in FIG. 61, according to an exemplary embodiment.
Figure 63:
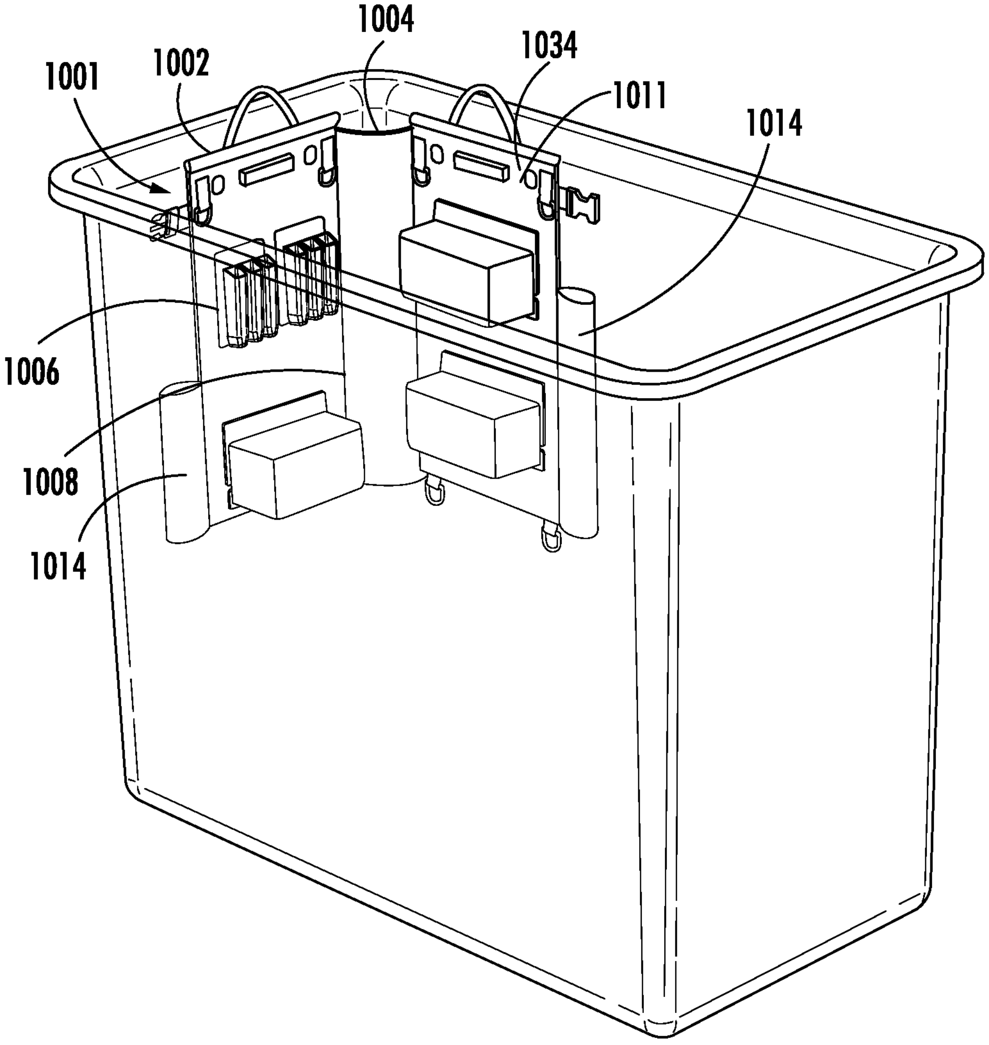
FIG. 63 is a perspective view from the front of an alternate configuration of the tool board shown in FIG. 61, according to another exemplary embodiment.
Figure 64:
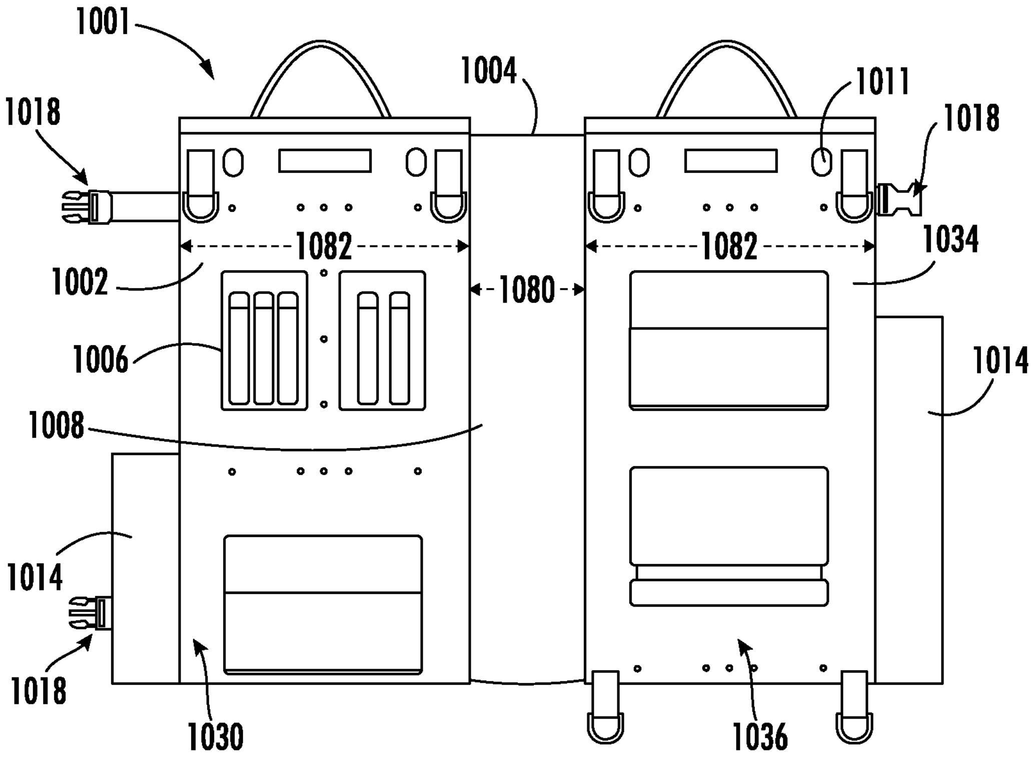
FIG. 64 is a front view of the tool board shown in FIG. 63, according to an exemplary embodiment.
Figure 65:
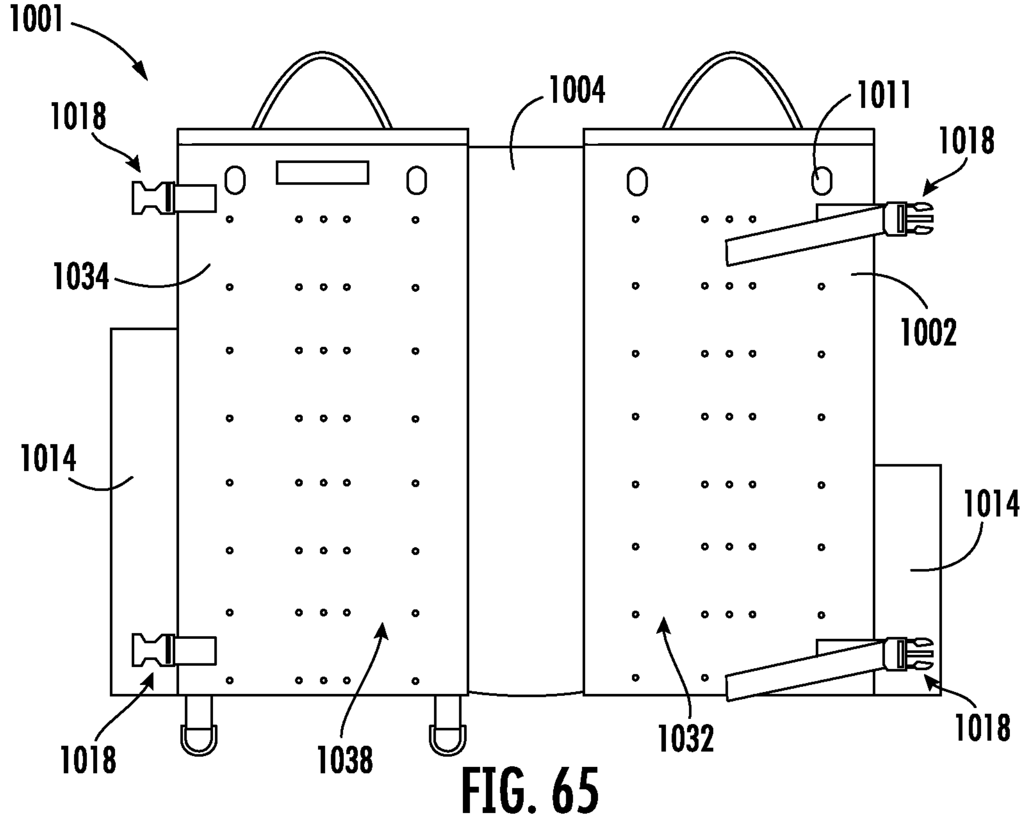
FIG. 65 is a rear view of the tool board shown in FIG. 64, according to an exemplary embodiment.

In specific embodiments, intermediate panel 1004 includes a holster, such as auger bit holder 1008. In specific embodiments, the height of auger bit holder 1008 is greater than 50% of the height of intermediate panel 1004. As shown in FIG. 61, tool board 1000 can be mounted in a corner position, such as the corner of a power utility bucket. When mounted in a corner position, auger bit holder 1008 serves as a central pivot and provides structure to tool board 1000 to aid tool board 1000 in form-fitting to the corner location, such that tool board 1000 does not substantially droop or sag or otherwise deform at the corner location. As shown in FIG. 62, tool board 1000 may also be mounted in a generally flat configuration, specifically in a position that does not include a corner.

In certain specific embodiments, first hook 1012 and second hook 1042 are used to mount tool board 1000 to a mounting edge. In certain specific embodiments, first outer panel 1002 and second outer panel 1034 include apertures, shown as grommets 1010, 1009 to receive bucket hooks 1012, 1042. In a specific embodiment, first hook 1012 is coupled to first outer panel 1002 via grommet 1010, and second hook 1042 is coupled to second outer panel 1034 via second grommet 1009. First hook 1012 is configured to detachably engage with a first supporting utility bucket wall 1090 thereby coupling the first outer panel 1002 to the first supporting utility bucket wall 1090, the first rear surface 1030 of the first outer panel 1002 facing towards the first supporting utility bucket wall 1090. Second hook 1042 is configured to detachably engage with a second supporting utility bucket wall 1092 thereby coupling the second outer panel 1034 to the second supporting utility bucket wall 1092, the second rear surface 1036 of the second outer panel 1034 facing towards the second supporting utility bucket wall 1092. In various situations, first supporting utility bucket wall 1090 and second supporting utility bucket wall 1092 are perpendicular to each other.

In various embodiments, tool board 1000 includes buckles 1018 similar to tool board 1001.

Referring to FIGS. 63-66, tool board 1001 is shown. Tool board 1001 is substantially the same as tool board 1000 except for the differences identified herein. In particular, tool board 1001 includes eyelets 1011 and tool board 1000 includes grommets 1010, 1009.

Standard circular eyelets require the portion of outer panel 1002 supporting the eyelet to be angled perpendicularly to the bucket hook for the bucket hook to be inserted. However, ovular eyelets, such as eyelets 1011, allow the bucket hook to be inserted at an angle other than 90 degrees, to allow for more ready insertion of the bucket hooks to an assembled outer panel 1002.

Figure 66:
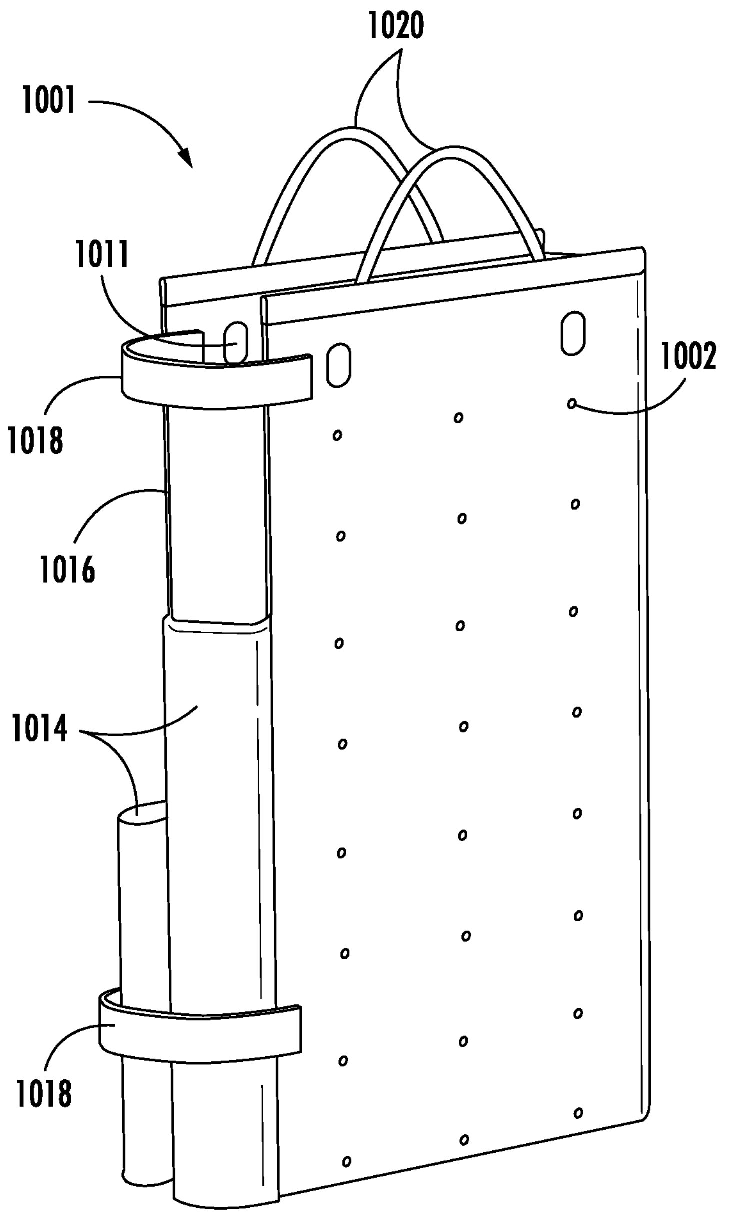
FIG. 66 is a perspective view from the rear of the tool board shown in FIG. 64, with the tool board in a folded configuration, according to an exemplary embodiment.
Figure 67:
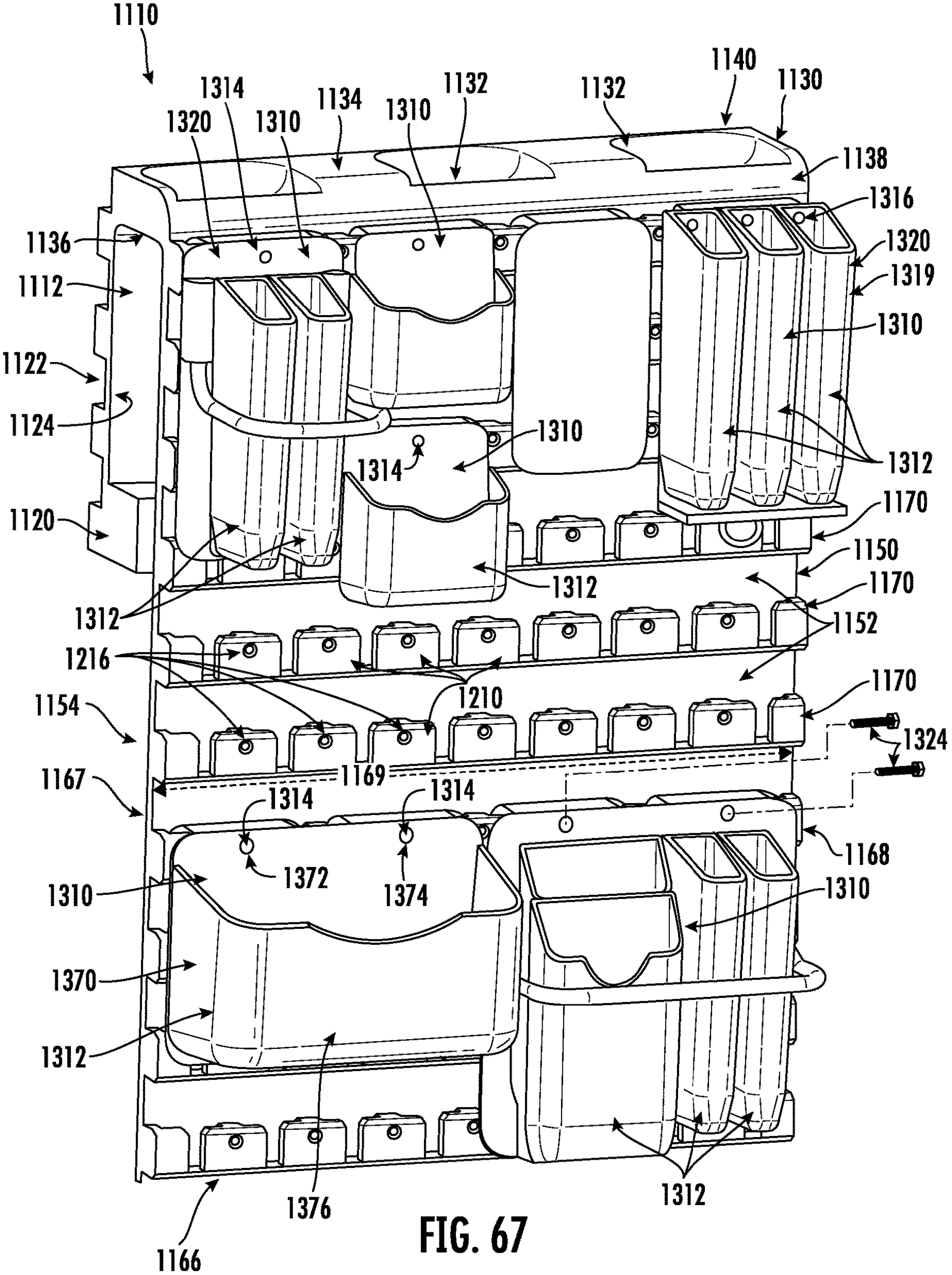
FIG. 67 is a perspective view of a tool board, according to another exemplary embodiment.

As shown in FIG. 66, tool board 1000 is also foldable, for easy storage and transportation. Specifically, first outer panel 1002 and second outer panel 1034 may fold toward one another, with intermediate panel 1004 forming a central pivot. In specific embodiments, auger bit holder 1008 adds structure and depth to this central pivot, generating a gap 1016 that permits space for pockets 1006 to remain attached to outer panels 1002 without the need to remove all or some of pockets 1006 to store tool board 1000. In specific embodiments, mating features such as buckles 1018 are coupled to the respective outer edges of outer panels 1002 and are used to secure tool board 1000 in the folded position. In various embodiments, tool board 1000 includes a plurality of fasteners, shown as buckles 1018, that secure the first outer panel 1002 and the second outer panel 1034 in the folded position (FIG. 66). Additionally, in certain specific embodiments, handles 1020 are coupled to an upper portion of outer panels 1002 for ready transportation between job sites.

FIGS. 67-75 depict various aspects of tool board 1110 according to one or more additional embodiments. The tool board 1110 is substantially the same as the tool board 100, tool board 150, tool board 200, tool board 300, tool board 400, tool board 500, tool board 600, tool board 700, tool board 800, tool board 900, or tool board 1000, except for the differences described herein.

In various embodiments of tool board 1110, the tool board "base" component includes one half of a cleat system, and each individual tool holder (e.g., a pouch, a scabbard, a hook, a tray) has the other half of the cleat system. Once the tool holder is slotted into the base, a screw or other fastener (e.g., a quick-release style fastener or spring-loaded pin) secures the tool holder to the base to prevent movement between the two.

Tool board 1110 is configured to hang from a supporting wall, such as a wall of a utility bucket (e.g., first supporting utility bucket wall 1090 and/or second supporting utility bucket wall 1092 in FIG. 61). Tool board 1110 includes upper wall 1130, rear wall 1120 extending downward from rear end 1140 of upper wall 1130, front wall 1150 extending downward from front end 1138 of upper wall 1130, a first plurality of projections 1210 extending from front surface 1152 of front wall 1150, a plurality of tool board panels 1310 slidably engaged with the first plurality of projections 1210 extending from front wall 1150, and a plurality of support structures 1312 configured to support an object, such as a hand tool. Each of the plurality of support structures 1312 are coupled to one of the plurality of tool board panels 1310. In various embodiments, front wall 1150 extends distance 1169 from left edge 1167 to right edge 1168.

The upper wall 1130 extends from a front end 1138 to a rear end 1140. In various embodiments, upper wall 1130 includes a plurality of recesses 1132 configured to receive and contain objects, such as tools, equipment, and/or hardware. Upper wall 1130 includes an upper surface 1134 and an opposing lower surface 1136. When tool board 1110 is resting on a supporting wall (e.g., a wall of a utility bucket), in various embodiments lower surface 1136 of upper wall 1130 is interfacing against and supported by the supporting wall, specifically the upward facing surface of the supporting wall (e.g., first supporting utility bucket wall 1090 and/or second supporting utility bucket wall 1092 in FIG. 61).

Rear wall 1120 includes a rear surface 1122 and an opposing inner surface 1124. Front wall 1150 includes a front surface 1152 and an opposing inner surface 1154. Rear surface 1122 of rear wall 1120 and front surface 1152 of front wall 1150 are facing away from each other. Front wall 1150 and rear wall 1120 define a space 1112 between front wall 1150 and rear wall 1120, and space 1112 is configured to receive the supporting wall that upper wall 1130 is interfacing against.

In various embodiments, each tool board panel 1310 of the plurality of tool board panels 1310 includes second aperture 1314 extending through the respective tool board panel 1310. Each of the first apertures 1216 and each of the second apertures 1314 are configured to collectively receive a fastener (e.g., fastener 1324) that extends through one of the first apertures 1216 and one of the second apertures 1314 thereby rigidly coupling the respective tool board panel 1310 to the front wall 1150. When a tool board panel 1310 is engaged to tool board 1110, first aperture(s) 1216 are aligned with a second aperture(s) 1314 such that fastener(s) can extend through the first aperture(s) 1216 and the second aperture(s) 1314 (e.g., a single fastener extending through both a first aperture 1216 and a second aperture 1314).

In various embodiments, the plurality of support structures 1312 include a first bag 1319. In various embodiments, the first bag 1319 includes a third aperture 1316, the third aperture 1316 configured to receive a fastener (e.g., fastener 1324) extending through the third aperture 1316, one of the first apertures 1216, and one of the second apertures 1314, thereby rigidly coupling the first bag 1319 to the front wall 1150.

In various embodiments, container 1376 (e.g., a bag) is coupled to second tool board panel 1370. In various embodiments, first aperture 1372 and second aperture 1374 extend through container 1376 as well as the base panel of second tool board panel 1370.

In various embodiments, plurality of tool board panels 1310 includes a first tool board panel 1320. First tool board panel 1320 includes a base panel 1336, first bag 1326 coupled to the base panel 1336, the first tool board panel 1320 including a first bar 1330 rigidly coupled to the base panel 1336, the first bar 1330 and the base panel 1336 circumferentially surrounding the first bag 1326.

Figure 68:
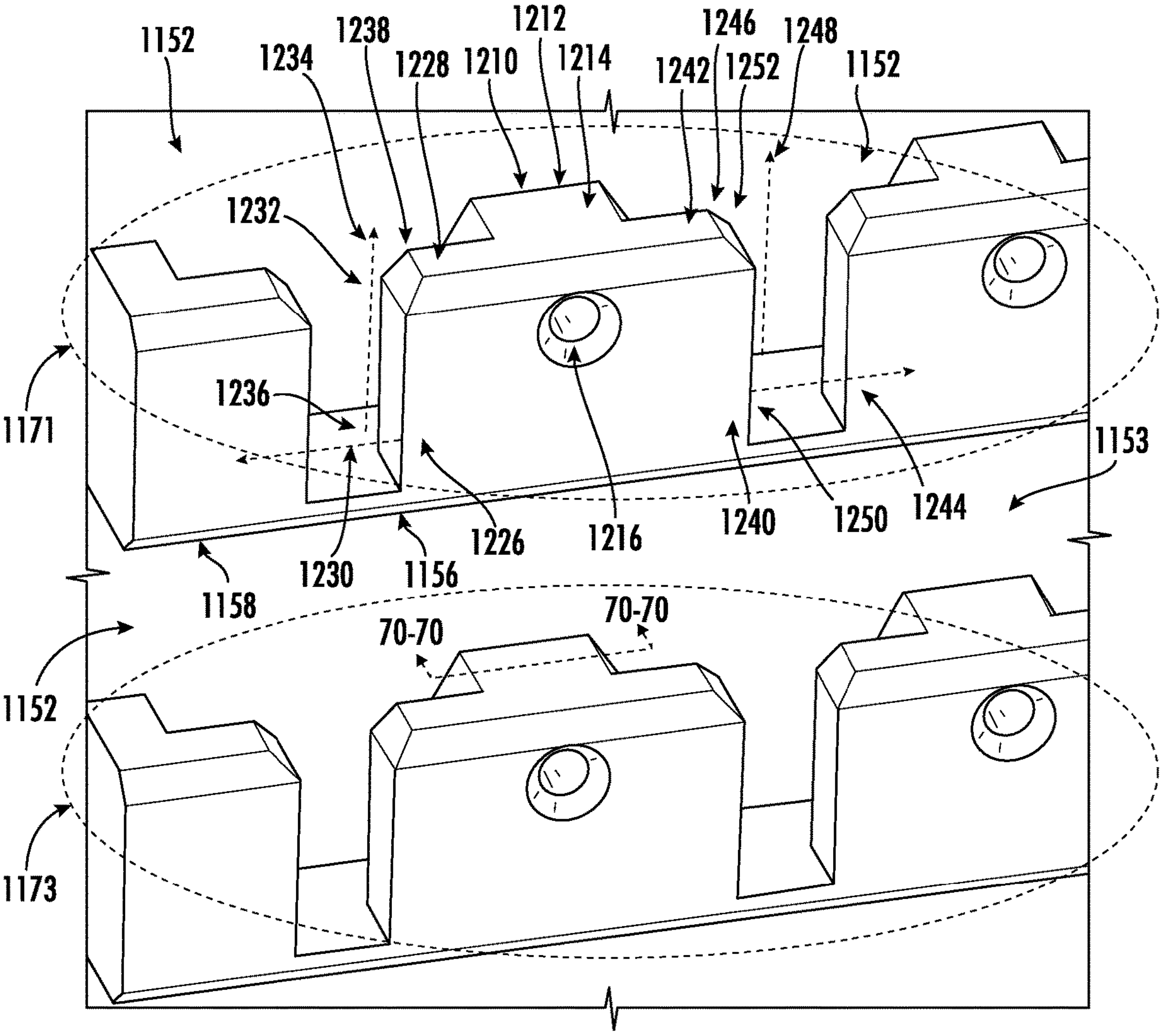
FIG. 68 is a detailed perspective view of the tool board shown in FIG. 67, according to an exemplary embodiment.
Figure 69:
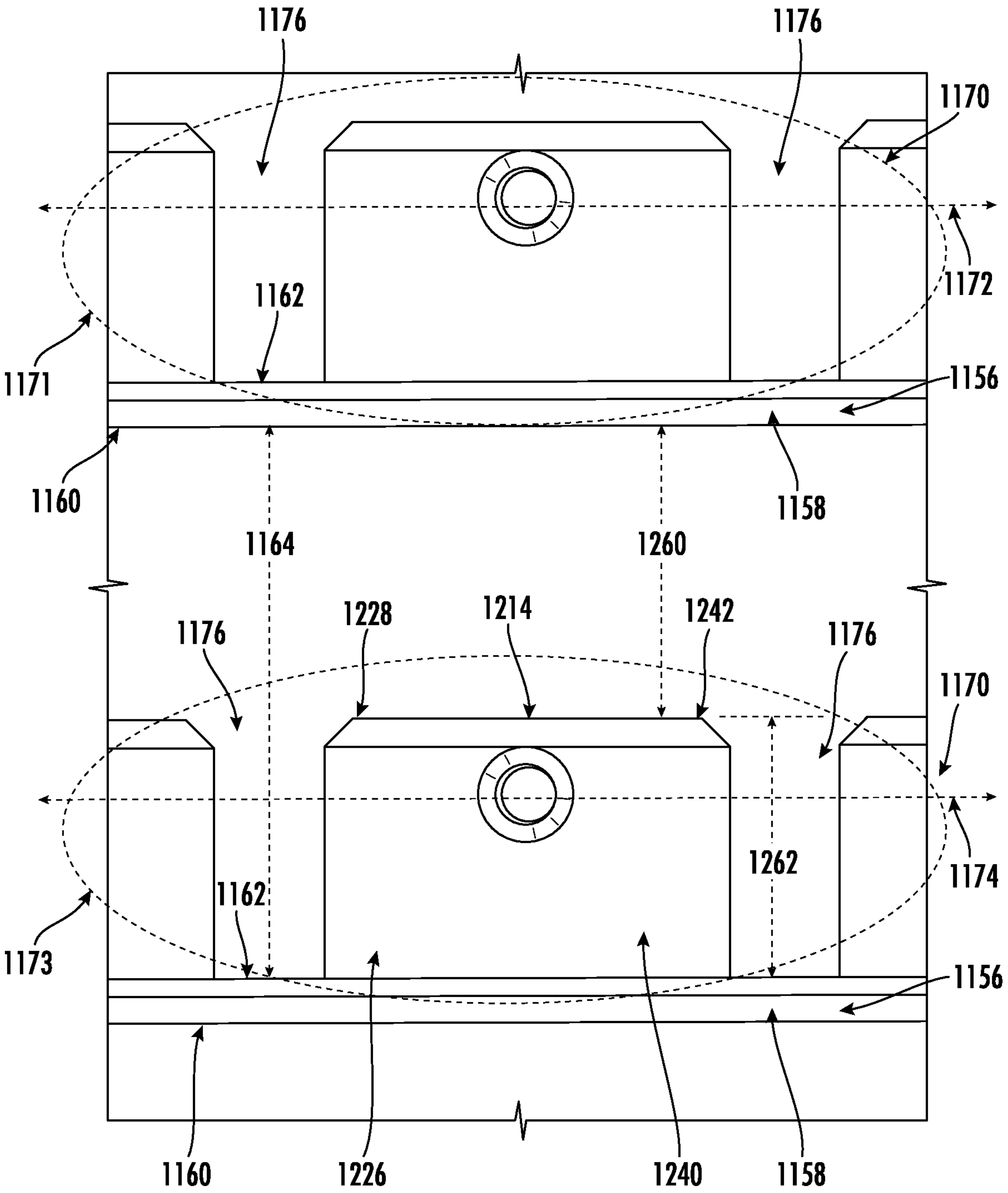
FIG. 69 is a detailed front view of the tool board shown in FIG. 67, according to an exemplary embodiment.
Figure 70:
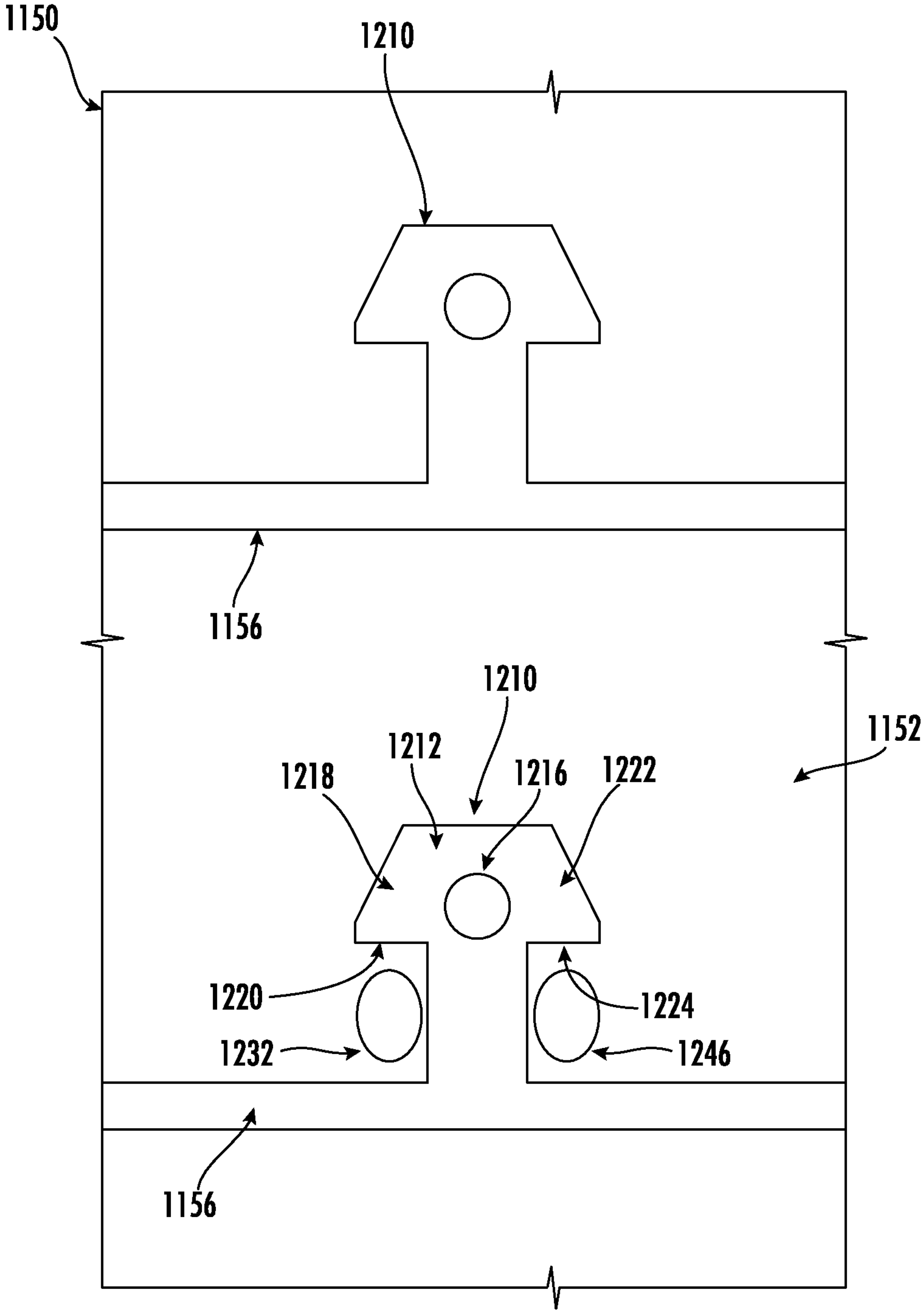
FIG. 70 is a detailed-cross section view taken along cross-section 70-70 in FIG. 68, according to an exemplary embodiment.

Referring to FIGS. 68-70, various aspects of first plurality of projections 1210 are shown. In various embodiments, each of projections 1210 includes a central wall 1212 extending from front surface 1152, a first rib 1226 extending in a first direction 1230 from the central wall 1212 and a second rib 1240 extending in a second direction 1244 from the central wall 121 opposite the first direction 1230. First rib 1226 and second rib 1240 each extend in front of and are offset from the front surface 1152, and each projection 1210 of the first plurality of projections 1210 includes a first aperture 1216 extending through the central wall 1212 of the respective projection 1210.

Central wall 1212 defines upper surface 1214, first rib 1226 defines upper surface 1228, and second rib 1240 defines upper surface 1242, each of which faces upward (e.g., towards a row of projections 1210 higher on front surface 1152). In various embodiments, upper surface 1214, upper surface 1228, and upper surface 1242 are coplanar.

First rib 1226 defines first channel 1234 between first rib 1226 and front surface 1152. First channel 1234 extends from closed back end 1236 to open front end 1238. Second rib 1240 defines second channel 1248 between second rib 1240 and front surface 1152. Second channel 1248 extends from closed back end 1250 to open front end 1252.

First rib 1226 defines first space 1232 of front surface 1152 under first rib 1226, and second rib 1240 defines second space 1246 of front surface 1152 under second rib 1240. In various embodiments, front surface 1152 is continuous between first space 1232 and second space 1246 (e.g., there exists at least one path along front surface 1152 from first space 1232 to second space 1246 that does not deviate from the plane defined by front surface 1152).

Referring to FIG. 69, various aspects of the positioning of the rows 1170 of projections 1210 are shown. In various embodiments, first plurality of projections 1210 includes a first row 1173 of projections 1210 horizontally aligned with each other, and a second row 1171 of projections 1210 horizontally aligned with each other, the second row 1171 being closer to the upper wall 1130 (shown in FIG. 67) than the first row 1173.

In various embodiments front wall 1150 extends from upper wall 1130 to bottom edge 1166. In specific embodiments, tool board 1110 includes a plurality of horizontal rows 1170 of projections 1210 and the rows 1170 are spaced in the vertical direction between upper wall 1130 and bottom edge 1166.

In various embodiments, first row 1173 of projections 1210 extends along a first axis 1174 and second row 1171 of projections 1210 extends along a second axis 1172 above the first row 1173 of projections 1210. First axis 1174 is parallel to second axis 1172, and each of the first axis 1174 and the second axis 1172 are perpendicular to each of the first direction 1230 (of first rib 1226) and the second direction 1244 (of second rib 1240). In various embodiments, a section 1153 of the front surface 1152 of the front wall 1150 extends uninterrupted between the first row 1173 and the second row 1171 (e.g., there exists at least one path along front surface 1152 from first row 1173 to second row 1171 that does not deviate from the plane defined by front surface 1152).

In various embodiments, a plurality of lower walls 1156 extend from front surface 1152, and each of rows 1170 of projections 1210 includes a lower wall 1156 extending below projections 1210 and between the projections 1210. In various embodiments, lower wall 1156 includes a lower surface 1160, facing away from upper wall 1130, and a chamfered surface 1158, extending at an angle between lower surface 1160 and the front of lower wall 1156. Lower wall 1156 includes upper surface 1162 facing upward towards upper wall 1130.

In various embodiments, neighboring rows 1170 of projections 1210 are distance 1164 apart (e.g., measured along gap channel 1176 between neighboring projections 1210). As shown, first row 1173 is distance 1164 below second row 1171, such as via upper surface 1162 of lower wall 1156 of first row 1173 being distance 1164 below lower surface 1160 of lower wall 1156 of second row 1171. In various embodiments, for a given row 1170, upper surface 1214 of central wall 1212, upper surface 1228 of first rib 1226, and/or upper surface 1242 of second rib 1240 are distance 1262 above upper surface 1162 of lower wall 1156. In various embodiments, for first row 1173, upper surface 1214 of central wall 1212, upper surface 1228 of first rib 1226, and/or upper surface 1242 of second rib 1240 are distance 1260 below lower surface 1160 of lower wall 1156 of second row 1171 immediately above first row 1173.

In a specific embodiment, first row 1173 includes first lower wall 1156 extending below projections 1210 and between the projections 1210 in the first row 1173, second row 1171 includes a second lower wall 1156 extending below projections 1210 and between the projections 1210 in the second row 117. The first rib 1226 of a projection 1210 in the first row 1173 of projections 1210 extends a first distance 1262 above the first lower wall 1156, and the second lower wall 1156 of the second row 1171 is a second distance 1164 above the first lower wall 1156 of the first row 1173. In various embodiments, distance 1262 is at least 35% of the second distance 1164, and more specifically at least 40%, and more specifically at least 45%. In various embodiments, distance 1262 is between 40% and 65% of the distance 1164, and more specifically between 42% and 60%, and more specifically between 45% and 50%, and more specifically 48%.

Referring to FIG. 70, various aspects of a portion of projections 1210 are shown. The view shown in FIG. 70 is projections 1210 with first rib 1226 and second rib 1240 removed (see along cross-section 70-70 in FIG. 68 in the direction identified by cross-section 70-70). Projection 1210 includes first ledge 1218 extending from central wall 1212, defining a lower surface 1220 facing downward, and second ledge 1222 extending from central wall 1212, defining lower surface 1224 facing downward.

Figure 71:
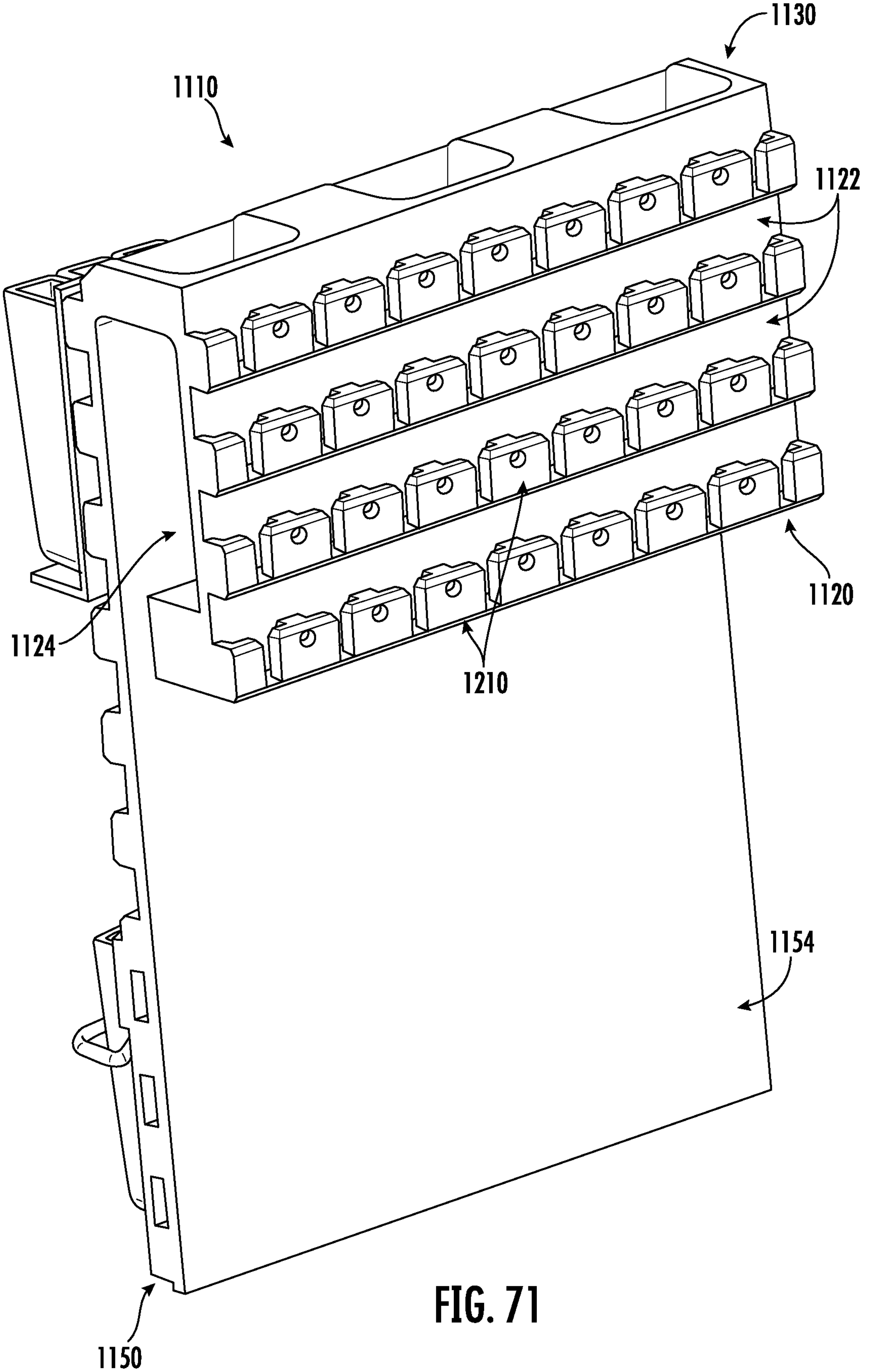
FIG. 71 is a perspective view from the rear of the tool board shown in FIG. 67, according to an exemplary embodiment.

Referring to FIG. 71, various aspects of rear of tool board 1110 are shown. In various embodiments, a plurality of projections 1210 extend from rear surface 1122 of rear wall 1120. In various embodiments, plurality of projections 1210 extending from rear surface 1122 have the same configuration and respective orientations as plurality of projections 1210 extending from front surface 1152. For example, the second plurality of projections 1210 extending from rear surface 1122 include a first row of projections 1210 horizontally aligned with each other, and a second row of projections 1210 horizontally aligned with each other and that are closer to the upper wall 1130 than the first row.

Figure 72:
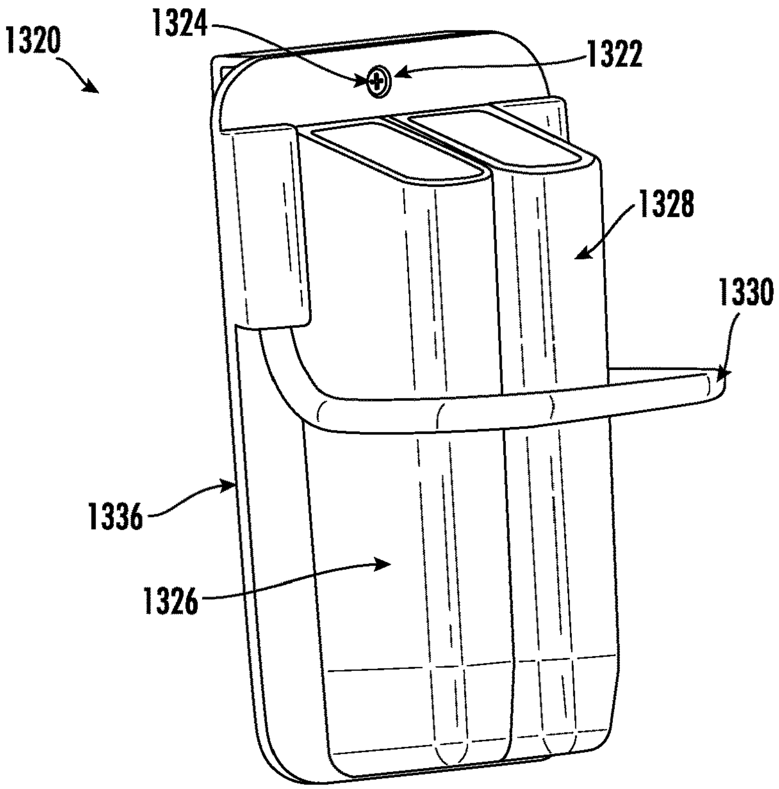
FIG. 72 is a perspective view of a tool board panel shown in FIG. 67, according to an exemplary embodiment.
Figure 73:
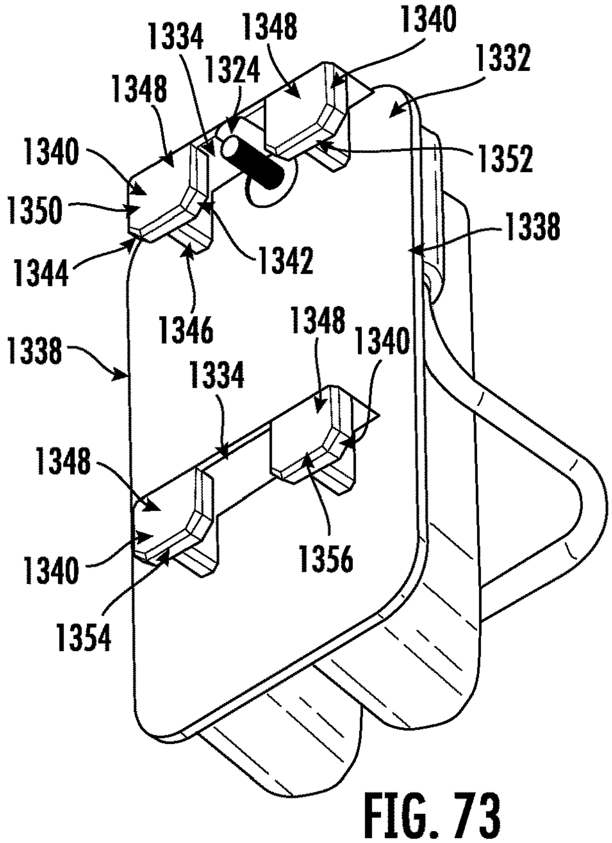
FIG. 73 is a perspective view from behind of the tool board panel shown in FIG. 72, according to an exemplary embodiment.
Figure 74:
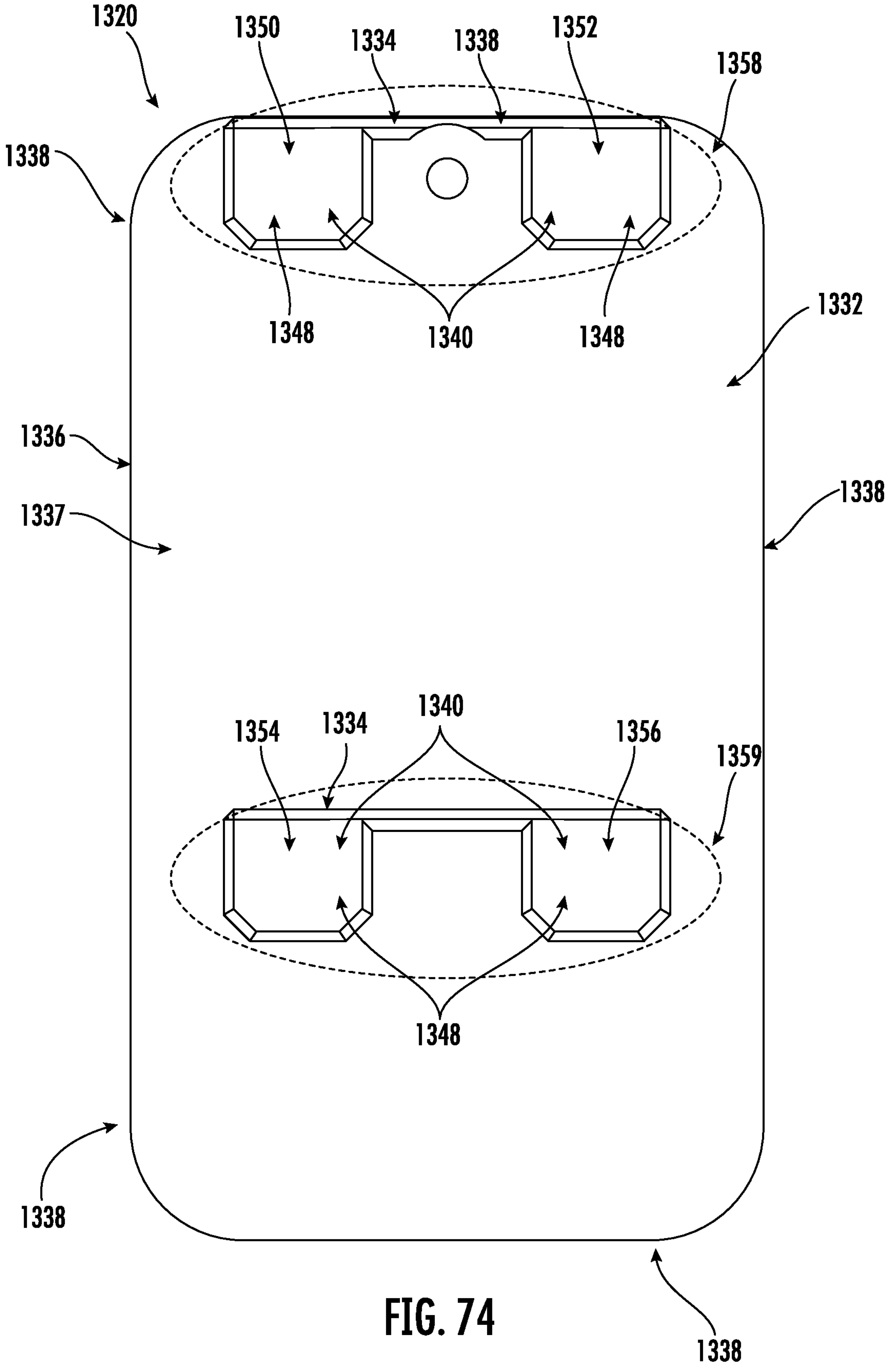
FIG. 74 is a rear view of the tool board panel shown in FIG. 72, according to an exemplary embodiment.
Figure 75:
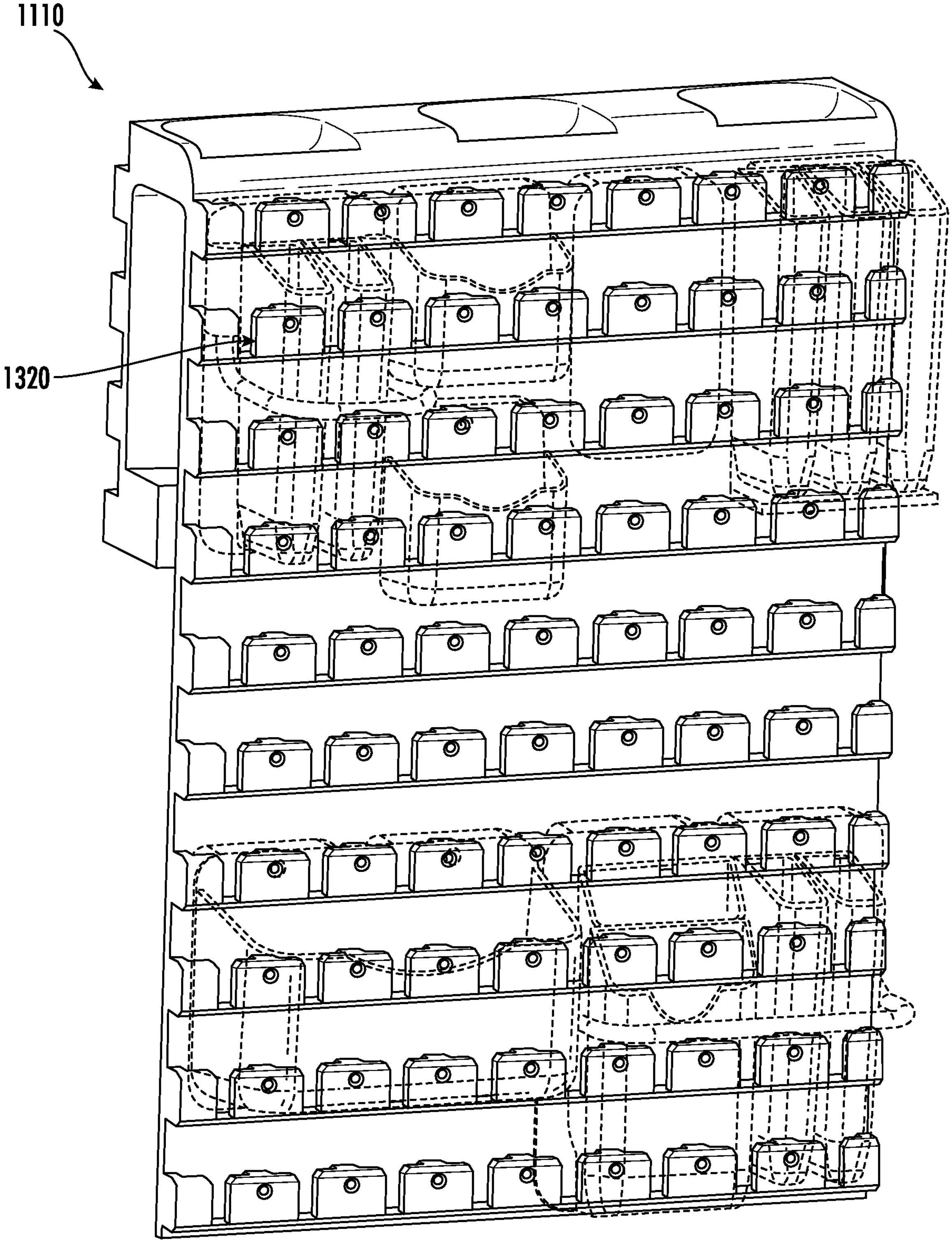
FIG. 75 is a perspective view of the tool board panel shown in FIG. 72, according to an exemplary embodiment.
Figure 76:
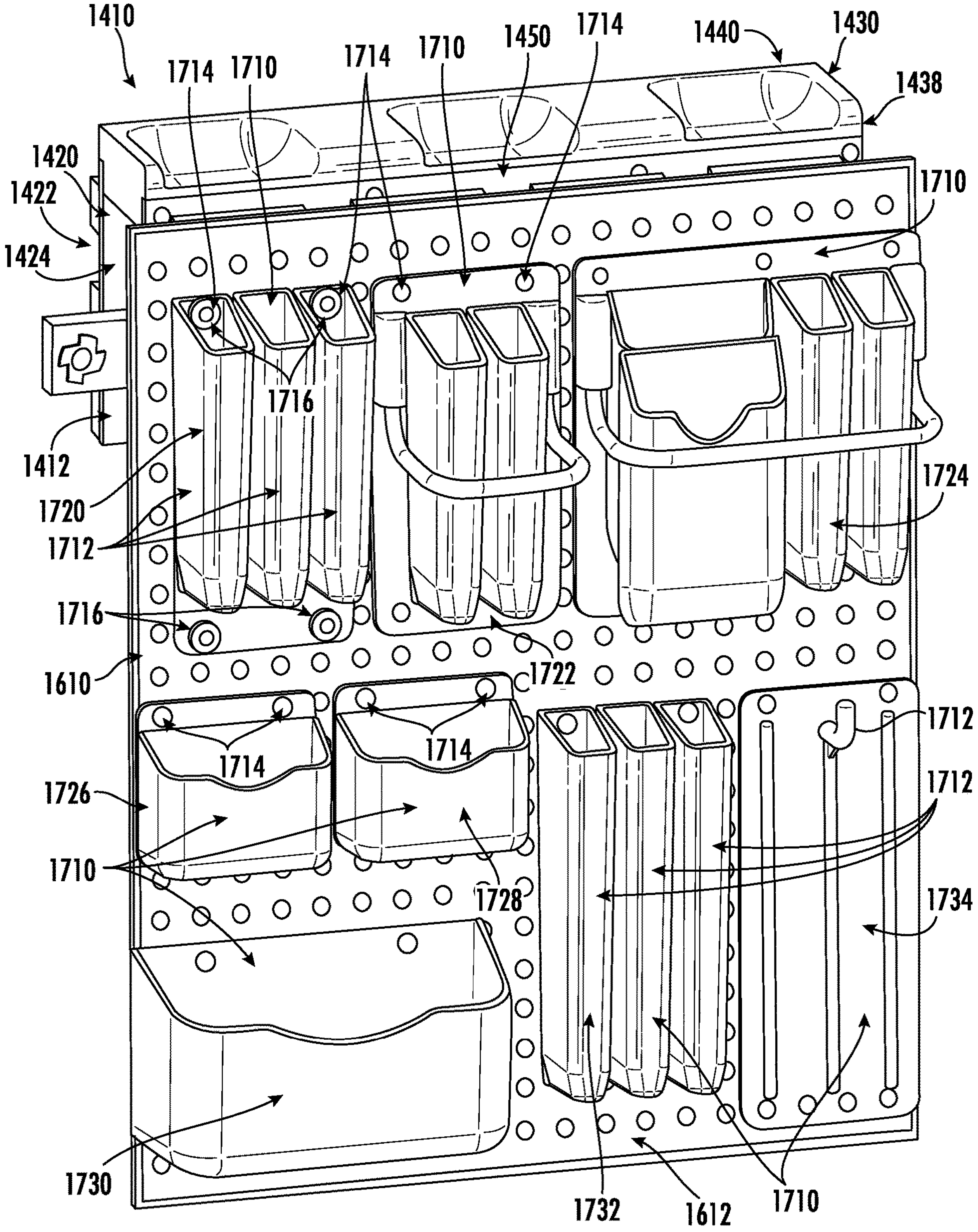
FIG. 76 is a perspective view of a tool board, according to an exemplary embodiment.
Figure 77:
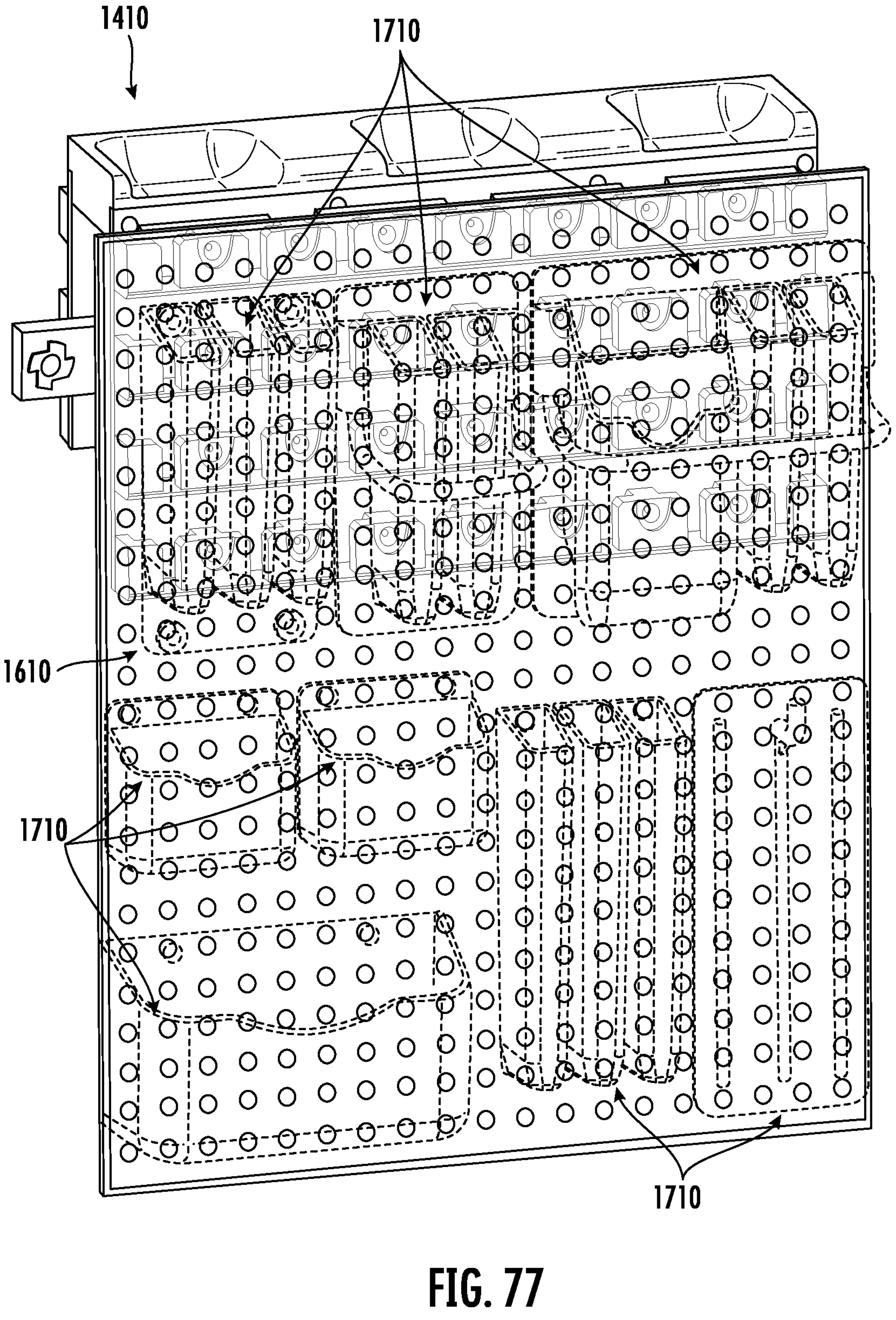
FIG. 77 is a perspective view of the tool board shown in FIG. 76, according to an exemplary embodiment.
Figure 78:
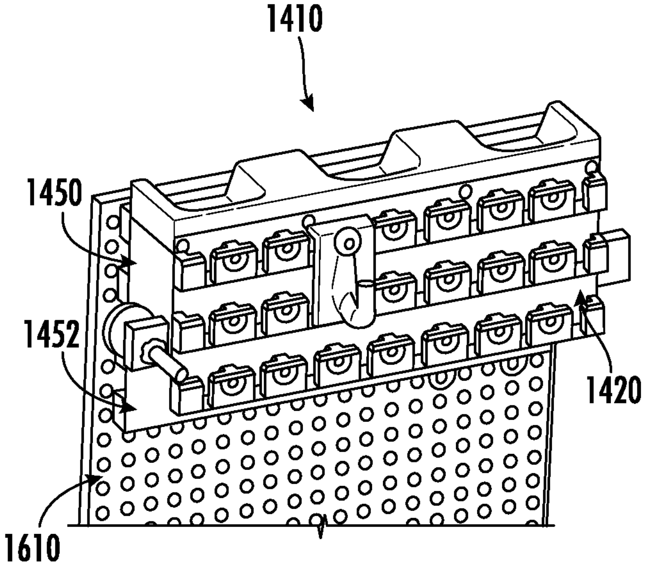
FIG. 78 is a perspective view from behind of the tool board shown in FIG. 76, according to an exemplary embodiment.
Figure 79:
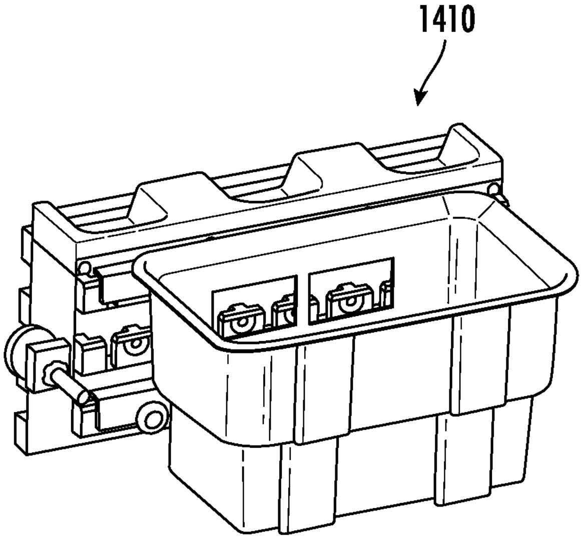
FIG. 79 is a perspective view from behind of a portion of the tool board shown in FIG. 76, according to an exemplary embodiment.

Referring to FIGS. 72-74, various aspects of a tool board panels 1310 are shown. In various embodiments, plurality of tool board panels 1310 includes a first tool board panel 1320 including a base panel 1336, first bag 1326 coupled to the base panel 1336, the first tool board panel 1320 including a first bar 1330 rigidly coupled to the base panel 1336, the first bar 1330 and the base panel 1336 circumferentially surrounding the first bag 1326.

First tool board panel 1320 includes aperture 1322 extending through first tool board panel 1320, the aperture 1322 configured to receive a fastener (e.g., fastener 1324) that couples first tool board panel 1320 to front wall 1150. First tool board panel 1320 includes second container 1328 (e.g., a bag).

In various embodiments, fastener 1324 includes a pin, a screw, a bolt, a nail, a quick-release style fastener, or a spring-loaded pin. In various embodiments, one or more of the apertures through which fasteners extend (e.g., apertures 1216, apertures 1314, apertures 1322, aperture 1372, aperture 1374, apertures 1616, apertures 1714) are threaded. In various embodiments, one or more of the apertures through which fasteners extend (e.g., apertures 1216, apertures 1314, apertures 1322, aperture 1372, aperture 1374, apertures 1616, apertures 1714) are not threaded.

Base panel 1336 defines rear surface 1332, which faces towards front wall 1150 when first tool board panel 1320 is coupled to front wall 1150. Tool board panels 1310 (such as first tool board panel 1320) include coupling structures 1340 extending from the rear surface 1332 of the respective tool base panel 1310 (e.g., from rear surface 1332 of base panel 1336). The coupling structures 1340 are configured to slidingly engage with one or more of projections 1210. In various embodiments, coupling structure 1340 includes central wall 1346 extending from rear surface 1337, a first tongue 1342 extending from central wall 1346 in front of and offset from rear surface 1337, and a second tongue 1344 extending from central wall 1346 in front of and offset from rear surface 1337. In various embodiments, each coupling structure 1340 defines a rear surface 1348 that faces away from rear surface 1337 of base panel 1336.

In a specific embodiment, first tool board panel 1320 includes first coupling structure 1350, second coupling structure 1352, third coupling structure 1354, and fourth coupling structure 1356. One upper wall 1334 extends from rear surface 1337 between first coupling structure 1350 and second coupling structure 1352, and one upper wall 1334 extends from rear surface 1337 between third coupling structure 1354 and first coupling structure 1356. In various embodiments, coupling structure 1340 extend past aperture 1322 in rear of first tool board panel 1320. In various embodiments, coupling structures 1340 are arranged in one or more rows, such as first row 1358 of coupling structures 1340 and second row 1359 of coupling structures 1340.

Referring to FIG. 74, in various embodiments, the plurality of coupling structures 1340 (e.g., coupling structures 1350, 1352, 1354, and 1356) define third rear surfaces 1348 that collectively define a first area, and the second rear surface 1337 of base panel 1336 defines a perimeter 1338 that defines a second area. In various embodiments, the first area is less than 25% of the second area, and more specifically less than 15% of the second area, and more specifically is less than 10% of the second area, and more specifically is 8%.

Referring to FIGS. 69, 73, and 74, in various embodiments, Applicant believes the design of projections 1210, the arrangement of rows of projections 1210 (e.g., first row 1173 of projections 1210 and second row 1171 of projections 1210 with the spacing of distance 1260 and distance 1164) described herein provides for improved attachment and stability compared to some other designs. In particular, in contrast to designs that utilize individual and/or isolated coupling structures, the open array arrangement of projections 1210 provides for easy coupling and decoupling and provides the flexibility and modularity allowing for attachment of tool board panels (e.g., first tool board panel 1320) of different sizes allowing for engagement of large holders across multiple projections 1210 and/or multiple rows of projections 1210.

The relatively large gap size of distance 1260 allows for easy and convenient vertical movement of tool board panels (e.g., first tool board panel 1320) into and out of engagement with projections 1210. Further, Applicant has found that the orientation of aperture 1216 perpendicular to surface 1152 and perpendicular to vertical engagement direction of projections 1210 and coupling structures 1340, which is along direction 1230 and direction 1244, provides for very stable and robust coupling between these components. In particular, compared to systems that use over-center or cam-based locking levers, Applicant has found the fastener based attachment (e.g., via fastener 1324) with the positioning of the fastener receiving holes (e.g., apertures 1216, apertures 1314, and/or apertures 1322) discussed herein provides for improved coupling between tool boards (e.g., tool board 1110) and tool board panels (e.g., first tool board panel 1320). In specific embodiments in which fastener 1324 is a quick release pin, the design discussed herein provides this increased coupling strength and stability while still providing for easy quick release fasteners.

Referring to FIGS. 76-82, various aspects of tool board 1410 are shown. The tool board 1410 is substantially the same as the tool board 100, tool board 150, tool board 200, tool board 300, tool board 400, tool board 500, tool board 600, tool board 700, tool board 800, tool board 900, tool board 1000, or tool board 1110, except for the differences described herein.

In various embodiments of tool board 1410, the tool board "base" component includes one half of a cleat system, and a peg board style sheet has the other half of the cleat system. Each individual tool holder then is secured to the peg board style sheet in a selected orientation. In various embodiments, a fastener (e.g., a screw, a bolt) secures the tool holder to the board. In this way, the user can arrange the tool holders to a desired orientation on board, but still easily remove the entire peg board, tool holder, and tools from the base. This is helpful when the users are done with a shift, need to take tools in to protect them from weather, or want to secure tools during transit. The whole peg board can be stored inside of a locker on the truck, which can also be fitted with half of the cleat system.

Similar to tool board 1110, tool board 1410 includes space 1412 between rear wall 1420 and front wall 1450. Rear wall 1420 includes rear surface 1422 facing away from front wall 1450 and an opposing inner surface 1424. Upper wall 1430 extends between rear wall 1420 and front wall 1450 from rear end 1440 to front end 1438. Front wall 1150 includes front surface 1452 facing away from rear wall 1420, and an opposing inner surface 1454.

In various embodiments, tool board 1410 includes base panel 1610 slidably engaged with the front wall 1450 via the plurality of projections 1510, and a plurality of first apertures 1616 extending through the base panel 1610. Tool board 1410 includes a plurality of tool board panels 1710, a plurality of second apertures 1714 extending through the tool board panels 1710. Each of the first apertures 1616 and each of the second apertures 1714 are configured to collectively receive a fastener (e.g., fastener 1716) that extends through one of the first apertures 1616 and one of the second apertures 1714, thereby rigidly coupling the respective tool board panel 1710 to the front wall 1450. Tool board 1410 includes a plurality of support structures 1712 that are each configured to support a hand tool and/or hardware (e.g., bolts, screws, nuts), and each of the plurality of support structures 1712 are coupled to one of the plurality of the tool board panels 1710.

In various embodiments, a plurality of tool board panels 1710 are rigidly coupled to base panel 1610. For example, first tool board panel 1720, second tool board panel 1722, third tool board panel 1724, fourth tool board panel 1726, fifth tool board panel 1728, sixth tool board panel 1730, seventh tool board panel 1732, and eighth tool board panel 1734 are coupled to base panel 1610, such as via fasteners 1716.

In various embodiments, the plurality of support structures 1712 include a hook (e.g., tool board panel 1736) extending outward from the respective tool board panel away from the front wall 1450.

Base panel 1610 includes a front surface 1612 and an opposing rear surface 1614. A plurality of coupling structures 1620 extend from rear surface 1614. Coupling structures 1620 are structurally and functionally the same as coupling structures 1340, except as otherwise noted. One or more upper walls 1622 extend from rear surface 1614.

Figure 80:
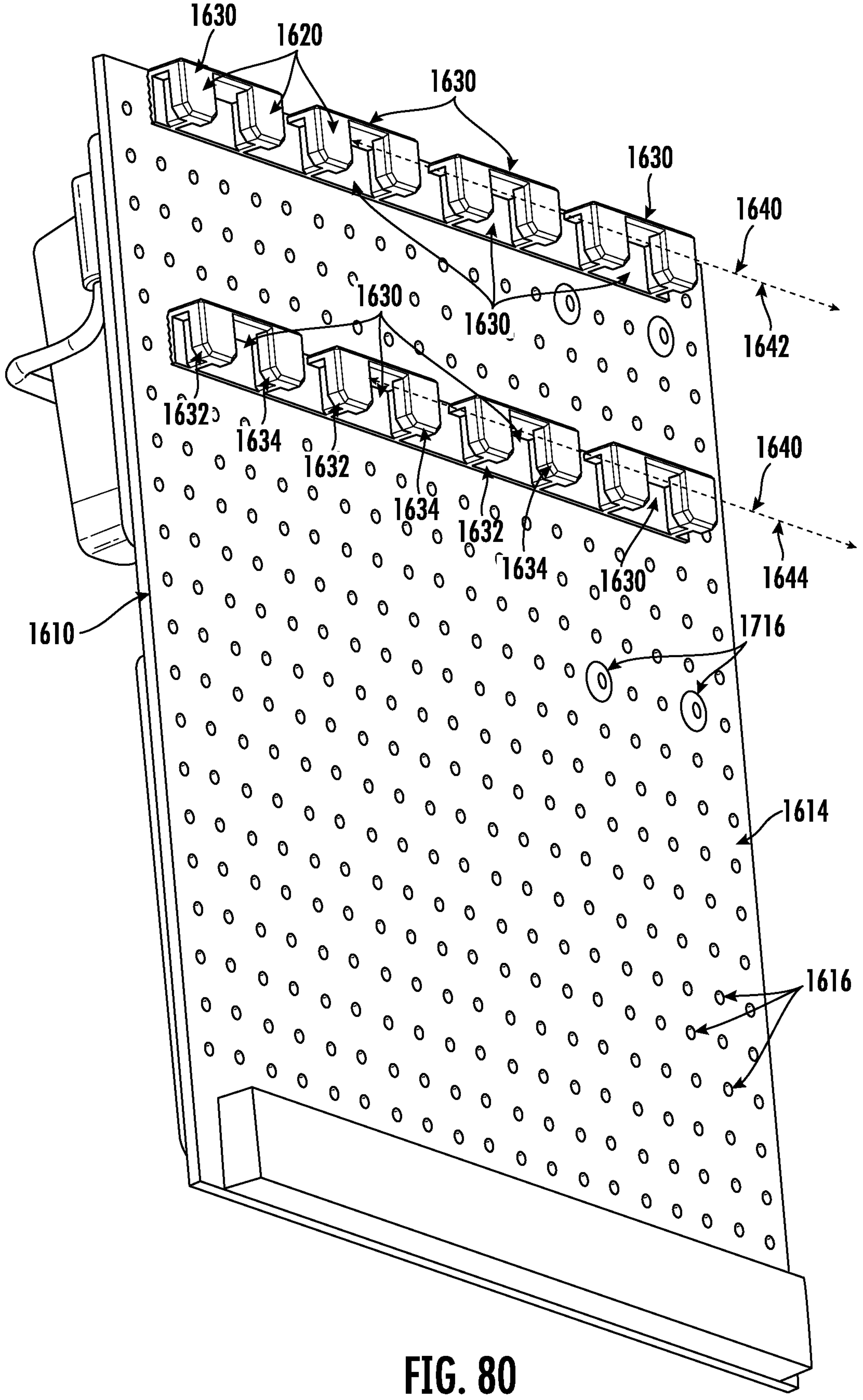
FIG. 80 is a perspective view from behind of a portion of the tool board shown in FIG. 76, according to an exemplary embodiment.

Referring to FIG. 80, in various embodiments one or more pairs 1630 of coupling structures 1620 extend from rear surface 1614 of base panel 1610. Each pair 1630 includes a first coupling structure 1632 and a second coupling structure 1634, with an upper wall 1622 extending therebetween. In various embodiments, base panel 1610 includes rows 1640 of coupling structures 1620, such as a first row 1642 and a second row 1644.

Figure 81:
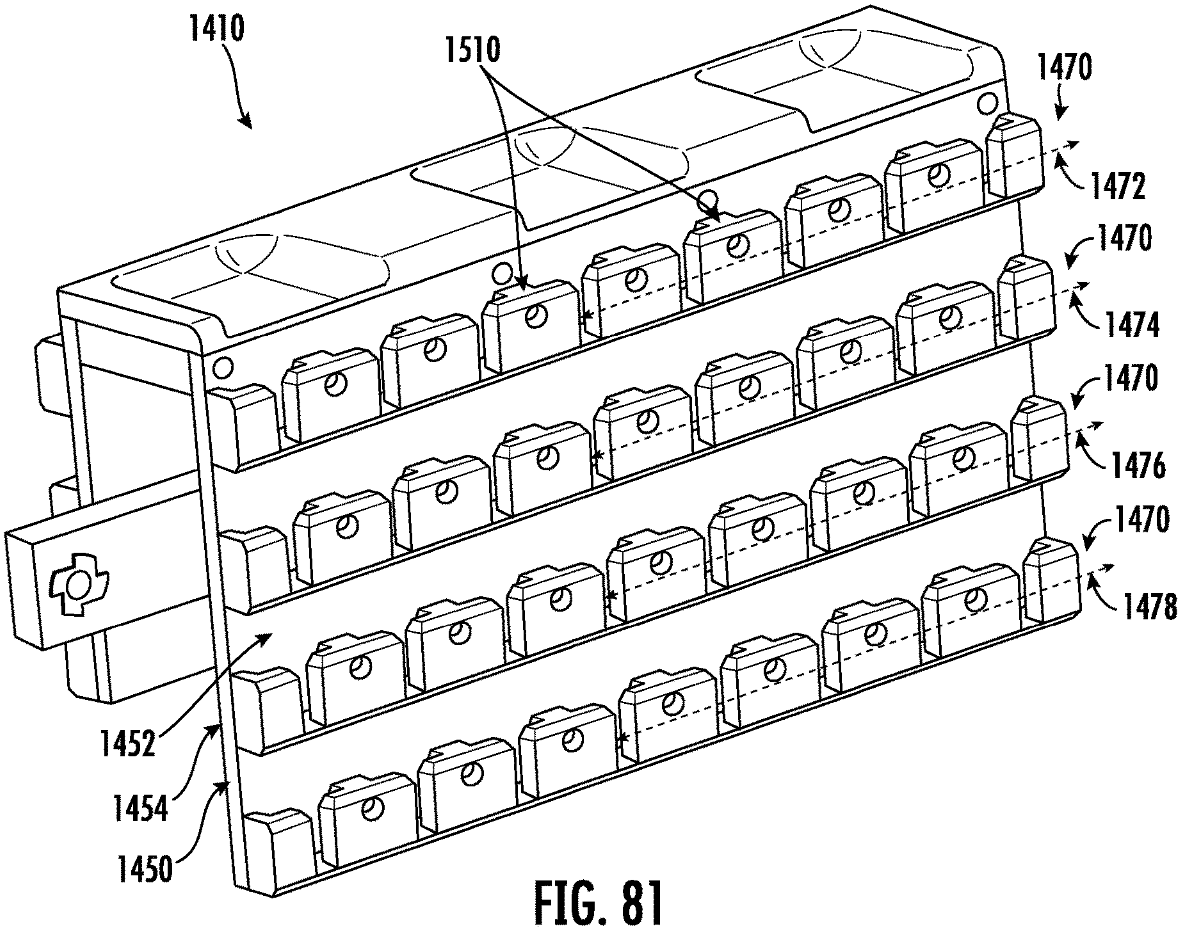
FIG. 81 is a perspective view of a portion of the tool board shown in FIG. 76, according to an exemplary embodiment.
Figure 82:
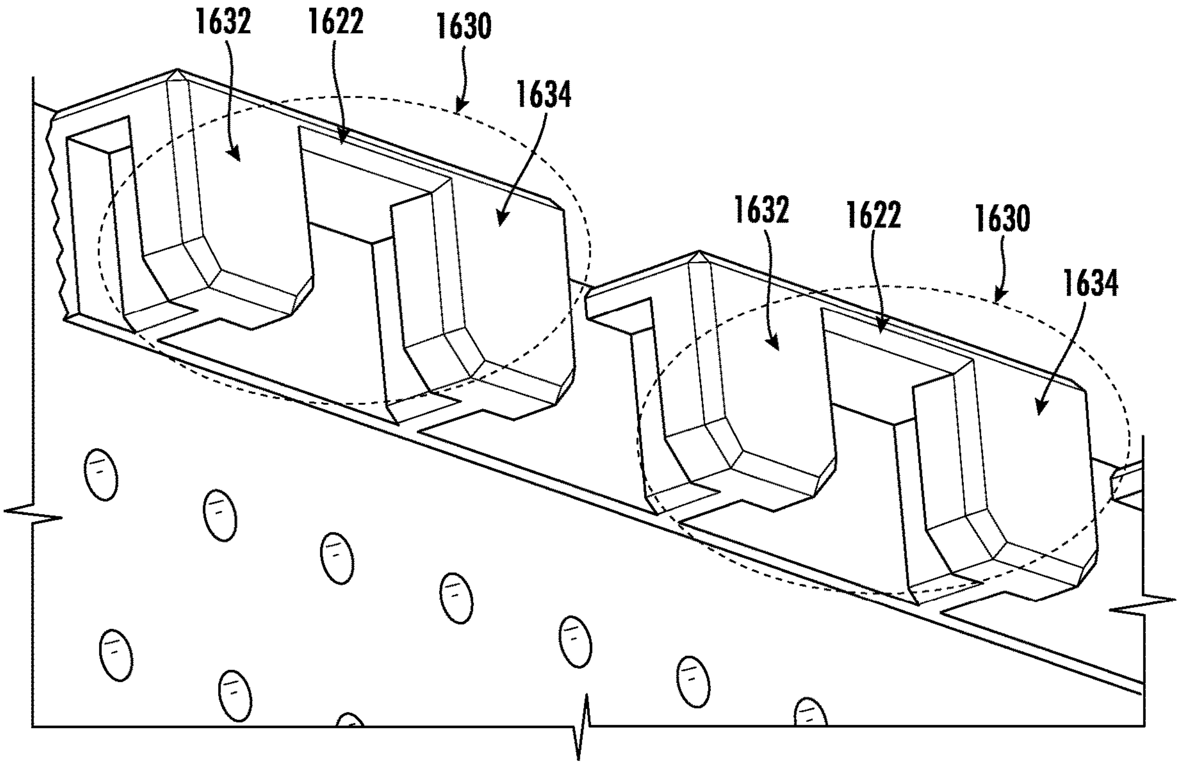
FIG. 82 is a perspective view from behind of the tool board shown in FIG. 76, according to an exemplary embodiment.

Referring to FIG. 81, in various embodiments rows 1470 of projections 1510 extend from front surface 1452. Such as, a first row 1472 of projections 1510, a second row 1474 of projections 1510 below first row 1472, a third row 1476 of projections 1510 below second row 1474, and a fourth row 1478 of projections 1510 below third row 1476.

Referring to FIGS. 83-86, various aspects of support structures and coupling structures similar to the tool board 1110 and tool board 1410 and connected objects.

Figure 83:
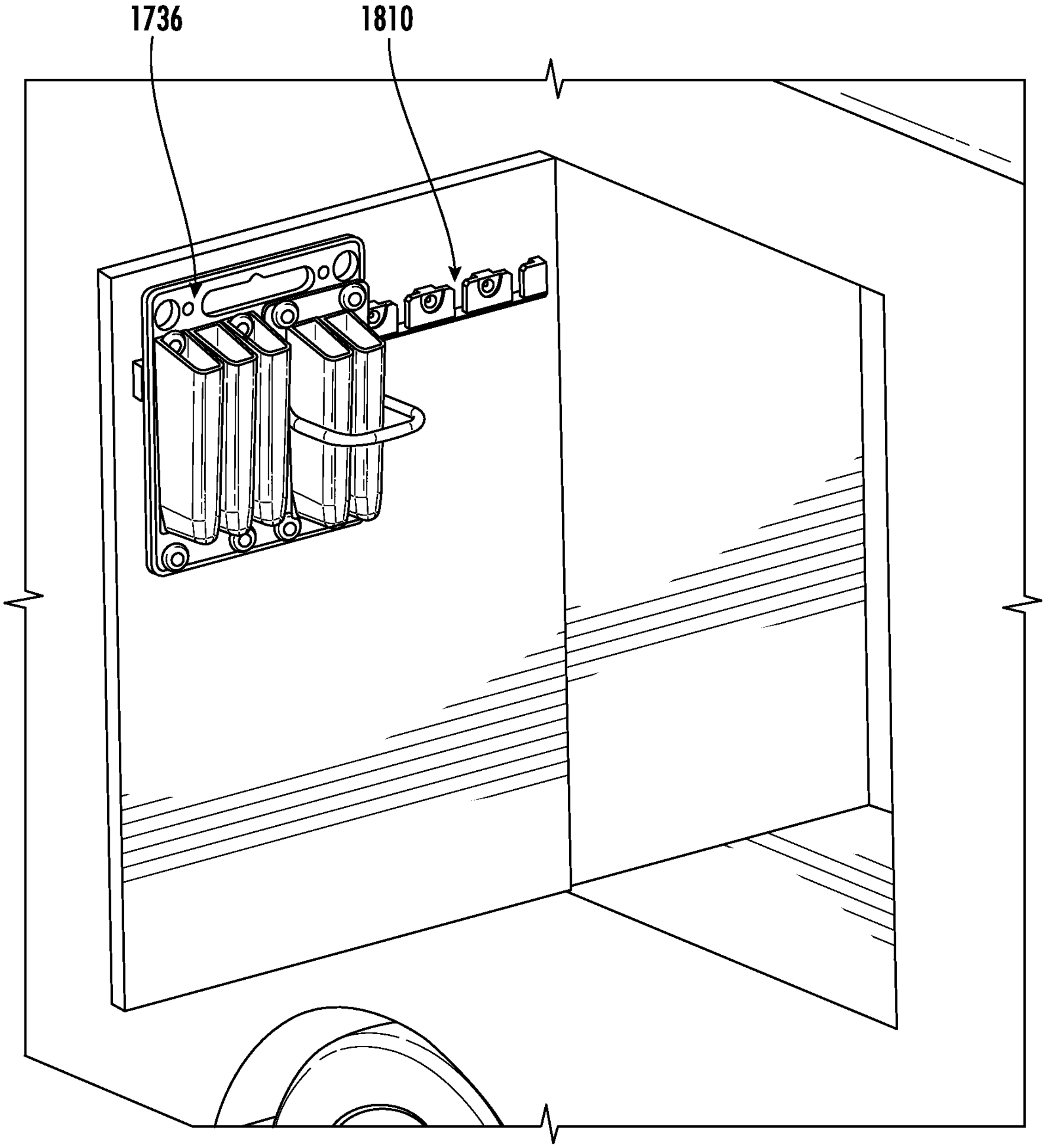
FIG. 83 is a perspective view of a row of projections and a tool board panel, according to an exemplary embodiment.

Row 1810 of projections 1510 is coupled to a surface, such as a door pivotally coupled to a vehicle (FIG. 83). When the vehicle is being moved the door is closed, and when the vehicle is stopped the user can open the door to access objects coupled to the row 1810 of projections 1510. For example, tool board panel 1736 may be coupled to row 1810 of projections 1510.

Figure 84:
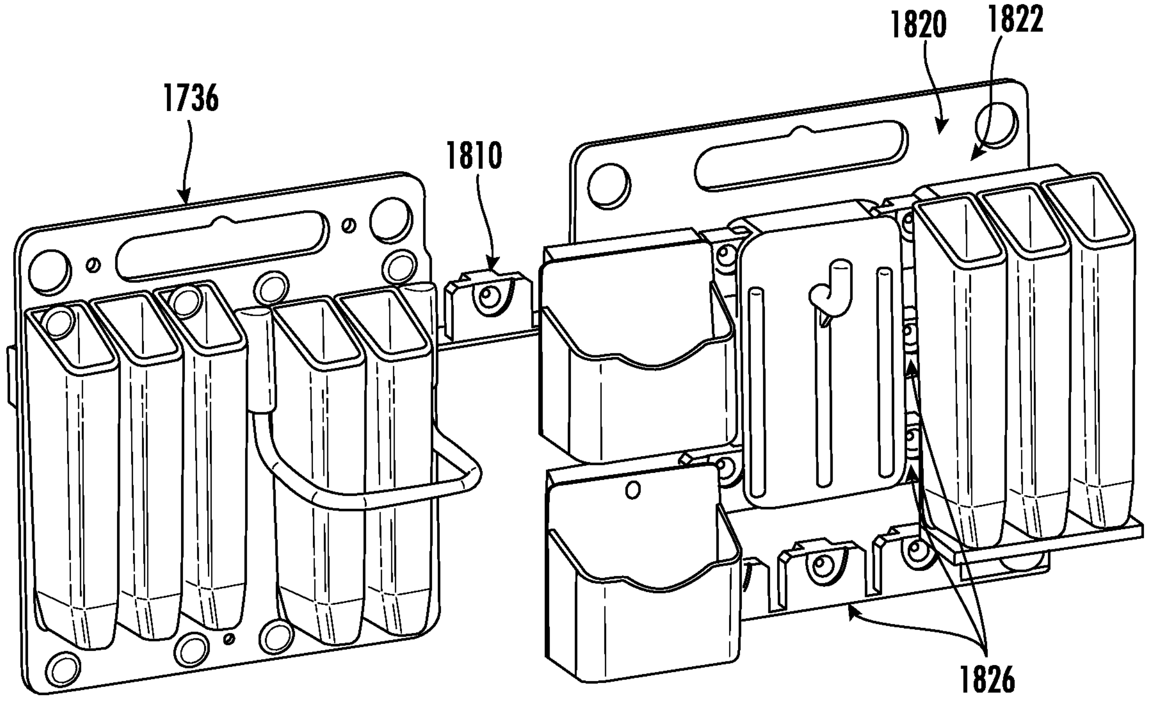
FIG. 84 is a perspective view of the row of projections and a tool board panel shown in FIG. 83, according to an exemplary embodiment.
Figure 85:
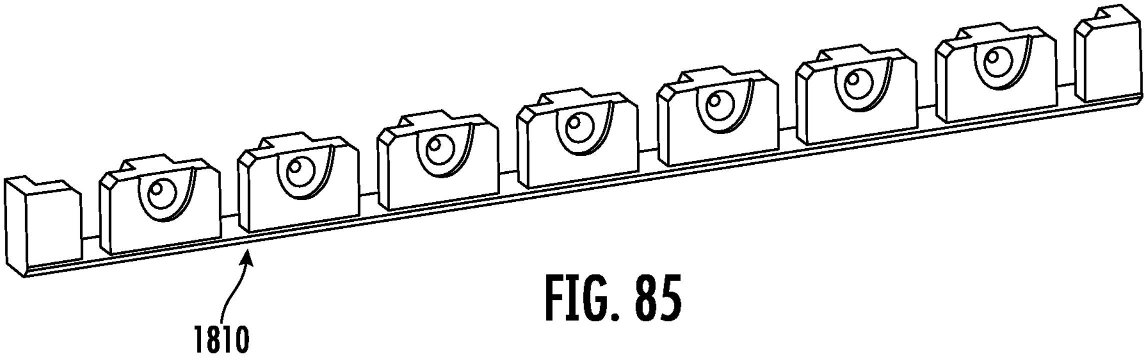
FIG. 85 is a perspective view of the row of projections shown in FIG. 83, according to an exemplary embodiment.
Figure 86:
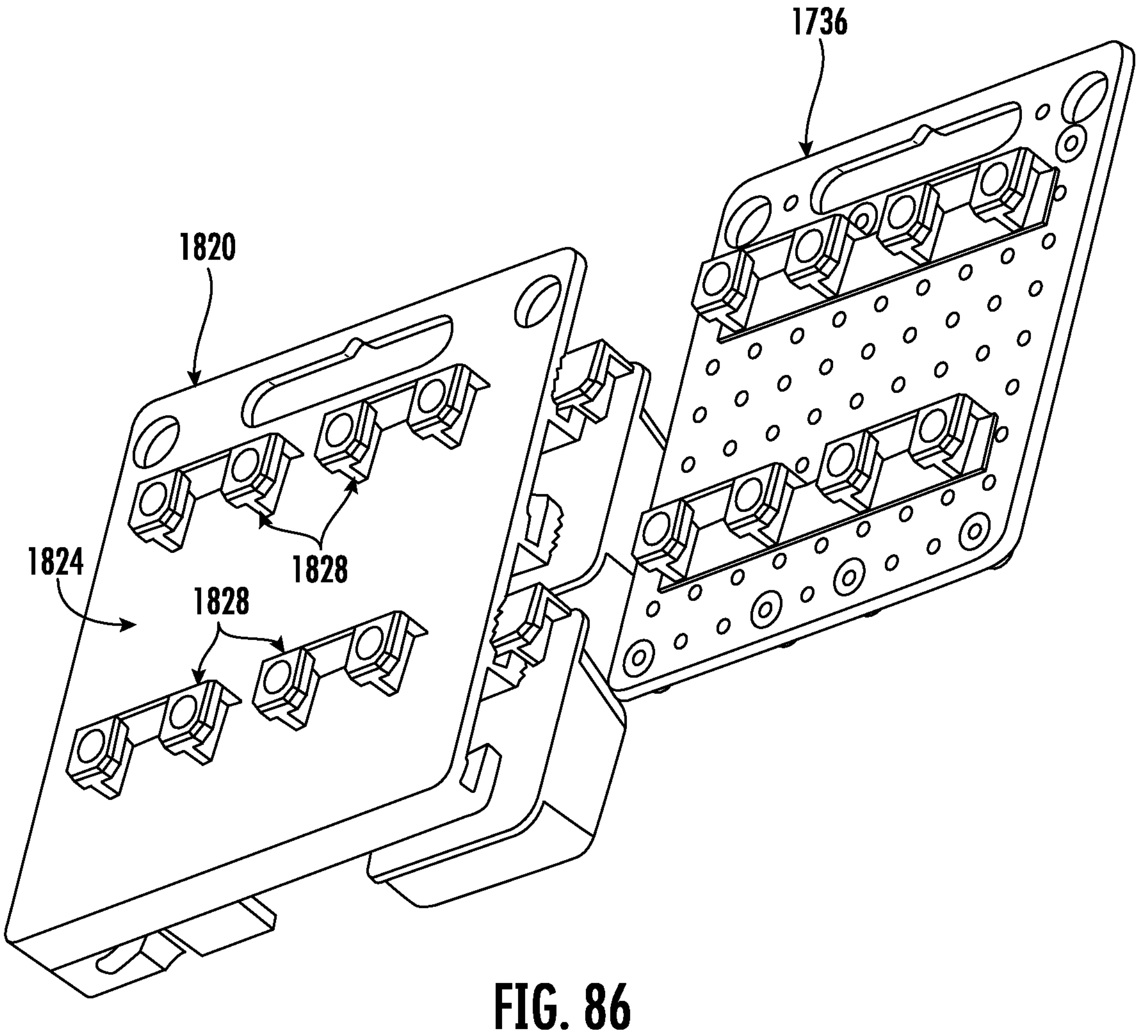
FIG. 86 is a perspective view of the tool board panels shown in FIG. 84, according to an exemplary embodiment.

Base board 1820 may be coupled to row 1810 of projections 1510 (FIG. 84). Base board 1820 includes a front surface 1822 and an opposing rear surface. One or more projections 1826 extend from front surface 1822. Projections 1826 are structurally and functionally similar to projections 1510 or projections 1210 except as otherwise noted. One or more coupling structures 1828 extend from rear surface 1824. Coupling structures 1828 are structurally and functionally similar coupling structures 1340 or coupling structures 1620 except as otherwise noted.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. In addition, as used herein, the article "a" is intended to include one or more component or element and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements or components of any of the other embodiments discussed above.

What is claimed is:

1. A hanging tool storage device configured to hang from a supporting wall, the hanging tool storage device comprising:

- an upper wall extending from a front end to a rear end, the upper wall interfacing against and supported by the supporting wall;
- a rear wall extending downward from the rear end, the rear wall defining a rear surface;
- a front wall extending downward from the front end, the front wall defining a front surface, the front wall and rear wall defining a space between the front wall and the rear wall, the space configured to receive the supporting wall the upper wall is interfacing against, the rear surface and the front surface facing away from each other;
- a first plurality of projections extending from the front surface, each of the first plurality of projections comprising a central wall extending from the front surface, a first aperture extending through the central wall, a first rib extending in a first direction from the central wall and a second rib extending in a second direction from the central wall opposite the first direction, the first rib and the second rib each extending in front of and offset from the front surface, the first plurality of projections comprising a first row of projections extending along a first axis and a second row of projections extending along a second axis above the first row of projections, wherein the first axis is parallel to the second axis, and each of the first axis and the second axis are perpendicular to each of the first direction and the second direction, and wherein the front surface of the front wall extends uninterrupted between the first row and the second row;
- a plurality of tool board panels slidably engaged with the front wall via the first plurality of projections, each of the plurality of tool board panels comprising a second aperture extending through the respective tool board panel, wherein the first apertures and the second apertures are configured to collectively receive a fastener that extends through one of the first apertures and one of the second apertures thereby rigidly coupling the respective tool board panel to the front wall; and
- a plurality of support structures each configured to support a hand tool, wherein each of the plurality of support structures are coupled to one of the plurality of the tool board panels.

2. The hanging tool storage device of claim 1, comprising a second plurality of projections extending from the rear surface, each of the second plurality of projections comprising a second central wall extending from the rear surface, a third aperture extending through the central wall, a third rib extending in a third direction from the second central wall and a fourth rib extending in a fourth direction from the second central wall opposite the third direction, the third rib and the fourth rib each extending above and offset from the rear surface.

3. The hanging tool storage device of claim 2, the second plurality of projections comprising a third row of projections horizontally aligned with each other, and a fourth row of projections horizontally aligned with each other above the third row.

4. The hanging tool storage device of claim 1, the first row comprising a first lower wall extending between the projections in the first row, the second row comprising a second lower wall extending between the projections in the second row, wherein the first rib of a projection in the first row of projections extends a first distance above the first lower wall, and wherein the second lower wall of the second row is a second distance above the first lower wall of the first row, and wherein the first distance is at least 35% of the second distance.

5. The hanging tool storage device of claim 1, wherein for each projection of the first plurality of projections, the first rib defines a first space of the front surface under the first rib and the second rib defines a second space of the front surface under the second rib, wherein the front surface is continuous between the first space and the second space.

6. The hanging tool storage device of claim 1, the plurality of tool board panels comprising a first tool board panel comprising a base panel, the base panel comprising a second rear surface facing towards the front wall, the first tool board panel comprising a plurality of coupling structures extending from the second rear surface, wherein the first tool board panel is slidably engaged with the first plurality of projections via the plurality of coupling structures.

7. The hanging tool storage device of claim 6, the plurality of coupling structures defining third rear surfaces that collectively define a first area, wherein the second rear surface defines a perimeter that defines a second area, and wherein the first area is less than 15% of the second area.

8. The hanging tool storage device of claim 1, the plurality of support structures comprising a hook extending outward from the respective tool board panel away from the front wall.

9. The hanging tool storage device of claim 1, the plurality of support structures comprising a first bag.

10. The hanging tool storage device of claim 9, the first bag comprising a third aperture, the third aperture configured to receive a fastener extending through the third aperture, one of the first apertures, and one of the second apertures, thereby rigidly coupling the first bag to the front wall.

11. The hanging tool storage device of claim 9, the plurality of tool board panels comprising a first tool board panel comprising a base panel, the first bag coupled to the base panel, the first tool board panel comprising a first bar rigidly coupled to the base panel, the first bar and the base panel circumferentially surrounding the first bag.

12. A hanging tool storage device configured to hang from a supporting wall, the hanging tool storage device comprising:

- an upper wall extending from a front end to a rear end, the upper wall interfacing against and supported by a supporting wall;
- a rear wall extending downward from the rear end, the rear wall defining a rear surface;
- a front wall extending downward from the front end, the front wall defining a front surface, the front wall and rear wall defining a space between the front wall and the rear wall, the space configured to receive the supporting wall the upper wall is interfacing against, the rear surface and the front surface facing away from each other;

a first plurality of projections extending from the front surface, each of the first plurality of projections comprising a central wall extending from the front surface, a first aperture extending through the central wall, a first rib extending in a first direction from the central wall and a second rib extending in a second direction from the central wall opposite the first direction, the first rib and the second rib each extending in front of and offset from the front surface, wherein for each projection of the first plurality of projections, the first rib defines a first space of the front surface under the first rib and the second rib defines a second space of the front surface under the second rib, and the front surface is continuous between the first space and the second space;

a base panel slidably engaged with the front wall via the first plurality of projections, a plurality of second apertures extending through the base panel;

a plurality of tool board panels, each of the plurality of tool board panels comprising a third aperture extending through the respective tool board panel, wherein each of the plurality of first apertures and each of the third apertures are configured to collectively receive a fastener that extends through one of the first apertures and one of the third apertures thereby rigidly coupling the respective tool board panel to the front wall; and a plurality of support structures each configured to support a hand tool, wherein each of the plurality of support structures are coupled to one of the plurality of the tool board panels.

13. The hanging tool storage device of claim 12, the first plurality of projections comprising a first row of projections extending along a first axis and a second row of projections extending along a second axis above the first row of projections, wherein the first axis is parallel to the second axis, and each of the first axis and the second axis are perpendicular to each of the first direction and the second direction, and wherein the front surface of the front wall extends uninterrupted between the first row and the second row.

14. The hanging tool storage device of claim 12, the first plurality of projections comprising a first row of projections extending along a first axis and a second row of projections extending along a second axis directly above the first row of projections, wherein the first axis is parallel to the second axis, and each of the first axis and the second axis are perpendicular to each of the first direction and the second direction, the first row comprising a first lower wall extending between the projections in the first row, the second row comprising a second lower wall extending between the projections in the second row, wherein the first rib of a projection in the first row of projections extends a first distance above the first lower wall, and wherein the second lower wall of the second row is a second distance above the first lower wall of the first row, and wherein the first distance is between 40% and 65% of the second distance.

15. A hanging tool storage device configured to hang from a supporting wall, the hanging tool storage device comprising:

an upper wall extending from a front end to a rear end, the upper wall interfacing against and supported by a supporting wall;

a rear wall extending downward from the rear end, the rear wall defining a rear surface;

a front wall extending downward from the front end, the front wall defining a front surface, the front wall and rear wall defining a space between the front wall and the rear wall, the space configured to receive the supporting wall the upper wall is interfacing against, the rear surface and the front surface facing away from each other; and a first plurality of projections extending from the front surface, each of the first plurality of projections comprising a first central wall extending from the front surface, a first aperture extending through the first central wall, a first rib extending in a first direction from the first central wall and a second rib extending in a second direction from the first central wall opposite the first direction, the first rib and the second rib each extending in front of and offset from the front surface, the first plurality of projections comprising a first row of projections extending along a first axis and a second row of projections extending along a second axis above the first row of projections, wherein the first axis is parallel to the second axis, and each of the first axis and the second axis are perpendicular to each of the first direction and the second direction, and wherein the front surface of the front wall extends uninterrupted between the first row and the second row;

a plurality of support structures each configured to support a hand tool, the plurality of support structures engaged with the first plurality of projections; and a plurality of fasteners, each of which extending through one of the first apertures and one of the plurality of support structures, thereby rigidly coupling the respective support structure to the front wall.

16. The hanging tool storage device of claim 15, comprising a second plurality of projections extending from the rear surface, the second plurality of projections comprising a second central wall extending from the front surface, a second aperture extending through the second central wall, a third rib extending in a third direction from the second central wall and a fourth rib extending in a fourth direction from the second central wall opposite the third direction, the third rib and the fourth rib each extending in front of and offset from the rear surface, wherein each projection of the second plurality of projections comprises a second aperture extending through the second central wall of the respective projection, wherein for each projection of the second plurality of projections, the third rib defines a first space of the rear surface under the third rib and the fourth rib defines a second space of the rear surface under the fourth rib, wherein the rear surface is continuous between the first space and the second space.

17. The hanging tool storage device of claim 15, the first row comprising a first lower wall extending between the projections in the first row, the second row comprising a second lower wall extending between the projections in the second row, wherein the first rib of a projection in the first row of projections extends a first distance above the first lower wall, and wherein the second lower wall of the second row is a second distance above the first lower wall of the first row, and wherein the first distance is at least 40% of the second distance.

* * * * *